United States Patent
Islam et al.

(10) Patent No.: US 10,715,241 B2
(45) Date of Patent: Jul. 14, 2020

(54) SYSTEM AND METHOD FOR BEAM MANAGEMENT

(71) Applicant: QUALCOMM Incorporated, San Diego, CA (US)

(72) Inventors: Muhammad Nazmul Islam, Edison, NJ (US); Tao Luo, San Diego, CA (US); Juergen Cezanne, Ocean Township, NJ (US); Sundar Subramanian, San Diego, CA (US); Ashwin Sampath, Skillman, NJ (US); Bilal Sadiq, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/038,081

(22) Filed: Jul. 17, 2018

(65) Prior Publication Data

US 2018/0323852 A1    Nov. 8, 2018

Related U.S. Application Data

(63) Continuation of application No. 15/474,802, filed on Mar. 30, 2017, now Pat. No. 10,069,555.
(Continued)

(51) Int. Cl.
*H04B 7/06* (2006.01)
*H04B 7/0417* (2017.01)
(Continued)

(52) U.S. Cl.
CPC .......... *H04B 7/0639* (2013.01); *H04B 7/0417* (2013.01); *H04B 7/0617* (2013.01);
(Continued)

(58) Field of Classification Search
CPC .......... H04B 7/0639; H04B 7/04; H04B 7/06; H04L 5/00
See application file for complete search history.

(56) References Cited

U.S. PATENT DOCUMENTS

| | | | |
|---|---|---|---|
| 5,724,048 | A | 3/1998 | Remondiere et al. |
| 6,208,858 | B1 | 3/2001 | Antonio et al. |
| | | (Continued) | |

FOREIGN PATENT DOCUMENTS

| | | |
|---|---|---|
| AU | 2014230299 A1 | 9/2015 |
| EP | 3122094 A1 | 1/2017 |
| | (Continued) | |

OTHER PUBLICATIONS

International Search Report and Written Opinion—PCT/US2017/025556—ISA/EPO—dated Jul. 11, 2017.
(Continued)

*Primary Examiner* — Jaison Joseph
(74) *Attorney, Agent, or Firm* — Arent Fox LLP

(57) ABSTRACT

A first apparatus may communicate with a user equipment through a first active beam. The first apparatus may determine that beam tracking is to be performed with the UE, including identifying a new beam for communication between the UE and the apparatus. The first apparatus may perform beam tracking with the UE based on the determination that beam tracking is to be performed. The first apparatus may communicate with the UE through a second active beam based on the beam tracking.

65 Claims, 28 Drawing Sheets

Related U.S. Application Data

(60) Provisional application No. 62/322,168, filed on Apr. 13, 2016, provisional application No. 62/329,180, filed on Apr. 28, 2016, provisional application No. 62/333,120, filed on May 6, 2016, provisional application No. 62/337,829, filed on May 17, 2016, provisional application No. 62/338,484, filed on May 18, 2016, provisional application No. 62/341,051, filed on May 24, 2016, provisional application No. 62/447,386, filed on Jan. 17, 2017.

(51) Int. Cl.
*H04B 7/08* (2006.01)
*H04L 5/00* (2006.01)
*H04W 72/04* (2009.01)
*H04W 72/12* (2009.01)
*H04W 74/08* (2009.01)

(52) U.S. Cl.
CPC ......... *H04B 7/0621* (2013.01); *H04B 7/0695* (2013.01); *H04B 7/088* (2013.01); *H04L 5/0048* (2013.01); *H04L 5/0051* (2013.01); *H04W 72/042* (2013.01); *H04W 72/0413* (2013.01); *H04W 72/1284* (2013.01); *H04W 74/0833* (2013.01)

(56) References Cited

U.S. PATENT DOCUMENTS

| | | | |
|---|---|---|---|
| 7,310,537 B2 | 12/2007 | Wichman et al. | |
| 2010/0296472 A1 | 11/2010 | Lee, II et al. | |
| 2011/0065448 A1* | 3/2011 | Song | H04B 7/0632 455/452.2 |
| 2011/0107169 A1 | 5/2011 | Loehr et al. | |
| 2011/0149842 A1 | 6/2011 | Cordeiro et al. | |
| 2011/0211490 A1 | 9/2011 | Nikula et al. | |
| 2013/0064239 A1 | 3/2013 | Yu et al. | |
| 2013/0083774 A1 | 4/2013 | Son et al. | |
| 2013/0155847 A1 | 6/2013 | Li et al. | |
| 2013/0182683 A1 | 7/2013 | Seol et al. | |
| 2013/0235742 A1 | 9/2013 | Josiam et al. | |
| 2013/0301619 A1* | 11/2013 | Singh | H04W 56/004 370/336 |
| 2014/0044044 A1 | 2/2014 | Josiam et al. | |
| 2014/0146697 A1* | 5/2014 | Kim | H04B 7/0413 370/252 |
| 2014/0177607 A1 | 6/2014 | Li et al. | |
| 2014/0192917 A1 | 7/2014 | Nam et al. | |
| 2014/0198696 A1 | 7/2014 | Li et al. | |
| 2014/0211731 A1* | 7/2014 | Inoue | H04B 7/0456 370/329 |
| 2014/0369245 A1 | 12/2014 | Pecen et al. | |
| 2014/0376466 A1 | 12/2014 | Jeong et al. | |
| 2015/0009951 A1 | 1/2015 | Josiam et al. | |
| 2015/0043439 A1 | 2/2015 | Sajadieh et al. | |
| 2015/0045048 A1 | 2/2015 | Xu et al. | |
| 2015/0049663 A1 | 2/2015 | Mukherjee et al. | |
| 2015/0049824 A1* | 2/2015 | Kim | H04B 7/0456 375/267 |
| 2015/0103784 A1 | 4/2015 | Lorca Hernando | |
| 2015/0110031 A1 | 4/2015 | Takeda et al. | |
| 2015/0181546 A1 | 6/2015 | Freda et al. | |
| 2015/0244432 A1 | 8/2015 | Wang | |
| 2015/0271814 A1 | 9/2015 | Park et al. | |
| 2015/0288439 A1 | 10/2015 | Kim et al. | |
| 2015/0350992 A1 | 12/2015 | Han et al. | |
| 2015/0351135 A1 | 12/2015 | Schmidt et al. | |
| 2015/0359003 A1 | 12/2015 | Kim et al. | |
| 2016/0095003 A1 | 3/2016 | Yu et al. | |
| 2016/0099763 A1 | 4/2016 | Chen et al. | |
| 2016/0105872 A1* | 4/2016 | Kuo | H04W 72/046 370/329 |
| 2016/0119887 A1 | 4/2016 | Charipadi et al. | |
| 2016/0134456 A1 | 5/2016 | Maltsev et al. | |
| 2016/0150435 A1 | 5/2016 | Baek et al. | |
| 2016/0157267 A1 | 6/2016 | Frenne et al. | |
| 2016/0174258 A1 | 6/2016 | Wang et al. | |
| 2016/0183242 A1 | 6/2016 | Cordeiro et al. | |
| 2016/0190686 A1* | 6/2016 | Gao | H01Q 3/24 342/374 |
| 2016/0192401 A1 | 6/2016 | Park et al. | |
| 2016/0211902 A1 | 7/2016 | Park et al. | |
| 2016/0345216 A1 | 11/2016 | Kishiyama et al. | |
| 2016/0353424 A1 | 12/2016 | Stirling-Gallacher et al. | |
| 2016/0353510 A1 | 12/2016 | Zhang et al. | |
| 2016/0380685 A1 | 12/2016 | Kasher et al. | |
| 2016/0380742 A1 | 12/2016 | Suzuki et al. | |
| 2017/0012692 A1 | 1/2017 | Kim et al. | |
| 2017/0104517 A1 | 4/2017 | Kakishima et al. | |
| 2017/0111886 A1 | 4/2017 | Kim et al. | |
| 2017/0207843 A1 | 7/2017 | Jung et al. | |
| 2017/0207845 A1 | 7/2017 | Moon et al. | |
| 2017/0215117 A1 | 7/2017 | Kwon et al. | |
| 2017/0272223 A1 | 9/2017 | Kim et al. | |
| 2017/0288763 A1 | 10/2017 | Yoo et al. | |
| 2017/0295502 A1 | 10/2017 | Stirling-Gallacher et al. | |
| 2017/0295508 A1 | 10/2017 | Stirling-Gallacher et al. | |
| 2017/0302355 A1 | 10/2017 | Islam et al. | |
| 2017/0302414 A1 | 10/2017 | Islam et al. | |
| 2017/0303264 A1 | 10/2017 | Islam et al. | |
| 2017/0303265 A1 | 10/2017 | Islam et al. | |
| 2017/0332300 A1 | 11/2017 | Choi et al. | |
| 2017/0374587 A1 | 12/2017 | Liu et al. | |
| 2018/0019790 A1* | 1/2018 | Mondal | H04B 7/0417 |
| 2018/0049055 A1 | 2/2018 | Wiberg et al. | |
| 2018/0062711 A1 | 3/2018 | Mizusawa | |
| 2018/0138590 A1 | 5/2018 | Uchida et al. | |
| 2018/0138962 A1 | 5/2018 | Islam et al. | |
| 2018/0139791 A1 | 5/2018 | Bai et al. | |
| 2018/0219605 A1 | 8/2018 | Davydov et al. | |
| 2018/0220416 A1 | 8/2018 | Islam et al. | |
| 2018/0249433 A1* | 8/2018 | Shin | H04L 5/0005 |
| 2018/0287722 A1* | 10/2018 | Takano | H04W 16/28 |
| 2018/0302136 A1 | 10/2018 | Wigren et al. | |
| 2018/0309526 A1 | 10/2018 | Zhang et al. | |
| 2019/0028980 A1 | 1/2019 | Feuersaenger et al. | |
| 2019/0068266 A1* | 2/2019 | Chang | H04B 7/0626 |
| 2019/0081676 A1* | 3/2019 | Wei | H04B 7/0417 |
| 2019/0349152 A1 | 11/2019 | Islam et al. | |
| 2020/0083947 A1 | 3/2020 | Islam et al. | |

FOREIGN PATENT DOCUMENTS

| | | |
|---|---|---|
| WO | 2014067107 A1 | 5/2014 |
| WO | 2014117352 A1 | 8/2014 |
| WO | 2015032101 A1 | 3/2015 |
| WO | 2015060681 A1 | 4/2015 |
| WO | 2015141065 A1 | 9/2015 |
| WO | 2015147717 A1 | 10/2015 |
| WO | 2016018168 A1 | 2/2016 |
| WO | 2016086144 A1 | 6/2016 |
| WO | WO-2017173961 A1 | 10/2017 |

OTHER PUBLICATIONS

International Search Report and Written Opinion—PCT/US2017/025572—ISA/EPO—dated Jun. 16, 2017.
International Search Report and Written Opinion—PCT/US2017/025579—ISA/EPO—dated Jul. 11, 2017.
International Search Report and Written Opinion—PCT/US2017/025764—ISA/EPO—dated Jun. 19, 2017.
International Search Report and Written Opinion—PCT/US2018/013356—ISA/EPO—dated May 22, 2018.
Partial International Search Report—PCT/US2018/013356—ISA/EPO—dated Apr. 6, 2018.
"3rd Generation Partnership Project; Technical Specification Group Radio Access Network; Evolved Universal Terrestrial Radio Access (E-UTRA); Multiplexing and channel coding (Release 11)", 3GPP Standard; 3GPP TS 36.212, 3rd Generation Partnership Project (3GPP), Mobile Competence Centre; 650, Route Des Lucioles;

(56) References Cited

OTHER PUBLICATIONS

F-06921 Sophia-Antipolis Cedex; France, vol. RAN WG1, No. V11.3.0, Jun. 17, 2013 (Jun. 17, 2013), pp. 1-84, XP050692826, [retrieved on Jun. 17, 2013] sections 5.3.2, 5.3.2.2. 5.3.2.5.
Certified JP2015105519 for U.S. Appl. No. 15/565,518 (US20180062711) Year: 2015, 76 Pages.
"3rd Generation Partnership Project; Technical Specification Group Radio Access Network; Evolved Universal Terrestrial Radio Access (E-UTRA); Radio Resource Control (RRC); Protocol specification (Release 14)" 3GPP Standard; 3GPP TS 36.331, 3rd Generation Partnership Project (3GPP), Mobile Competence Centre; 650, Route Des Lucioles; F-06921 Sophia-Antipolis Cedex; France, vol. RAN WG2, No. V14.1.0, Jan. 12, 2017 (Jan. 12, 2017), XP051230537, [retrieved on Jan. 12, 2017], 652 pages.
Huawei et al., "Discussion on Beam Management Aspects for UL MIMO", 3GPP TSG RAN WG1 Meeting #86 bis, 3GPP DRAFT; R1-1609415, 3rd Generation Partnership Project (3GPP), Mobile Competence Centre; 650, Route Des Lucioles; F-06921 Sophiaantipolis Cedex; France, vol. RAN WG1, No. Lisbon, Portugal; Oct. 10, 2016-Oct. 14, 2016, Oct. 1, 2016 (Oct. 1, 2016), XP051159492, 4 Pages.
Nokia et al., "Beam Management in Initial Access", 3GPP TSG-RAN WG1 #86 bis, 3GPP Draft; R1-1610288, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016 (Oct. 9, 2016), 4 Pages.
Nokia: "On Beam Management in NR—Procedures", 3GPP TSG-RAN WG1 #86 Bis, R1-1610239, Lisbon, Portugal, Oct. 10-14, 2016, pp. 1-4.

* cited by examiner

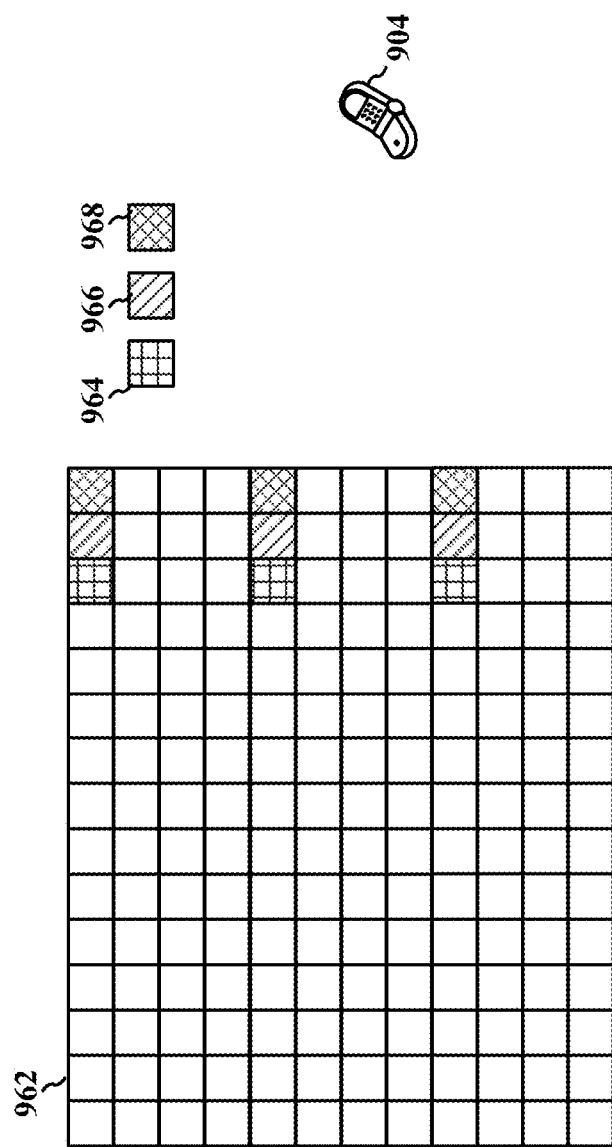
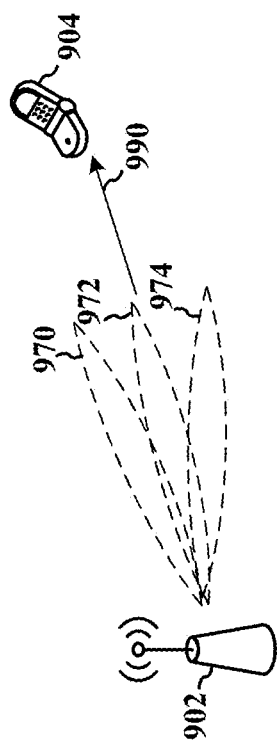
FIG. 9D
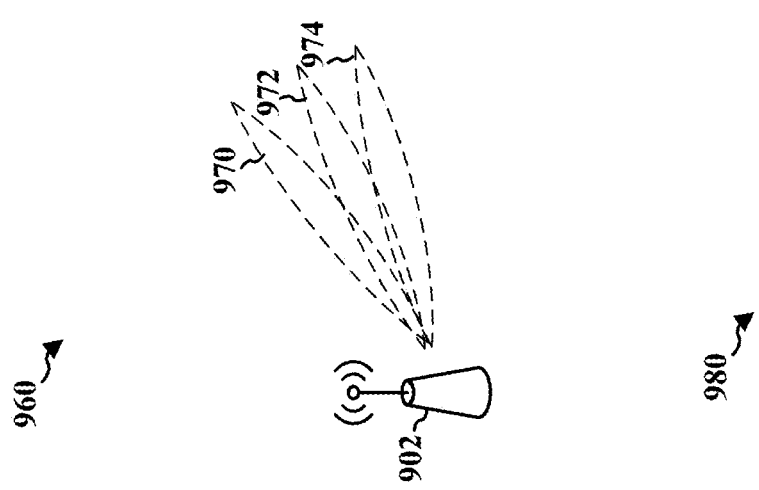
FIG. 9E

SYSTEM AND METHOD FOR BEAM MANAGEMENT

CROSS-REFERENCE TO RELATED APPLICATION(S)

This application is a Continuation of U.S. application Ser. No. 15/474,802, entitled "SYSTEM AND METHOD FOR BEAM MANAGEMENT" and filed on Mar. 30, 2017, which claims the benefit of U.S. Provisional Application Ser. No. 62/322,168, entitled "TRANSMIT REQUEST FOR BEAM TRACKING" and filed on Apr. 13, 2016, U.S. Provisional Application Ser. No. 62/329,180, entitled "TRANSMIT REQUEST FOR BEAM TRACKING" and filed on Apr. 28, 2016, U.S. Provisional Application Ser. No. 62/333,120, entitled "TRANSMIT REQUEST FOR BEAM TRACKING" and filed on May 6, 2016, U.S. Provisional Application Ser. No. 62/337,829, entitled "TRANSMIT REQUEST FOR BEAM TRACKING" and filed on May 17, 2016, U.S. Provisional Application Ser. No. 62/338,484, entitled "TRANSMIT REQUEST FOR BEAM TRACKING" and filed on May 18, 2016, U.S. Provisional Application Ser. No. 62/341,051, entitled "TRANSMIT REQUEST FOR BEAM TRACKING" and filed on May 24, 2016 and U.S. Provisional Application Ser. No. 62/447,386, entitled "SYSTEM AND METHOD FOR BEAM INDEX and filed on Jan. 17, 2017. The disclosures of the aforementioned applications are expressly incorporated by reference herein in their entireties.

BACKGROUND

Field

The present disclosure relates generally to communication systems, and more particularly, to a user equipment and a base station that may communicate through one of more beams.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

An example of an improvement to LTE may include fifth generation wireless systems and mobile networks (5G). 5G is a telecommunications standard that may extend beyond LTE and/or 4G standards. For example, 5G may offer higher capacity and, therefore, serve a larger number of users in an area. Further, 5G may improve data consumption and data rates.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Path loss may be relatively high in millimeter wave (mmW) systems. Transmission may be directional to mitigate path loss. A base station may transmit one or more beam reference signals by sweeping in all directions so that a user equipment (UE) may identify a best "coarse" beam. Further, the base station may transmit a beam refinement request signal so that the UE may track "fine" beams. If a "coarse" beam identified by the UE changes, the UE may need to inform the base station so that the base station may train one or more new "fine" beams for the UE.

In a first aspect, a first method, first apparatus, and first computer-readable medium are provided. The first apparatus may communicate with a UE through a first active beam. The first apparatus may determine that beam tracking is to be performed with the UE, including identifying a new beam for communication between the UE and the first apparatus. The first apparatus may perform beam tracking with the UE based on the determination that beam tracking is to be performed. The first apparatus may communicate with the UE through a second active beam based on the beam tracking. In an aspect, the determination that beam tracking is to be performed for the UE includes determining a time at which the UE is to transition from an inactive cycle of discontinuous reception (DRX) to an active cycle of DRX, and the performance of the beam tracking is based on the determined time. In an aspect, the performance of the beam tracking includes one or more of: transmitting at least one beam reference signal (BRS); receiving, from the UE, a first indication of a first beam index based on the at least one BRS; transmitting, based on the first indication of the first beam index, at least one beam refinement reference signal (BRRS); and receiving, based on the at least one BRRS, a second indication of a second beam index, the second beam index corresponding to the second active beam. In an aspect, the performance of the beam tracking includes one or more of: receiving, from the UE, a request for beam tracking; transmitting, based on the request for beam tracking, at least one BRRS; and receiving, based on the at least one BRRS, an indication of a beam index, the beam index corresponding to the second active beam. In an aspect, the communication with the UE through the first active beam includes sending a reference signal to the UE to determine if the first active beam is failing, and the determination that beam tracking is to be initiated for the UE includes receiving a response from the UE based on the reference signal, and detecting a radio link failure based on the received response. In an aspect, the communication with the UE through the first active beam is performed with a first radio access technology (RAT), and the response is received through a second RAT, the second RAT having a lower carrier frequency than the first RAT. In an aspect, the reference signal is one of a channel state information reference signal (CSI-RS), a cell-specific reference signal (CRS), a secondary synchronization signal (SSS), a mobility reference signal (MRS), a demodulation reference signal (DMRS), or a beam reference signal (BRS), and the response includes at least one of a channel quality information (CQI), a signal-to-interference-plus-noise ratio (SINR), a signal-to-noise radio (SNR), a received signal strength indicator (RSSI), a reference signal received power (RSRP), or a reference signal received quality (RSRQ). In an aspect, the performance of the beam tracking with the UE includes sending a message to the UE indicating that beam tracking is to be performed, wherein the message is sent on a physical downlink control channel (PDCCH) or a physical downlink shared channel (PDSCH). In an aspect, the message is sent through downlink control information (DCI) in the PDCCH. In an aspect, the determination that beam tracking is to be initiated for the UE includes determining an absence of communication with the UE through the first active beam. In an aspect, the determination of the absence of the communication with the UE through the first active beam is based on an absence of data carried on a physical uplink control channel (PUCCH), an absence of data carried on a physical uplink shared channel (PUSCH), or an absence of acknowledgement/negative acknowledgement (ACK/NACK) messages from the UE.

In a second aspect, a second method, second apparatus, and second computer-readable medium are provided. The second apparatus may communicate with a base station through a first active beam. The second apparatus may receive a signal from the base station associated with beam tracking, the beam tracking including identifying a new beam for communication between the second apparatus and the base station. The second apparatus may communicate with the base station through a second active beam based on the signal associated with beam tracking. In an aspect, the signal includes a BRRS, and the second apparatus may send, to the base station, a beam index corresponding to the second active beam based on the BRRS. In an aspect, the signal comprises a BRS, and the second apparatus may send, to the base station, a beam index corresponding to a coarse beam. In an aspect, the second apparatus may send, to the base station, a request to perform beam tracking based on the signal. In an aspect, the communication with the base station through the first active beam includes receiving a reference signal, and the second apparatus may detect a radio link failure based on the reception of the reference signal and send an indication to the base station based on the detected radio link failure. In an aspect, the reference signal is one of a CSI-RS, a CRS, an SSS, an MRS, a DMRS, or a BRS, and the indication includes at least one of a CQI, an SINR, an SNR, an RSSI, an RSRP, or a RSRQ. In an aspect, the communication with the base station through the first active beam is performed with a first RAT, and the indication is sent through a second RAT, the first RAT having a higher carrier frequency than the second RAT. In an aspect, the second apparatus may perform beam tracking with the base station. In an aspect, the performance of the beam tracking includes one or more of: receiving, from the base station, at least one BRS; transmitting, to the base station, a first indication of a first beam index based on the BRS; receiving at least one BRRS; and transmitting, based on the at least one BRRS, a second indication of a second beam index. In an aspect, the signal is received on a PDCCH or a PDSCH. In an aspect, the signal is received through DCI on the PDCCH.

In a third aspect, a third method, third apparatus, and third computer-readable medium are provided. The third apparatus may communicate with a UE through an active beam. The third apparatus may transmit, to the UE, information indicating a periodicity at which control information is to be communicated on a control channel through a control-information beam. The third apparatus may communicate, with the UE, the control information on the control channel through the control-information beam at the periodicity. In an aspect, the control channel includes a PUCCH, and the communication, with the UE, of the control information on the control channel includes receiving, from the UE, the control information carried on the PUCCH through the control-information beam based on the periodicity. In an aspect, the control-information beam includes at least one candidate beam, the at least one candidate beam corresponding to a beam index included in a set of candidate beam indexes maintained by the third apparatus. In an aspect, the control-information beam includes at least one wide beam, the at least one wide beam having an angle greater than that of the active beam. In an aspect, the information indicating the periodicity is transmitted through radio resource control (RRC) signaling. In an aspect, the information indicating the periodicity is transmitted on a PDCCH. In an aspect, the information indicating the periodicity includes DCI of the PDCCH. In an aspect, the third apparatus may receive a request to change the active beam, the request indicating a beam index corresponding to a second beam and change the active beam to the second beam corresponding to the beam index indicated by the request. In an aspect, the request indicates the beam index through at least one of a cyclic shift or spreading across symbols. In an aspect, the request indicates the beam index through at least one of a subcarrier region or a random access channel (RACH).

In a fourth aspect, a fourth method, fourth apparatus, and fourth computer-readable medium are provided. The fourth apparatus may communicate with a base station through an active beam. The fourth apparatus may receive, from the base station, information indicating a periodicity at which control information is to be communicated on a control channel through a control-information beam. The fourth apparatus may communicate, with the base station, the control information on the control channel through the control-information beam at the periodicity. In an aspect, the control channel includes a PUCCH, and the communication of the control information on the control channel includes sending, to the base station, the control information on the PUCCH through the control-information beam based on the periodicity. In an aspect, the control-information beam includes at least one candidate beam, the at least one candidate beam corresponding to a beam index included in a set of candidate beam indexes. In an aspect, the control-information beam includes at least one wide beam, the at least one wide beam having an angle greater than that of the active beam. In an aspect, the information indicating the periodicity is received using RRC signaling. In an aspect, the information indicating the periodicity is received on a PDCCH. In an aspect, the information indicating the periodicity is indicated by DCI of the PDCCH. In an aspect, the fourth apparatus may transmit, to the base station, a request to change the active beam, the request indicating a beam index corresponding to a second beam, and change the active beam to the second beam corresponding to the beam index indicated by the request. In an aspect, the request indicates the beam index through at least one of a cyclic shift or spreading across symbols. In an aspect, the request indicates the beam index through at least one of a subcarrier region or a RACH.

In a fifth aspect, a fifth method, fifth apparatus, and fifth computer-readable medium are provided. The fifth apparatus may transmit, to a UE, on a control channel, one or more indications of one or more beam indexes corresponding to one or more beams. The fifth apparatus may transmit, to the UE, one or more reference signals through the one or more beams corresponding to the one or more beam indexes. In an aspect, the control channel includes a PDCCH, and the one or more indications are included in one or more bits of a DCI message. In an aspect, the transmission of the one or more indications of the one or more beam indexes corresponding to the one or more beams includes transmission of one or more beam indexes associated with one or more BRSs, the one or more BRSs transmitted during a synchronization subframe. In an aspect, the transmission of the one or more indications of the one or more beam indexes corresponding to the one or beams includes reception, from the UE, of one or more beam indexes corresponding to the one or more beams, and transmission of the one or more beam indexes corresponding to the one or more beams based on the one or more beam indexes that are received most recently. In an aspect, the one or more beam indexes corresponding to the one or more beams are received on a PUSCH or a PUCCH. In an aspect, the one or more beam indexes corresponding to the one or more beams are transmitted based on the one or more beam indexes received through the PUSCH when more than two symbols are used for the reference signal transmission. In an aspect, the one or more beam indexes associated with one or more beams are transmitted based on the one or more beam indexes received through the PUCCH when two or fewer symbols are used for the reference signal transmission. In an aspect, the one or more reference signals include at least one of a CSI-RS or a BRRS. In an aspect, the transmission of the one or more indications of the one or more beam indexes associated with the one or more beams includes transmission of the one or more beam indexes associated with the one or more beams through which at least one of the CSI-RSs was previously transmitted.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 9A through 9E are diagrams of a wireless communications system.

DETAILED DESCRIPTION

Figure 1:
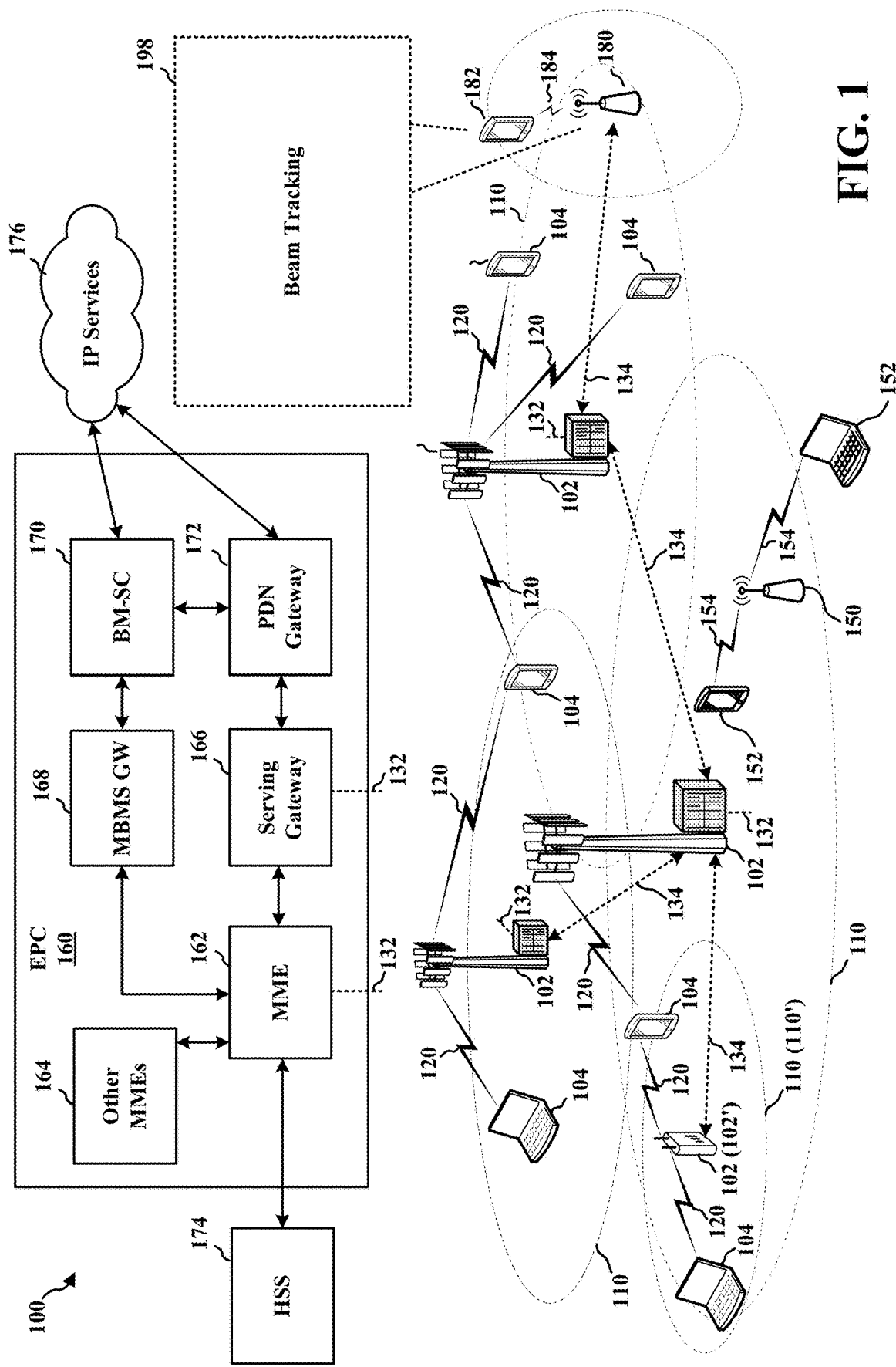
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 182. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may be configured to determine that beam tracking 198 is to be performed with the UE 182, including identifying a new beam for communication between the UE 182 and the base station 180. The base station 180 may perform beam tracking 198 with the UE 182 based on the determination that beam tracking is to be performed. The base station 180 may communicate with the UE through a second active beam based on the beam tracking 198. In an aspect, the determination that beam tracking 198 is to be performed for the UE 182 includes determining a time at which the UE 182 is to transition from an inactive cycle of discontinuous reception (DRX) to an active cycle of DRX, and the performance of the beam tracking 198 is based on the determined time. In an aspect, the performance of the beam tracking 198 includes one or more of: transmitting at least one beam reference signal (BRS); receiving, from the UE 182, a first indication of a first beam index based on the at least one BRS; transmitting, based on the first indication of the first beam index, at least one beam refinement reference signal (BRRS); and receiving, based on the at least one BRRS, a second indication of a second beam index, the second beam index corresponding to the second active beam. In an aspect, the performance of the beam tracking 198 includes one or more of: receiving, from the UE 182, a request for beam tracking 198; transmitting, based on the request for beam tracking 198, at least one beam refinement reference signal; and receiving, based on the at least one beam refinement reference signal, an indication of a beam index, the beam index corresponding to the second active beam. In an aspect, the communication with the UE 182 through the first active beam includes sending a reference signal to the UE 182 to determine if the first active beam is failing, and the determination that beam tracking 198 is to be initiated for the UE 182 includes receiving a response from the UE 182 based on the reference signal, and detecting a radio link failure based on the received response. In an aspect, the communication with the UE 182 through the first active beam is performed with a first radio access technology (RAT), and the response is received through a second RAT, the second RAT having a lower carrier frequency than the first RAT. In an aspect, the reference signal is one of a channel state information reference signal (CSI-RS), a cell-specific reference signal (CRS), a secondary synchronization signal (SSS), a mobility reference signal (MRS), a demodulation reference signal (DMRS), or a beam reference signal (BRS), and the response includes at least one of a channel quality information (CQI), a signal-to-interference-plus-noise ratio (SINR), a signal-to-noise radio (SNR), a received signal strength indicator (RSSI), a reference signal received power (RSRP), or a reference signal received quality (RSRQ). In an aspect, the performance of the beam tracking 198 with the UE 182 includes sending a message to the UE 182 indicating that beam tracking 198 is to be performed, wherein the message is sent on a physical downlink control channel (PDCCH) or a physical downlink shared channel (PDSCH). In an aspect, the message is sent through downlink control information (DCI) in the PDCCH. In an aspect, the determination that beam tracking 198 is to be initiated for the UE 182 includes determining an absence of communication with the UE 182 through the first active beam. In an aspect, the determination of the absence of the communication with the UE 182 through the first active beam is based on an absence of data carried on a physical uplink control channel (PUCCH), an absence of data carried on a physical uplink shared channel (PUSCH), or an absence of acknowledgement/negative acknowledgement (ACK/NACK) messages from the UE 182.

Correspondingly, the UE 182 may communicate with a base station 180 through a first active beam. The UE 182 may receive a signal from the base station 180 associated with beam tracking 198, the beam tracking 198 including identifying a new beam for communication between the UE 182 and the base station 180. The UE 182 may communicate with the base station 180 through a second active beam based on the signal associated with beam tracking 198. In an aspect, the signal includes a BRRS, and the UE 182 may send, to the base station 180, a beam index corresponding to the second active beam based on the BRRS. In an aspect, the signal comprises a BRS, and the UE 182 may send, to the base station 180, a beam index corresponding to a coarse beam. In an aspect, the UE 182 may send, to the base station 180, a request to perform beam tracking 198 based on the signal. In an aspect, the communication with the base station 180 through the first active beam includes receiving a reference signal, and the UE 182 may detect a radio link failure based on the reception of the reference signal and send an indication to the base station 180 based on the detected radio link failure. In an aspect, the reference signal is one of a CSI-RS, a CRS, an SSS, an MRS, a DMRS, or a BRS, and the indication includes at least one of a CQI, an SINR, an SNR, an RSSI, an RSRP, or a RSRQ. In an aspect, the communication with the base station 180 through the first active beam is performed with a first RAT, and the indication is sent through a second RAT, the first RAT having a higher carrier frequency than the second RAT. In an aspect, the UE 182 may perform beam tracking 198 with the base station 180. In an aspect, the performance of the beam tracking 198 includes one or more of: receiving, from the base station 180, at least one BRS; transmitting, to the base station 180, a first indication of a first beam index based on the BRS; receiving at least one BRRS; and transmitting, based on the at least one BRRS, a second indication of a second beam index. In an aspect, the signal is received on a PDCCH or a PDSCH. In an aspect, the signal is received through DCI on the PDCCH.

Figure 2:
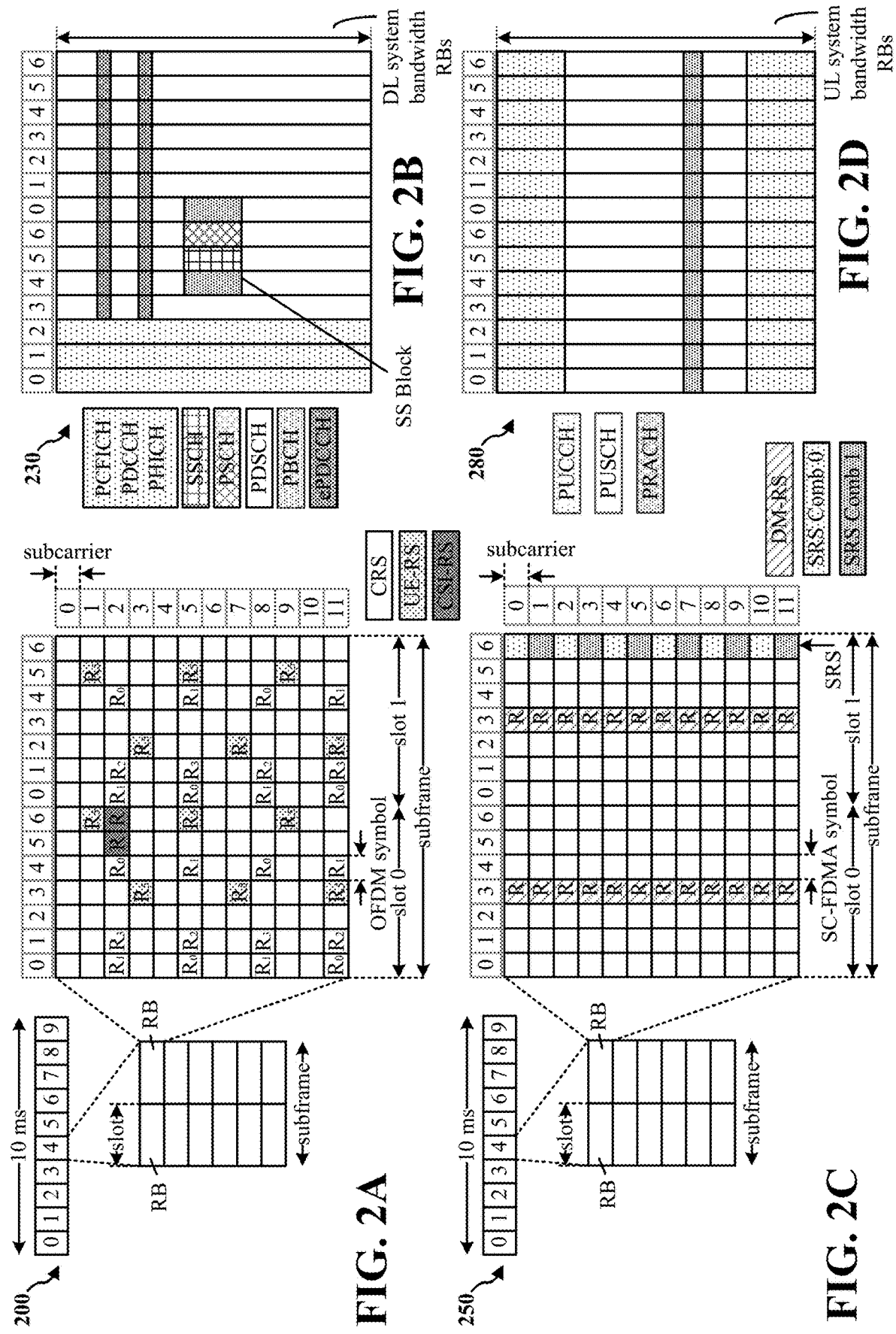
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include CRS (also sometimes called common RS), UE-specific reference signals (UE-RS), and CSI-RS. FIG. 2A illustrates CRS for antenna ports 0, 1, 2, and 3 (indicated as R0, R1, R2, and R3, respectively), UE-RS for antenna port 5 (indicated as R5), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the PDCCH occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ ACK/NACK feedback based on the PUSCH. The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The PDSCH carries user data, broadcast system information not transmitted through the PBCH such as system information blocks (SIBs), and paging messages.

As illustrated in FIG. 2C, some of the REs carry DMRS for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
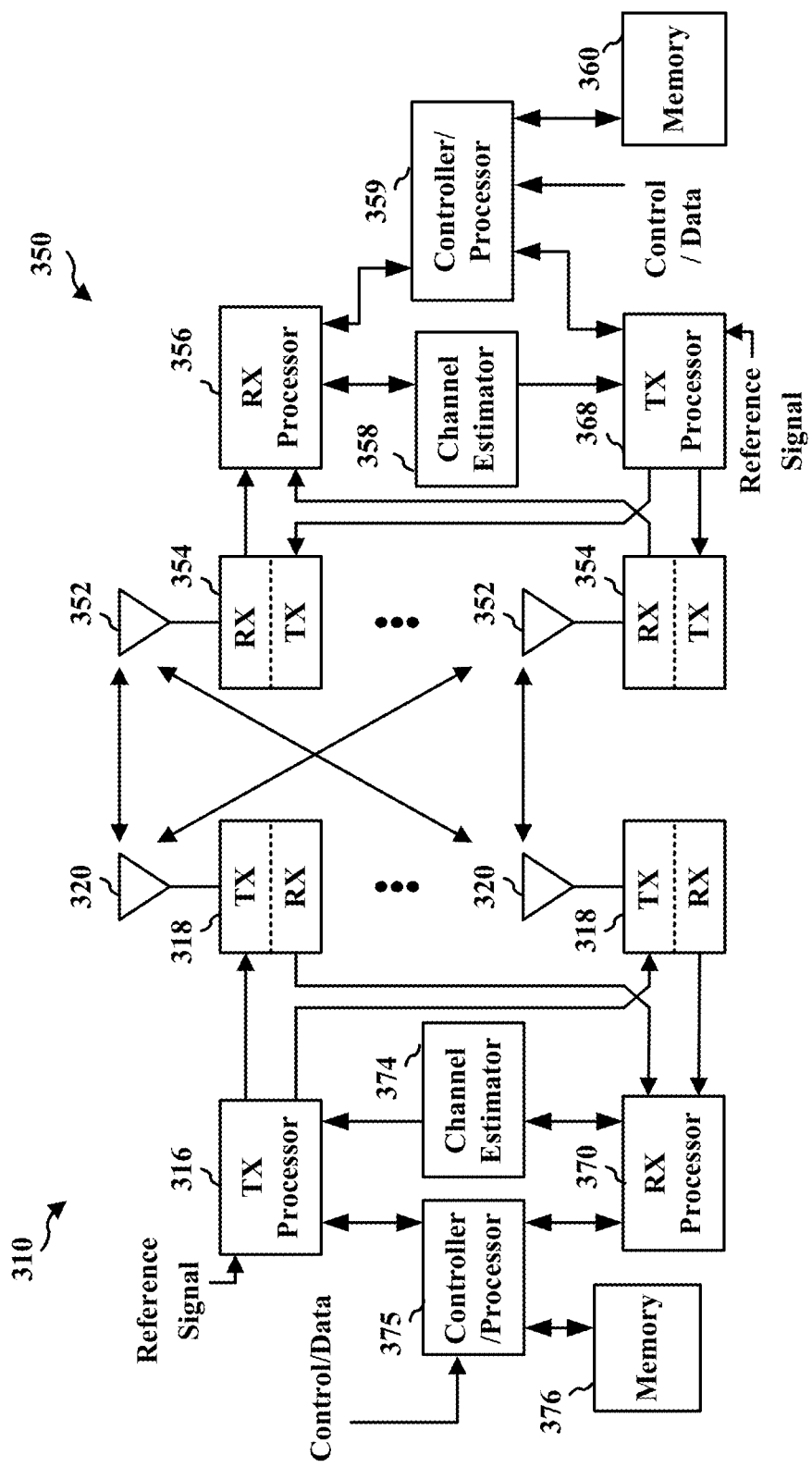
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters (the super high frequency (SHF) band extends between 3 GHz and 30 GHz, also referred to as centimeter wave). While the disclosure herein refers to mmWs, it should be understood that the disclosure also applies to near mmWs. Further, while the disclosure herein refers to mmW base stations, it should be understood that the disclosure also applies to near-mmW base stations.

In order to build a useful communication network in the millimeter wavelength spectrum, a beamforming technique may be used to compensate for path loss. Beamforming technique focuses the RF energy into a narrow direction to allow the RF beam to propagate farther in that direction. Using the beamforming technique, non-line of sight (NLOS) RF communication in the millimeter wavelength spectrum may rely on reflection and/or diffraction of the beams to reach the UE. If the direction becomes blocked, either because of UE movement or changes in the environment (e.g., obstacles, humidity, rain, etc.), the beam may not be able to reach the UE. Thus, in order to ensure that the UE has continuous, seamless coverage, multiple beams in as many different direction as possible may be available. In an aspect, the beamforming technique may require that the mmW base stations and the UEs transmit and receive in a direction that allows the most RF energy to be collected.

Figure 4A:
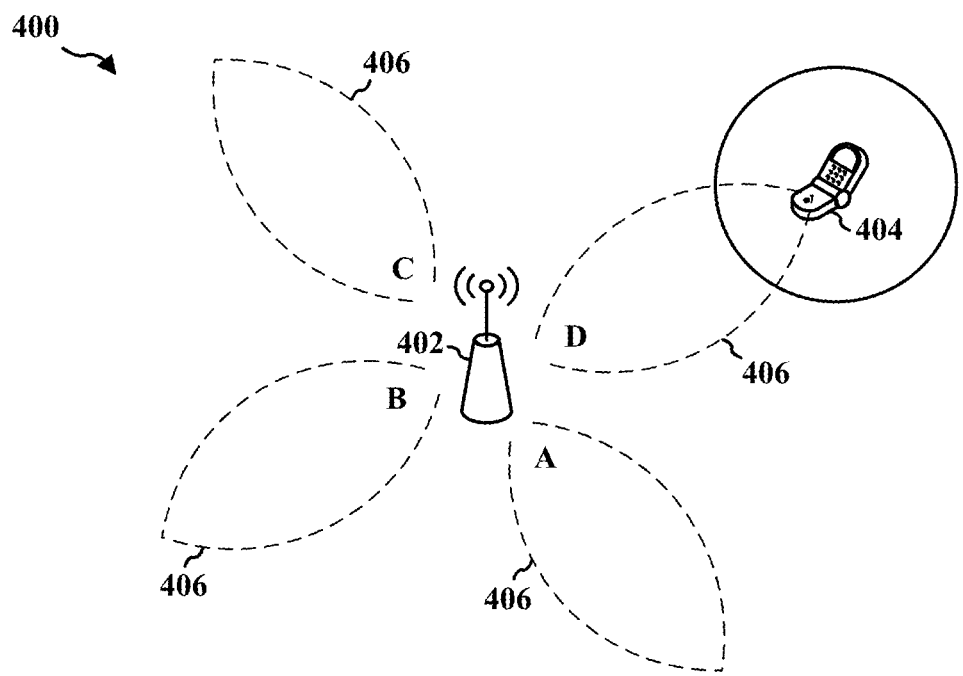
FIGS. 4A and 4B are diagrams of a wireless communications system.
Figure 4B:
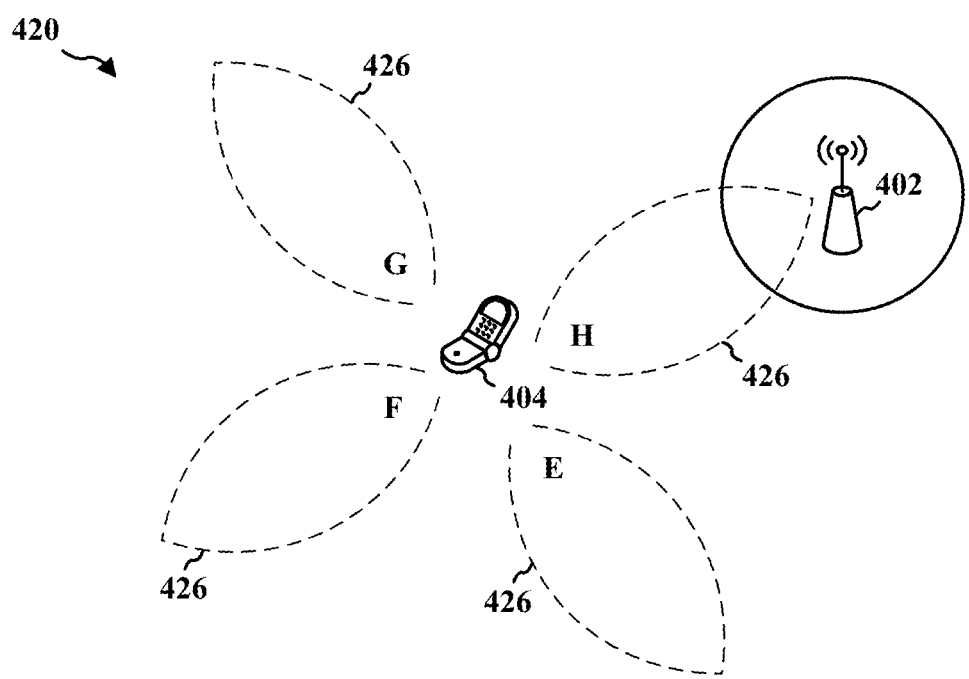

FIGS. 4A and 4B are diagrams illustrating an example of the transmission of beamformed signals between a base station 402 and a UE 404. The base station 402 may be embodied as a base station in a mmW system (e.g., mmW base station). When the UE 404 turns on, the UE 404 searches for a nearby NR network. The UE 404 discovers the base station 402, which belongs to an NR network. The base station 402 transmits an SS block including the PSS, SSS, and the PBCH (including the MIB) periodically in different transmit directions 402a-402h. The UE 404 receives the transmission 402e including the PSS, SSS, and PBCH. Based on the received SS block, the UE 404 synchronizes to the NR network and camps on a cell associated with the base station 402.

Referring to FIG. 4A, diagram 400 illustrates a base station 402 of a mmW system transmitting beamformed signals 406 (e.g., a BRS) in different transmit directions (e.g., directions A, B, C, and D). In an example, the base station 402 may sweep through the transmit directions according to a sequence A-B-C-D. In another example, the base station 402 may sweep through the transmit directions according to the sequence B-D-A-C. Although only four transmit directions and two transmit sequences are described with respect to FIG. 4A, any number of different transmit directions and transmit sequences are contemplated.

After transmitting the signals, the base station 402 may switch to a receive mode. In the receive mode, the base station 402 may sweep through different receive directions in a sequence or pattern corresponding (mapping) to a sequence or pattern in which the base station 402 previously transmitted the synchronization/discovery signals in the different transmit directions. For example, if the base station 402 previously transmitted the synchronization/discovery signals in transmit directions according to the sequence A-B-C-D, then the base station 402 may sweep through receive directions according to the sequence A-B-C-D in an attempt to receive an association signal from a UE 404. In another example, if the base station 402 previously transmitted the synchronization/discovery signals in transmit directions according to the sequence B-D-A-C, then the base station 402 may sweep through receive directions according to the sequence B-D-A-C in an attempt to receive the association signal from the UE 404.

A propagation delay on each beamformed signal allows a UE 404 to perform a receive (RX) sweep. The UE 404 in a receive mode may sweep through different receive directions in an attempt to detect a synchronization/discovery signal 406 (see FIG. 4B). One or more of the synchronization/discovery signals 406 may be detected by the UE 404. When a strong synchronization/discovery signal 406 is detected, the UE 404 may determine an optimal transmit direction of the base station 402 and an optimal receive direction of the UE 404 corresponding to the strong synchronization/discovery signal. For example, the UE 404 may determine preliminary antenna weights/directions of the strong synchronization/discovery signal 406, and may further determine a time and/or resource where the base station 402 is expected to optimally receive a beamformed signal. Thereafter, the UE 404 may attempt to associate with the base station 402 via a beamformed signal.

The base station 402 may sweep through a plurality of directions using a plurality of ports in a cell-specific manner in a first symbol of a synchronization subframe. For example, the base station 402 may sweep through different transmit directions (e.g., directions A, B, C, and D) using four ports in a cell-specific manner in a first symbol of a synchronization subframe. In an aspect, these different transmit directions (e.g., directions A, B, C, and D) may be considered "coarse" beam directions. In an aspect, a BRS may be transmitted in different transmit directions (e.g., directions A, B, C, and D).

In an aspect, the base station 402 may sweep the four different transmit directions (e.g., directions A, B, C, and D) in a cell-specific manner using four ports in a second symbol of a synchronization subframe. A synchronization beam may occur in a second symbol of the synchronization subframe.

Referring to diagram 420 of FIG. 4B, the UE 404 may listen for beamformed discovery signals in different receive directions (e.g., directions E, F, G, and H). In an example, the UE 404 may sweep through the receive directions according to a sequence E-F-G-H. In another example, the UE 404 may sweep through the receive directions according to the sequence F-H-E-J. Although only four receive directions and two receive sequences are described with respect to FIG. 4B, any number of different receive directions and receive sequences are contemplated.

The UE 404 may attempt the association by transmitting beamformed signals 426 (e.g., association signals or another indication of a best "coarse" beam or a best "fine" beam) in the different transmit directions (e.g., directions E, F, G, and H). In an aspect, the UE 404 may transmit an association signal 426 by transmitting along the optimal receive direction of the UE 404 at the time/resource where the base station 402 is expected to optimally receive the association signal. The base station 402 in the receive mode may sweep through different receive directions and detect the association signal 426 from the UE 404 during one or more timeslots corresponding to a receive direction. When a strong association signal 426 is detected, the base station 402 may determine an optimal transmit direction of the UE 404 and an optimal receive direction of the base station 402 corresponding to the strong association signal. For example, the base station 402 may determine preliminary antenna weights/directions of the strong association signal 426, and may further determine a time and/or resource where the UE 404 is expected to optimally receive a beamformed signal. Any of the processes discussed above with respect to FIGS. 4A and 4B may be refined or repeated over time such that the UE 404 and base station 402 eventually learn the most optimal transmit and receive directions for establishing a link with each other. Such refinement and repetition may be referred to as beam training.

In an aspect, the base station 402 may choose a sequence or pattern for transmitting the synchronization/discovery signals according to a number of beamforming directions.

The base station 402 may then transmit the signals for an amount of time long enough for the UE 404 to sweep through a number of beamforming directions in an attempt to detect a synchronization/discovery signal. For example, a BS beamforming direction may be denoted by n, where n is an integer from 0 to N, N being a maximum number of transmit directions. Moreover, a UE beamforming direction may be denoted by k, where k is an integer from 0 to K, K being a maximum number of receive directions. When the UE 404 detects a synchronization/discovery signal from the base station 402, the UE 404 may discover that the strongest synchronization/discovery signal is received when the UE 404 beamforming direction is k=2 and the base station 402 beamforming direction is n=3. Accordingly, the UE 404 may use the same antenna weights/directions for responding (transmitting a beamformed signal) to the base station 402 in a corresponding response timeslot. That is, the UE 404 may send a signal to the base station 402 using UE 404 beamforming direction k=2 during a timeslot when the base station 402 is expected to perform a receive sweep at base station 402 beamforming direction n=3.

Path loss may be relatively high in mmW systems. Transmission may be directional to mitigate path loss. A base station may transmit one or more beam reference signals by sweeping in all directions so that a UE may identify a best "coarse" beam. Further, the base station may transmit a BRRS so that the UE may track "fine" beams. In various aspects, a CSI-RS may be used to track fine beams and, therefore, reference to BRRS may include reference to a CSI-RS. If a "coarse" beam identified by the UE changes, the UE may need to inform the base station so that the base station may train one or more new "fine" beams for the UE.

In various aspects, the UE may send an index of a best beam and corresponding beam refinement reference signal session request to the base station in a subframe reserved for a RACH. The UE may occupy one or more tones reserved for RACH. Further, the UE may occupy tones that are reserved for scheduling request but not for RACH transmission.

FIGS. 5A through 5G are diagrams illustrating an example of the transmission of beamformed signals between a base station and a UE. The base station 502 may be embodied as a base station in a mmW system (mmW base station), such as the mmW base station 180. In one aspect, the base station 502 may be collocated with another base station, such as an eNB, a cellular base station, or other base station (e.g., a base station configured to communicate in a sub-6 GHz band). While some beams are illustrated as adjacent to one another, such an arrangement may be different in different aspects (e.g., beams transmitted during a same symbol may not be adjacent to one another). Additionally, the number of illustrated beams is to be regarded as illustrative.

The base station 502 may include hardware for performing analog and/or digital beamforming. If the base station 502 is equipped with analog beamforming, at any one time, the base station 502 may transmit or receive a signal in only one direction. If the base station 502 is equipped with digital beamforming, the base station 502 may concurrently transmit multiple signals in multiple directions or may receive multiple signals concurrently in multiple directions.

Further, the UE 504, for example, may include hardware for performing analog and/or digital beamforming. If the UE 504 is equipped with analog beamforming, at any one time, the UE 504 may transmit or receive a signal in only one direction. If the UE 504 is equipped with digital beamforming, the UE 504 may concurrently transmit multiple signals in multiple directions or may concurrently receive multiple signals in multiple directions.

In the mmW network, UEs may perform beam sweeps with mmW base stations within range. For example, the base station 502 may transmit m beams in a plurality of different spatial directions. The UE 504 may listen/scan for the beam transmissions from the base station 502 in n different receive spatial directions. When listening/scanning for the beam transmissions, the UE 504 may listen/scan for the beam sweep transmission from the base station 502 m times in each of the n different receive spatial directions (a total of m*n scans). In another aspect, in a beam sweep, the UE 504 may transmit n beams in a plurality of different spatial directions. The base station 502 listens/scans for the beam transmissions from the UE 504 in m different receive spatial directions. When listening/scanning for the beam transmissions, the base station 502 may listen/scan for the beam sweep transmission from the UE 504 n times in each of the m different receive spatial directions (a total of m*n scans).

Based on the performed beam sweeps, the UEs and/or the mmW base stations may determine a channel quality associated with the performed beam sweeps. For example, the UE 504 may determine the channel quality associated with the performed beam sweeps. Alternatively, the base station 502 may determine the channel quality associated with the performed beam sweeps. If the UE 504 determines a channel quality associated with the performed beam sweeps, the UE 504 may send the channel quality information (also referred to as beam sweep result information) to the base station 502. The UE 504 may send the beam sweep result information to the base station 502. If the base station 502 determines a channel quality associated with the performed beam sweeps, the base station 502 may send the beam sweep result information to the UE 504. In an aspect, the channel quality may be affected by a variety of factors. The factors include movement of the UE 504 along a path or due to rotation (e.g., a user holding and/or rotating the UE 504), movement along a path behind obstacles, and/or movement within particular environmental conditions (e.g., obstacles, rain, humidity). The UE 504 and the base station 502 may also exchange other information, for example, associated with for beamforming (e.g., analog or digital beamforming capabilities, beamforming type, timing information, configuration information, etc.).

Based on the received information, the base station 502 and/or the UE 504 may determine various configuration information, such as mmW network access configuration information, information for adjusting beam sweeping periodicity, information regarding overlapping coverage for predicting a handoff to another base station, such as a mmW base station.

Figure 5B:
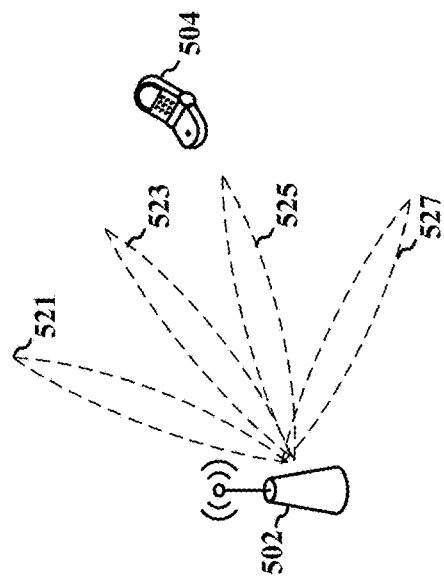
FIGS. 5A through 5G are diagrams of a wireless communications system.
Figure 5D:
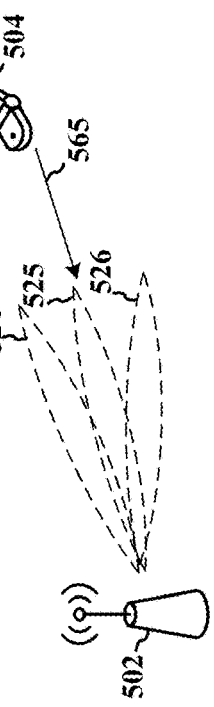
Figure 5A:
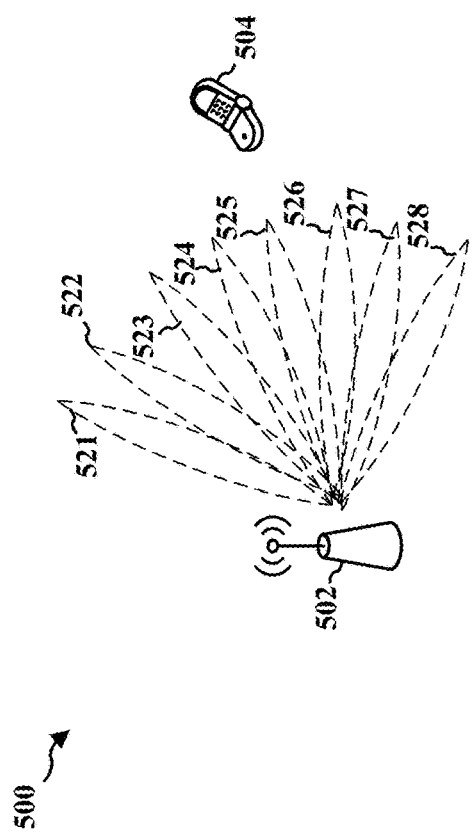

In an aspect, a beam set may contain eight different beams. For example, FIG. 5A illustrates eight beams 521, 522, 523, 524, 525, 526, 527, 528 for eight directions. In aspects, the base station 502 may be configured to beamform for transmission of at least one of the beams 521, 522, 523, 524, 525, 526, 527, 528 toward the UE 504. In one aspect, the base station 502 can sweep/transmit directions using eight ports during a subframe (e.g., synchronization subframe).

In an aspect, a base station may transmit a signal, such as a BRS, in a plurality of directions, for example, during a synchronization subframe. In one aspect, this transmission may be cell-specific. Referring to FIG. 5B, the base station 502 may transmit a first set of beams 521, 523, 525, 527 in four directions. For example, the base station 502 may transmit a BRS in a synchronization subframe of each of the transmit beams 521, 523, 525, 527.

In an aspect, these beams 521, 523, 525, 527 transmitted in the four directions may be odd-indexed beams 521, 523, 525, 527 for the four directions out of a possible eight for the beam set. For example, the base station 502 may be capable of transmitting beams 521, 523, 525, 527 in directions adjacent to other beams 522, 524, 526, 528 that the base station 502 is configured to transmit. In an aspect, this configuration in which the base station 502 transmits beams 521, 523, 525, 527 for the four directions may be considered a "coarse" beam set.

The UE 504 may determine a respective beam index (sometimes abbreviated as "BI") corresponding to a respective beam. In various aspects, the beam index may be indicate at least a direction for communicating through a corresponding beam toward the UE 504 (e.g., a beamforming direction). For example, the beam index may be a logical beam index associated with an antenna port, OFDM symbol index, and/or BRS transmission period, which may be indicated by one or more bits (e.g., 9 bits). For example, the UE 504 may be configured to determine a beam index corresponding to a beam based on a time at which a BRS is received—e.g., a symbol or slot during which a BRS is received may indicate a beam index corresponding to a beam.

Figure 5C:
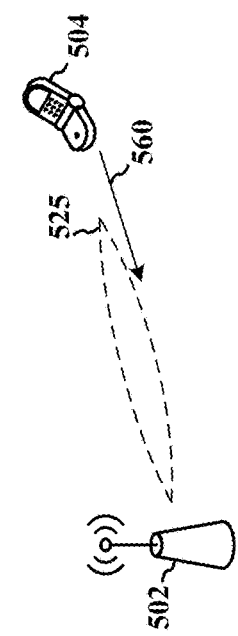

In FIG. 5C, the UE 504 may determine or select a beam index (sometimes abbreviated as "BI") that is strongest or preferable. For example, the UE 504 may determine that the beam 525 carrying a BRS is strongest or preferable. The UE 504 may select a beam by measuring values for a received power or received quality associated with each of the first set of beams 521, 523, 525, 527. In one aspect, the received power may be referred to as a BRS received power (BRSRP).

The UE 504 may compare respective values to one another. The UE 504 may select a "best" beam. In an aspect, the best beam may be a beam that corresponds to the greatest or highest value (e.g., the best beam may be a beam with the highest BRSRP). The selected beam may correspond to a beam index, which may be a beam index with respect to the base station 502. For example, the UE 504 may determine that the BRSRP corresponding to the fifth beam 525 is the highest, and therefore the fifth beam 525 is the best beam as determined by the UE 504.

The UE 504 may transmit a first indication 560 of the fifth beam 525 to the base station 502. In an aspect, the first indication 560 may include a request to transmit a BRRS. The BRRS may be UE-specific. One of ordinary skill would appreciate that the BRRS may be referred to by different terminology without departing from the present disclosure, such as a beam refinement signal, a beam tracking signal, or another term.

In one aspect, the base station 502 may trigger transmission of the first indication 560. For example, the base station 502 may trigger transmission of the first indication 560 by a DCI message.

The base station 502 may receive the first indication 560. In one aspect, the first indication 560 may include a beam adjustment request (BAR) (e.g., a request for beam tracking, a request for a BRRS, a request for the base station to start transmitting on an indicated beam index without any further beam tracking, and the like). In one aspect, the BAR may be included in a MAC control element (CE). In one aspect, the first indication 560 may be indicated by a scheduling request.

In one aspect, the UE 504 may transmit a BAR once during a specific interval, which may be defined by a timer configured through RRC signaling (e.g., a "prohibit BAR timer"). In aspects, the UE 504 may trigger a BAR if the prohibit BAR timer is not running and at least one condition is satisfied. In one aspect, if the UE 504 has uplink resources allocated for new transmission for a transmission time interval (TTI), the UE 504 may generate and transmit a BAR MAC CE, and start or restart the prohibit BAR timer. In another aspect, the UE 504 may be configured with a dedicated scheduling request for BRRS request. In such an aspect, the UE 504 may signal the dedicated scheduling request for BRRS request in a scheduling request region of a RACH subframe (and the UE 504 may start or restart the prohibit BAR timer). In another aspect, the UE 504 may trigger a scheduling request (e.g., when a dedicated scheduling request for BRRS request is not configured for the UE 504 and/or when the UE 504 lacks uplink resources allocated for new transmission for this TTI).

In aspects, the first indication 560 may include a beam state information (BSI) report. The BSI report may include a beam index and a received power. For example, the UE 504 may measure a BRSRP corresponding to a beam through which a BRS is received, and the UE 504 may include the BRSRP and the beam index corresponding to the beam with a "best" (e.g., highest) BRSRP. The UE 504 may transmit the first indication 560 on PUCCH (e.g., xPUCCH) or an PUSCH (e.g., xPUSCH), for example, as a format of uplink control information where a BSI report consists of a beam index and a BRSRP.

Based on the first indication 560, the base station 502 may determine the beam index corresponding to the fifth beam 525. In FIG. 5D, the base station 502 may transmit a second set of beams based on the first indication 560 (e.g., based on a beam index indicated by the first indication 560). For example, the UE 504 may indicate that a fifth beam 525 is the best beam and, in response, the base station 502 may transmit a second set of beams 524, 525, 526 to the UE 504 based on the indicated beam index. In an aspect, the beams 524, 525, 526 transmitted based on the first indication 560 may be closer (e.g., spatially and/or directionally) to the fifth beam 525 than those other beams 521, 523, 527 of the first set of beams.

In an aspect, the beams 524, 525, 526 transmitted based on the first indication 560 may be considered a "fine" beam set. In an aspect, the base station 502 may transmit a BRRS through each of the beams 524, 525, 526 of the fine beam set. In an aspect, the beams 524, 525, 526 of the fine beam set may be adjacent. In an aspect, BRRS transmission can span 1, 2, 5 or 10 OFDM symbols and may be associated with a BRRS resource allocation, BRRS process indication, and/or a beam refinement process configuration.

Based on the BRRS transmission through the beams 524, 525, 526 of the fine beam set, the UE 504 may transmit a second indication 565 to the base station 502 to indicate a "best" beam. In an aspect, the second indication 565 may use two (2) bits to indicate the selected beam. For example, the UE 504 may transmit the second indication 565 that indicates a beam index corresponding to the selected beam 525. In one aspect, the second indication 565 may report beam refinement information (BRI). In one aspect, the second indication 565 may include a resource index (e.g., a BRRS-RI) and/or a reference power (RP) associated with the reception of the BRRS as measured by the UE 504 (e.g., a BRRS-RP). The base station 502 may then communicate with the UE 504 through the selected beam 525.

Figure 5E:
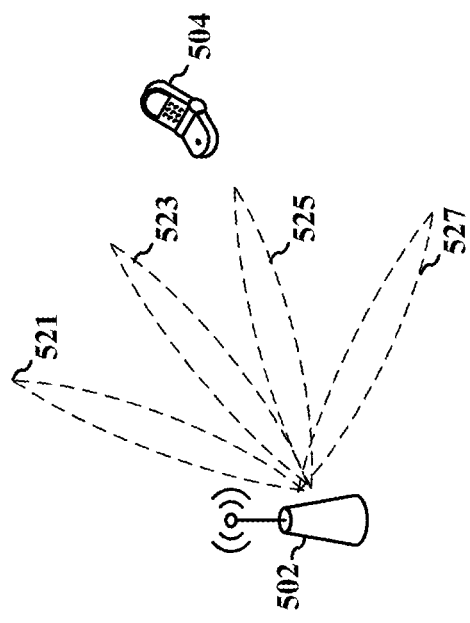

Referring to FIG. 5E, the base station 502 may transmit a BRS in a plurality of directions during a synchronization subframe. In an aspect, the base station 502 may transmit the BRS periodically and/or continuously, e.g., even after the UE 504 has communicated the second indication 565. For example, the base station 502 may transmit beams 521, 523, 525, 527 that each include a BRS (e.g., a "coarse" beam set).

Figure 5G:
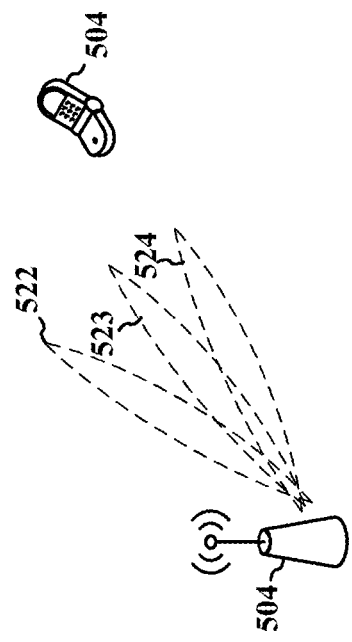
Figure 5F:
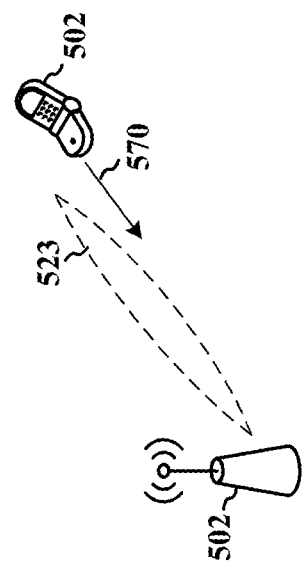

Referring to FIG. 5F, the quality of a selected beam 525 may deteriorate so that the UE 504. For example, when the base station 502 and the UE 504 are communicating through the selected beam 525, the selected beam 525 may become occluded or otherwise unsatisfactory such that the base station 502 and the UE 504 may prefer to communicate through another beam. Based on the BRS (e.g., transmitted during a synchronization subframe), the UE 504 may determine a new beam 523 through which to communicate. For example, the UE 504 may determine that the third beam 523 through which a BRS is communicated may be the best beam. The UE 504 may select a beam based by measuring values for a received power (e.g., BRSRP) or received quality associated with each of the set of beams 521, 523, 525, 527, comparing respective values to one another, and selecting the beam that corresponds to the highest value. The selected beam may correspond to a beam index at the base station 502. The UE 504 may transmit a third indication 570 indicating this beam index to the base station 502. In an aspect, the third indication 570 may include a request to transmit a BRRS. The BRRS may be UE-specific. In one aspect, a BAR may be used to request the base station 502 to transmit a BRRS. In one aspect, the third indication 570 may be triggered by the base station 502, such as by a DCI message. Similar to the first indication 560, the third indication 570 may be included in a scheduling request.

With respect to FIG. 5G, the base station 502 may receive the third indication 570 from the UE 504. The base station 502 may be configured to determine a beam index based on at least the third indication 570. The base station 502 and the UE 504 may perform a beam refinement procedure, such as illustrated with respect to FIG. 5E (e.g., in order to select a new beam through which to communicate).

Figure 6:
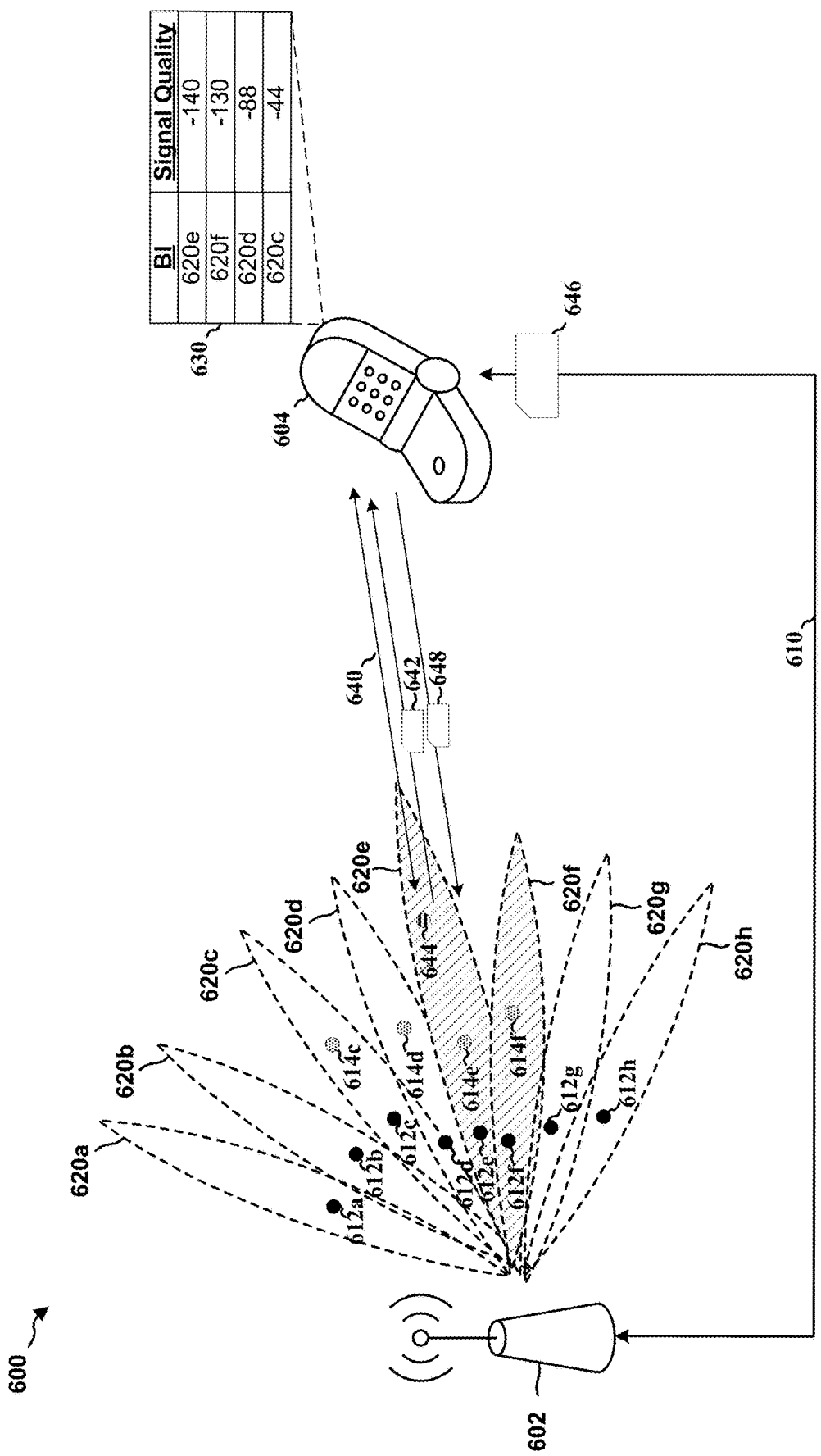
FIG. 6 is a diagram of a wireless communications system.

Referring to FIG. 6, a diagram of a wireless communications system 600 is illustrated. The base station 602 may be an aspect of the base station 502, the base station 310, the base station 102, the mmW base station 180, and/or another base station. The UE 604 may be an aspect of the UE 504, the UE 350, the UE 104, the UE 182, and/or another UE.

In the illustrated aspect, the base station 602 may include up to eight antenna ports for BRS transmission. In various aspects, the base station 602 may send, to the UE 604, one or more BRSs 612a-h (e.g., as described with respect to FIGS. 5A-5G). Each BRS 612a-h may be communicated through a respective beam 620a-h. For example, the base station 602 may send a first BRS 612a through the first beam 620a with which the first BRS 612a is associated. The UE 604 may track one or more beams 620a-h through periodically measuring a BRS 612a-h associated with a respective one of the beams 620a-h. In an aspect, the transmission period of the BRSs may be configured by an indicator on a PBCH, such as an enhanced or evolved PBCH (ePBCH). The transmission period may be associated with the time to sweep the beams 620a-h through which the BRSs 612a-h are transmitted.

In aspects, the UE 604 may receive, through the set of beams 620a-h, a set of BRSs 612a-h. Each BRS 612 of the set of BRSs 612a-h may be associated with a beam index that corresponds to the beam 620a-h through which the BRS 612 is sent. The UE 604 may measure a signal quality of the BRSs 612a-h, and each measured signal quality may correspond to a beam 620a-h of the set of beams. For example, the UE 604 may measure the signal qualities of the third BRS 612c, the fourth BRS 612d, the fifth BRS 612e, and the sixth BRS 612f, which respectively correspond to the third beam 620c, the fourth beam 620d, the fifth beam 620e, and the sixth beam 620f. In aspects, the UE 604 may not receive each of the BRSs 612a-h.

In one aspect, the UE 604 may measure the signal quality as a received power. In one aspect, the signal quality may correspond to a BRSRP. For example, the UE 604 may measure the BRSRP in decibels (dB) and/or decibel-milliwatts (dBm). In other aspects, the UE 604 may measure the signal quality as another value, such as a received quality (RQ), an signal-to-interference ratio (SIR), an SINR, an SNR, an RSRP, an RSRQ, an RSSI, or another metric.

The UE 604 may transmit, to the base station 602, a first indication (e.g., the first indication 560) that indicates a beam index corresponding to a beam with a "best" (e.g., highest) measured signal quality (e.g., BRSRP). The first indication may be a BSI report, which may include a beam index and a BRSRP corresponding to a beam of the set of beams 620a-h. For example, the UE 604 may measure a best BRSRP for the fifth beam 620e. The UE 604 may generate a BSI report that includes a BRSRP and a beam index corresponding to the fifth beam 620e. The UE 604 may transmit the BSI report to the base station 602 as the first indication.

The base station 602 may transmit a BRRS 614. In aspects, the BRRSs 614c-f may not be transmitted on each beam 620a-h. For example, the base station 602 may transmit the BRRSs 614c-f on a subset of beams 620c-f of the set of beams 620a-h. For example, the base station 602 may transmit the BRRSs 614c-f on the subset of beams 620c-f that is near or close to the beam 620e indicated by the first indication. In an aspect, the base station 602 may transmit the beams 620c-f as a fine set of beams for beam refinement with the UE 604.

The UE 604 may select a beam of the subset of beams 620c-f. For example, the UE 604 may measure a signal quality (e.g., received power) for each BRRS 614c-f of the set of BRRSs 614c-f sent through the subset of beams 620c-f. The UE 604 may determine a best (e.g., highest) signal quality (e.g., received power) for a BRRS of the set of BRRSs 614c-f (e.g., the fifth BRRS 614e). The UE 604 may transmit a second indication (e.g., the second indication 565) to the base station 602, which may include a beam index corresponding to the selected beam (e.g., a beam index corresponding to the fifth beam 620e).

The UE 604 and the base station 602 may then communicate 640 through the selected beam corresponding the beam index indicated by the UE 604 in the second indication. The communication 640 may be uplink and/or downlink communication. For example, the base station 602 and the UE 604 may communicate through the same or different beams for uplink communication and downlink communication.

In an aspect, at least one of the base station 602 and/or the UE 604 may maintain an set of beam indexes 630. The set of beam indexes 630 may include beam indexes corresponding to beams from the base station 602 and/or another transmission point (e.g., another eNB or base station), which may allow dynamic point selection and/or joint transmission from multiple transmission points to the UE 604.

Although the UE 604 is illustrated as maintaining the set of beam indexes 630, the base station 602 may maintain a similar set of beam indexes. The base station 602 may maintain an set of beam indexes based on information from the UE 604, such as one or more BSI reports.

The UE 604 may maintain a set of beam indexes 630 as an active set. In such an aspect, the UE 604 may synchronize with the base station 602 based on beams in the set of beam indexes 630 (e.g., soft handover from one beam of the beams 620a-h to another beam of the beams 620a-h). Beams corresponding to the beam indexes included in the set of beam indexes 630 may be used for PDCCH (e.g., xPDCCH, such as an enhanced PDCCH (ePDCCH)), PDSCH (e.g., xPDSCH, such as an enhanced PDSCH (ePDSCH)), PUCCH (e.g., xPUCCH, such as an enhanced PUCCH (ePUCCH)), and/or PUSCH (e.g., xPUSCH, such as an enhanced PUSCH (ePUSCH)) communication. The base station 602 and/or the UE 604 may periodically and/or continuously update the set of beam indexes 630, for example, based on measurements of a BRS 612 and/or BRRS 614 (e.g. comparison of a signal quality to a threshold or relative to signal qualities corresponding to a beam included in the set of beam indexes 630).

In one aspect, the base station 602 and/or the UE 604 may maintain the set of beam indexes 630 as a candidate set. The base station 602 and/or the UE 604 may simultaneously maintain both an active set of beam indexes and a candidate set of beam indexes. For a candidate set of beam indexes, the beams corresponding to the beam indexes in the set of beam indexes 630 may be maintained for inclusion in an active set of beam indexes. Similar to the active set of beam indexes, the base station 602 and/or the UE 604 may update the candidate set of beam indexes periodically, for example, based on measurements of a BRS 612 or BRRS 614 (e.g. comparison of a signal quality to a threshold or relative to signal qualities corresponding to a beam included in the candidate set of beam indexes). However, the periodicity for updating the active set of beam indexes may be different than the periodicity for updating the candidate set of beam indexes.

The base station 602 and/or the UE 604 may update the set of beam indexes 630, for example, by adding a beam index to or removing a beam index from a set of beam indexes 630. Additionally, the base station 602 and/or the UE 604 may move a beam index between the active set of beam indexes and the candidate set of beam indexes. The criteria for updating a set of beam indexes 630 may be based on a signal quality measurement, such as a received power for a BRS 612 or BRRS 614. For example, a signal quality may be compared to a threshold or to another signal quality corresponding to a beam index currently included in a set of beam indexes.

In various aspects, the base station 602 may communicate 640 with the UE 604 through the fifth beam 620e, which may be a current active beam or current serving beam. The communication 640 may be performed with a first RAT, such as a mmW RAT, a 5G RAT (e.g., based on one or more technical standards promulgated by 3GPP), and the like. The communication 640 may be uplink communication, downlink communication, or both uplink and downlink communication.

In various aspects, the base station 602 may determine that beam tracking is to be performed with the UE 604. Beam tracking may include one or more operations for selecting or identifying a beam of the set of beams 620a-h for the communication 640 between the base station 602 and the UE 604 (e.g., uplink and/or downlink communication). For example, the base station 602 may determine that the communication 640 through the fifth beam 620e is degraded (e.g., a radio link failure) and/or that another beam may provide better quality than the fifth beam 620e. Thus, the base station 602 may determine that a new serving beam of the beams 620a-h may be used to communicate 640 with the UE 604.

Based on the determination that beam tracking is to be performed, the base station 602 may perform beam tracking with the UE 604. In various aspects, beam tracking may include one or more operations associated with identifying or selecting a new active or new serving beam for communication between the base station 602 and the UE 604.

According to one aspect of beam tracking, the base station 602 may transmit at least one of the BRSs 612a-h. The UE 604 may receive one or more of the BRSs 612a-h, each of which may correspond to a respective beam of the beams 620a-h. The UE 604 may select or identify at least one beam index corresponding to one of the beams 620a-h based on the reception of the one or more BRSs 612a-h (e.g., the UE 604 may identify one or more BRSs 612a-h having a highest signal quality). The UE 604 may transmit, to the base station 602, a first indication of one or more beam indexes corresponding to one or more of the beams 620a-h having a best (e.g., highest) signal quality measured for a respective received BRS of the BRSs 612a-h (e.g., a beam index corresponding to the sixth beam 620f). Based on the first indication of the one or more beam indexes, the base station 602 may transmit one or more BRRSs 614c-f. For example, the base station 602 may transmit the BRRSs 614c-f through the respective beams 620c-f that are close or proximate to the one or more beams corresponding to the one or more beam indexes indicated by the first indication. The UE 604 may receive one or more of the BRRSs 614c-f, each of which may correspond to a respective beam of the beams 620c-f. The UE 604 may select or identify at least one beam index corresponding to one of the beams 620c-f based on the reception of the one or more BRRSs 614c-f (e.g., the UE 604 may identify one or more BRRSs 614c-f having a highest signal quality). The UE 604 may transmit, to the base station 602, a second indication of one or more beam indexes corresponding to one or more of the beams 620c-f having a best (e.g., highest) signal quality measured for a respective received BRRS of the BRRSs 614c-f (e.g., a beam index corresponding to the sixth beam 620f). The base station 602 and the UE 604 may communicate through a new active beam, which may correspond to the beam index indicated by the second indication, such as the sixth beam 620f.

According to one aspect of beam tracking, the UE 604 may transmit a request for beam tracking 648 (e.g., a BAR). The request for beam tracking 648 may request the base station 602 to transmit the BRRSs 614c-f. Based on the request for beam tracking 648, the base station 602 may transmit the one or more BRRSs 614c-f. For example, the base station 602 may transmit the BRRSs 614c-f through the respective beams 620c-f that are close or proximate to the first active beam (e.g., the fifth beam 620e). The UE 604 may receive the one or more of the BRRSs 614c-f, each of which may correspond to a respective beam of the beams 620c-f. The UE 604 may select or identify at least one beam index corresponding to one of the beams 620c-f based on the reception of the one or more BRRSs 614c-f (e.g., the UE 604 may identify one or more BRRSs 614c-f having a highest signal quality). The UE 604 may transmit, to the base station 602, an indication of one or more beam indexes corresponding to one or more of the beams 620c-f having a best (e.g., highest) signal quality measured for a respective received BRRS of the BRRSs 614c-f (e.g., a beam index corresponding to the sixth beam 620f). The base station 602 and the UE 604 may communicate through a new active beam, which may correspond to the beam index indicated by the indication, such as the sixth beam 620f.

In one aspect, the base station 602 may determine that beam tracking is to be performed with the UE 604 based on the communication 640 with the UE 604. For example, the base station 602 may transmit, to the UE 604, a message 642 indicating that beam tracking is to be performed (e.g., based on the determination that beam tracking is to be performed). In an aspect, the base station 602 may send the message 642 on a PDCCH (e.g., xPDCCH) or a PDSCH (e.g., xPDSCH). In an aspect, the base station 602 may send the message 642 as DCI on the PDCCH. For example, one or more bits associated with a DCI may be reserved to indicate the message 642, and the base station 602 may use the one or more reserved bits of the DCI to indicate the message to perform beam tracking. The reserved bits may vary according to DCI formats.

In one aspect, the base station 602 may transmit the message through the fifth beam 620e, which may be a current active beam or current serving beam. In other words, the base station 602 may transmit the message 642 to the UE 604 using a first RAT (e.g., a mmW RAT). In another aspect, the base station 602 may transmit the message 642 to the UE through a second RAT 610, which may have a lower carrier frequency than the first RAT (e.g., a sub-6 GHz or LTE RAT).

In an aspect, the UE 604 may acknowledge the message 642, such as by transmitting an ACK message. The UE 604 may transmit an acknowledgment message through the first RAT or the second RAT 610. The base station 602 and the UE 604 may then perform beam tracking using the first RAT. In aspect, the base station 602 may perform beam tracking (such as be transmitting the BRSs 612a-h) when an acknowledgement is not received in response to the message 642 (e.g., within a predetermined period of time).

In an aspect, the base station 602 may communicate with the UE 604 using the current active beam (e.g., fifth beam 620e) by sending a reference signal 644 to the UE 604. For example, the base station 602 may send the reference signal 644 to determine if the current active beam (e.g., fifth beam 620e) is failing. According to various aspects, the reference signal 644 may be a CSI-RS, a CRS, an SSS, an MRS, a DMRS, or a BRS (e.g., the BRS 612e).

In an aspect, if the base station 602 does not receive a response to the reference signal 644, then the base station 602 may determine that the current active beam (e.g., fifth beam 620e) is failing. In another aspect, the UE 604 may transmit a response 646, for example, based on the reference signal 644. The base station 602 may detect a radio link failure (e.g., determine that the current active beam is failing) based on the response 646. For example, the base station 602 may detect a radio link failure by determining a value based on the response 646 and comparing the value to a predetermined threshold.

In an aspect, the UE 604 may send the response 646 through the second RAT 610 (e.g., a sub-6 GHz or LTE RAT). For example, the UE 604 may measure a value (e.g., a SINR, SNR, RSSI, RSRP, RSRQ, etc.) and determine that the current active beam is failing, and therefore, send the response 646 using the second RAT 610 in order to increase the probability that the base station 602 receives the response 646. In another aspect, the UE 604 may send the response 646 through the first RAT (e.g., the mmW RAT). The response 646 may include at least one of a CQI, an SINR, an SNR, an RSSI, an RSRP, an RSRQ, and the like.

In an aspect, the base station 602 may select and transmit reference signals used for radio link failure for specific transmission points so that reference signals are restricted to specific transmission points. A transmission point may be, for example, different sectors of a same base station and/or coordinated multipoint transmission from different base stations, such as where a controller indicates transmission properties to a base station. A transmission point may also be an antenna port of one base station. For example, the base station 602 may select reference signals (similar to the reference signal 644) to be transmitted in one sector that includes the UE 604. The base station 602 may allow separate radio link failure procedures for separate transmission ports.

The UE 604 may receive at least the first reference signal 644 and may monitor this first reference signal 644 to determine whether there is an event, which may be a Qin event or a Qout event. For a Qin event, the UE 604 may measure one or more metrics (e.g., signal quality, received power, RSSI, SNR, etc.) associated with the first reference signal 644 to determine whether the one or more metrics are greater than or equal to a threshold. For a Qout event, the UE 604 may measure one or more metrics (e.g., signal quality, received power, RSSI, SNR, etc.) associated with the first reference signal 644 to determine whether the one or more metrics are less than or equal to a threshold, which may indicate radio link failure. In an aspect, the one or more metrics may include at least an SNR or SINR.

In an aspect, the UE 604 may use the first reference signal 644 to detect radio link failure. In another aspect, the UE 604 may use a plurality of reference signals (including the reference signal 644) to detect radio link failure. For example, the UE 604 may use a best SNR estimate or another metric among all reference signals (including the reference signal 644) associated with a plurality of beams (e.g., the fourth beam 620d, the fifth beam 620e, the sixth beam 620f). In another example, the UE 604 may combine one or more metrics measured from the reference signals (including the reference signal 644) to detect radio link failure.

In an aspect, the UE 604 may maintain separate radio link failure processes for different receiving beams or subarrays, for example, using the reference signals associated with different receiving beams or subarrays. For example, the UE 604 may maintain one process for the current active beam (e.g., the fifth beam 620e), which may be based on monitoring the first reference signal 644. Further, the UE 604 may maintain another process for a first candidate beam (e.g., the sixth beam 620f), which may be based on monitoring a second reference signal (e.g., the sixth BRS 612f) associated with the first candidate beam (e.g., the sixth beam 620f).

In an aspect, when the UE 604 detects a radio link failure, the UE 604 and the base station 602 may perform beam tracking. In an aspect, the UE 604 may request a beam tracking procedure with the base station 602 when a radio link failure is detected. For example, the UE 604 may transmit a BAR. In an aspect, the UE 604 may transmit an indication of the detected radio link failure, for example, so that the base station 602 may determine to perform beam tracking with the UE 604.

In an aspect, base station 602 may determine that beam tracking is to be performed with the UE 604 based on an absence of the communication 640. For example, the base station 602 may determine that beam tracking is to be performed with the UE 604 when base station 602 expects the UE 604 to transmit one or more messages to the base station 602, but the one or more messages are absent (e.g., for a predetermined period of time). For example, the base station 602 may schedule communication 640 with the UE 604 on a PUCCH and/or a PUSCH. If the base station 602 determines that the communication 640 is absent on the PUCCH and/or PUSCH (e.g., when the UE 604 is scheduled), then the base station 602 may determine that beam tracking is to be performed with the UE 604. Similarly, if the base station 602 is expecting an ACK/NACK message (e.g., to the message 642, to the reference signal 644, and the like), but the ACK/NACK message is absent (e.g., for a predetermined period of time), then the base station 602 may determine that beam tracking is to be performed with the UE 604. Similarly, if the base station 602 receives a plurality of NACK messages (e.g., a threshold amount of NACK messages before receiving an ACK message), then the base station 602 may determine that beam tracking is to be performed with the UE 604.

In an aspect, the UE 604 may operate according to DRX and, therefore, may alternate between continuous reception cycles (e.g., during which the UE 604 is active and receiving) and DRX cycles (e.g., during which the UE 604 is inactive and not receiving). The DRX may affect the current active beam (e.g., the fifth beam 620e), such as when the UE 604 moves during DRX. Therefore, when the UE 604 transitions from DRX to continuous reception cycle, the UE 604 may use a synchronization subframe or a tracking subframe to find a beam. In an aspect, the base station 602 may transmit a signal (e.g., a BRS 612 in a synchronization subframe or a BRRS 614 in a tracking subframe). In an aspect, the tracking signal may serve many UEs sharing a same DRX cycle. The UE 604 may monitor a subset of tracking signals in a synchronization subframe based on one or more active beam indexes from a previous DRX cycle. In another aspect, the base station 602 may use the active beam of the previous continuous reception cycle of the UE 604 to determine the beam indexes that the base station 602 should transmit during the beam tracking session.

In an aspect, the base station 602 may consider semi-persistent scheduling as a type of triggering for beam tracking, which may be based on DRX durations (e.g., one PDCCH triggers multiple tracking signal transmissions over multiple subframes). That is, the base station 602 may determine that beam tracking is to be performed based on DRX durations. In an aspect, the base station 602 may determine that beam tracking is to be performed with the UE 604 by determining a time at which the UE 604 is to transition from an inactive cycle of DRX to an active cycle of DRX. For example, the current active beam (e.g., fifth beam 620e) may fail while the UE 604 is in an inactive DRX cycle. The base station 602 may be aware of DRX cycles for the UE 604 and may determine to perform beam tracking that corresponds to a time at which the UE 604 is to transition out of the inactive cycle and into an active cycle for reception.

In an aspect, the base station 602 may perform beam tracking based on the first active beam. For example, the UE 604 may transition into an inactive DRX cycle when the current active beam (e.g., fifth beam 620e) is being used. The UE 604 may not drift too far during the inactive DRX cycle, and so the base station 602 may use beams that are close to the current active beam (e.g., fifth beam 620e) when performing beam tracking after the UE 604 is in the inactive DRX cycle. The base station 602 may transmit the message 642 indicating that beam tracking is to be performed, for example, based on a time at which the UE 604 is to transition to an active DRX cycle from an inactive DRX cycle.

Figure 7:
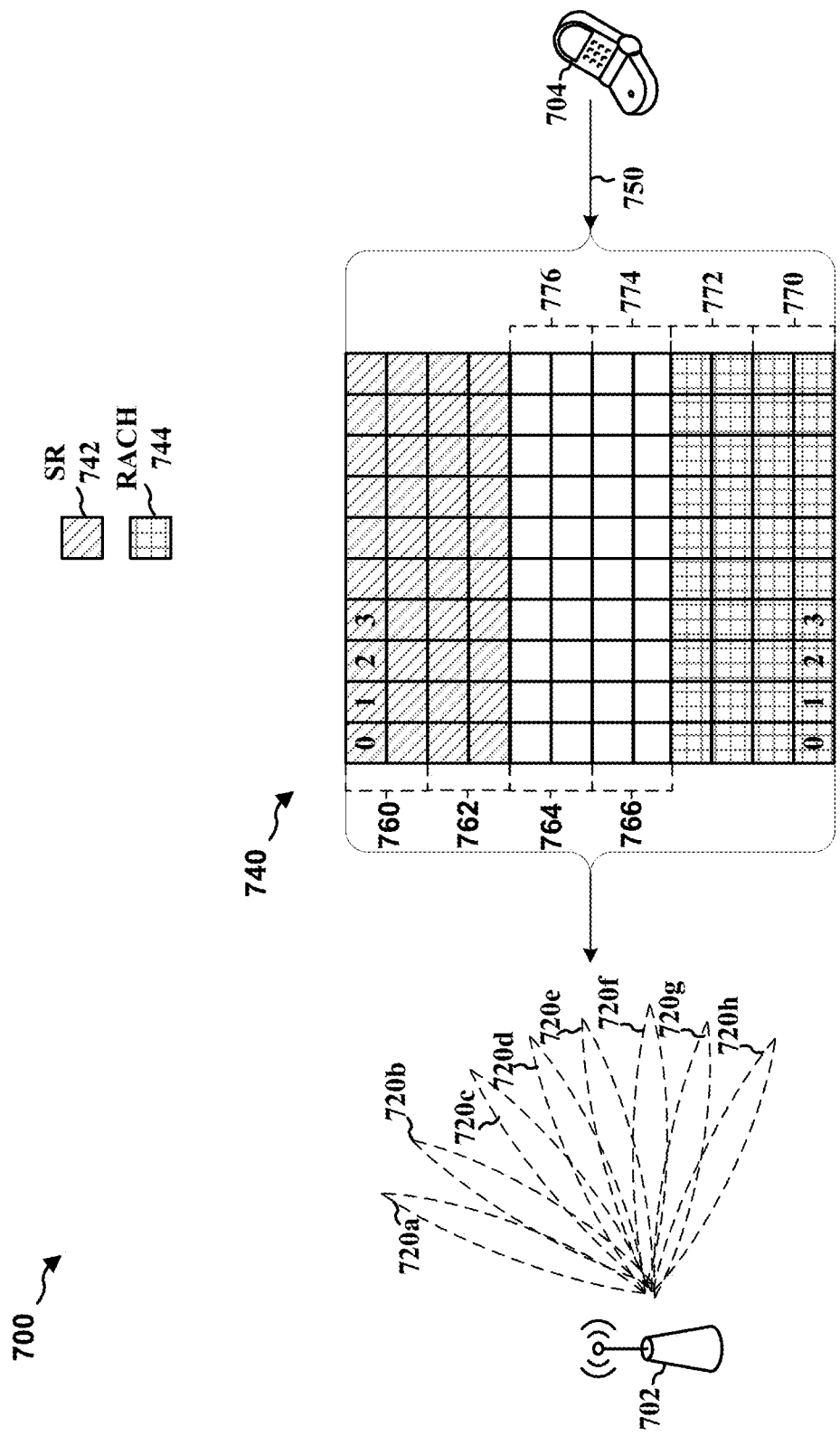
FIG. 7 is a diagram of a wireless communications system.

Referring to FIG. 7, a diagram of a wireless communications system 700 is illustrated. The base station 702 may be an aspect of the base station 602, the base station 502, the base station 310, the base station 102, the mmW base station 180, and/or another base station. The UE 704 may be an aspect of the UE 604, the UE 504, the UE 350, the UE 104, the UE 182, and/or another UE.

In various aspects, the base station 702 and the UE 704 may communicate through a first active beam, such as the fifth beam 720e. In aspects, the UE 704 may need to indicate a beam of the beams 720a-h to the base station 702, e.g., when the communication through the fifth beam 720e deteriorates, when the UE 704 transitions from an inactive DRX cycle to an active DRX cycle, etc. However, the base station 702 may detect transmission from the UE 704 in the direction of the fifth beam 720e.

According to various aspects, the UE 704 may send, to the base station 702, a request 750 to change the active beam. The request 750 may indicate a beam index corresponding to a new beam. In an aspect, the UE 704 may use a Zadoff-Chu sequence to indicate the beam change request.

In aspects, the UE 704 and the base station 702 may communicate through the fifth beam 720e, which may be a current active beam. The UE 704 may identify or select a new beam, such as the sixth beam 720f, for communication with the base station 702. For example, the UE 704 may determine that communication through the fifth beam 720e is deteriorating or unsatisfactory. The UE 704 may select or identify the sixth beam 720f as the new beam, for example, based on measuring a signal quality of a BRS and/or BRRS transmitted through the sixth beam 720f. The UE 704 may generate a request 750 to change the active beam from the fifth beam 720e to the sixth beam 720f. The UE 704 may generate the request 750 to indicate a beam index corresponding to the sixth beam 720f. The UE 704 may send the request 750 to the base station 702.

In one aspect, the UE 704 may generate the request 750 to indicate the beam index corresponding to the new beam (e.g., the sixth beam 720f) based on a cyclic shift. For example, the UE 704 and/or the base station 702 may maintain a mapping of one or more cyclic shifts to one or more respective beam indexes. In a further example, one or more bits of the request 750 may correspond to a beam index of the new beam. The UE 704 may identify a cyclic shift corresponding to the sixth beam 720f and may send the request 750 with the identified cyclic shift corresponding to the sixth beam 720f. Accordingly, the base station 702 may receive the request 750 with the cyclic shift and identify the beam index associated with the cyclic shift in order to determine the sixth beam 720f corresponding to the beam index.

In one aspect, the UE 704 may generate the request 750 to indicate the beam index corresponding to the new beam (e.g., the sixth beam 720f) based on a spreading across symbols. For example, the UE 704 and/or the base station 702 may maintain a mapping of one or more spreading across symbols to one or more respective beam indexes. The UE 704 may identify a spread across symbols corresponding to the sixth beam 720f and may send the request 750 with the identified spread across symbols corresponding to the sixth beam 720f. Accordingly, the base station 702 may receive the request 750 with the spread across symbols and identify the beam index associated with the spread across symbols in order to determine the sixth beam 720f corresponding to the beam index.

In one aspect, the UE 704 may generate the request 750 to indicate the beam index corresponding to the new beam (e.g., the sixth beam 720f) based on one or more subcarriers that carries the request 750. For example, the UE 704 and/or the base station 702 may maintain a mapping of one or more subcarriers to one or more respective beam indexes. The UE 704 may identify one or more subcarriers corresponding to the sixth beam 720*f* and may send the request 750 on the identified one or more subcarriers corresponding to the sixth beam 720*f*. Accordingly, the base station 702 may receive the request 750 one the one or more subcarriers and identify the beam index associated with the one or more subcarriers in order to determine the sixth beam 720*f* corresponding to the beam index.

Based on the beam index indicated by the request 750, the base station 702 may change the active beam from the fifth beam 720*e* to the sixth beam 720*f*. The base station 702 and the UE 704 may then communicate through the sixth beam 720*f* The communication may be uplink and/or downlink communication.

In an aspect, the UE 704 may use a subframe 740 in order to indicate the new beam (e.g., because beamforming may not be required for RACH in a cell provided by the base station 702). In aspects, the subframe 740 may be a RACH subframe. The subframe 740 may include a plurality of resources—e.g., 10 time resources (e.g., slots) and 12 frequency resources (e.g., carriers). The subframe 740 may include resources 742 for scheduling request (SR) (e.g., SR collection or region) and resources 744 for RACH (e.g., RACH collection or region). Each resource may include six physical resource blocks (PRBs), and each PRB may include twelve tones.

In one aspect, at least one of the base station 702 and/or the UE 704 may maintain a mapping between beams (e.g., beams 720*a*-*h*) associated with a synchronization (e.g., BRS) session and/or RACH session. That is, the UE 704 may be configured to indicate a beam index using one or more resources of a subframe 740, such as by transmitting a request 750 on at least one resource corresponding to the beam index selected by the UE 704.

In one aspect, the subframe 740 may include SR resources 742 (e.g., an SR collection). The UE 704 may indicate a selected beam on resources that are not included in the SR resources 742. The UE 704 may be configured to select a beam of the beams 720*a*-*h*, and each beam of the beams 720*a*-*h* may correspond to a beam index. The UE 704 may select a beam of the beams 720*a*-*h*, for example, based on measuring a signal quality of one or more BRSs or BRRSs received through one or more of the beams 720*a*-*h*. For example, the UE 704 may select a new beam (e.g., the second beam 720*b*), and the UE 704 may be configured to transmit the request 750 as a RACH sequence in symbols 0 and/or 1 of the resources not included in the SR resources 742 if the selected beam index corresponding to the new beam (e.g., the second beam 720*b*) corresponds to one of beams 720*a*-*d*. Similarly, the UE 704 may be configured to transmit the request 750 as a RACH sequence in a symbols 2 and/or 3 of the resources not included in the SR resources 742 if the selected beam index corresponds to one of beams 720*e*-*h*.

In one aspect, the UE 704 may indicate a specific beam within the range using at least one subcarrier. For example, the UE 704 may indicate a beam within the range of beams 720*a*-*d* by using at least one of a pair of subcarriers 770, 772, 774, 776. Similarly, the UE 704 may indicate a beam within the range of beams 720*e*-*h* by using at least one of a pair of subcarriers 770, 772, 774, 776. For example, subcarriers 770 may indicate a first beam of a range and, therefore, when the UE 704 transmits a RACH sequence on symbols 0 and 1 and subcarriers 770 (corresponding to a first beam within a range of beams), the UE 704 is indicating a selected first beam 720*a*. By way of another example, the UE 704 may indicate a selected seventh beam 722*g* by transmitting a RACH sequence on subcarriers 774 (corresponding to a third beam within a range of the beams) on symbols 2 and 3 (corresponding to the range of beams 720*e*-*h*). By way of another example, the UE 704 may indicate a selected sixth beam 720*f* by transmitting a RACH sequence on subcarriers 772 (corresponding to a second beam within a range of beams) on symbols 2 and 3 (corresponding to the range of beams 720*e*-*h*). The base station 702 may therefore determine a selected beam index based on the at least the resources on which the RACH sequence is transmitted, which are resources not included in the SR resources 742.

In another aspect, the UE 704 may use resources not included in the RACH resources 744 to indicate a selected beam. In an aspect, a BAR procedure may be configured in the UE 704. For example, if a dedicated SR for BRRS request is configured to the UE 704, a PHY layer of the UE 704 may signal a dedicated SR for BRRS request in the resources not included in the RACH resources 744.

In an aspect, the UE 704 may only transmit on the resources not included in the RACH resources 744 (including SR resources 742) when the UE 704 is timing aligned with the base station 702. The number of available cyclic shifts associated with the resources not included in the RACH resources 744 may be higher than those available in the RACH resources 744. Accordingly, there may be a higher degree of freedom associated with the resources not included in the RACH resources 744 (e.g., 192 degrees of freedom) compared to the RACH resources 744 (e.g., 48 degrees of freedom). For example, a plurality of UEs may be able to transmit requests (e.g., requests for beam tracking and/or BRRS, a BAR, etc.) on the resources not included in the RACH resources 744. That is, different cyclic shifts and/or different spreading across symbols may be used to distinguish between different UEs at the base station 702. For example, the UE 704 may transmit a Zadoff-Chu sequence in two symbols, whereas another UE may multiply a sequence with [+1, −1] and transmit that product.

In an aspect, the UE 704 may select a transmission time for SR based on symbol index of the strongest beam (e.g., a beam in which a strongest BRS is received during a synchronization subframe). In an aspect, the UE 704 may transmit an SR during a subframe 740 if instructed by a higher layer. For example, a PHY layer of the UE 704 may be provided with a plurality of parameters, including a band number $N_{SR}$, cyclic shift v, a root u, a parameter f', a system frame number (SFN), a BRS transmission period $N_{BRS}$, a number of symbols $N_{RACH}$ during the subframe 740 for which the base station 702 may apply different beams (e.g., different receive beams), a number of subframes M (e.g., number of RACH subframe) in each frame, an index of the current subframe m (e.g., current RACH subframe), a symbol with the strongest synchronization beam $S_{Sync}^{BestBeam}$. The root u may be cell specific. The UE 704 may calculate a symbol index 1 based on the SFN, $N_{BRS}$, $N_{RACH}$, M, m, and $S_{Sync}^{BestBeam}$. For example, $$l=((S_{Sync}^{BestBeam}-(SFN \cdot M \cdot N_{RACH}+m \cdot N_{RACH}) \% N_{BRS}) \cdot N_{rep},$$

Where $N_{rep}$ may denote the number of symbols dedicated to a single RACH transmission (e.g., $N_{rep}=2$).

In one aspect, at least one of the base station 702 and/or the UE 704 maintains a mapping between beams (e.g., beams 720*a*-*h* associated with a synchronization (or BRS) session and the resources not included in the RACH resources 744. That is, the UE 704 may be configured to indicate a beam index using one or more resources of a subframe 740, such as by transmitting a request 750 on at least one resource corresponding to the beam index selected by the UE 704.

For example, the UE 704 may be configured to transmit the request 750 in a symbol 0 and 1 of the subframe 740 if the selected beam index (e.g., the second beam 720b) corresponds to one of beams 720a-d. Similarly, the UE 704 may be configured to transmit the request 750 in a symbol 2 and 3 of the subframe 740 if the selected beam index corresponds to one of beams 720e-h.

In one aspect, UE 704 may indicate a specific beam within the range using at least one subcarrier. For example, the UE 704 may indicate a beam within the range of beams 720a-d by using at least one of a pair of subcarriers 760, 762, 764, 766. Similarly, the UE 704 may indicate a beam within the range of beams 720e-h by using at least one of a pair of subcarriers 760, 762, 764, 766. For example, subcarriers 760 may indicate a first beam of a range and, therefore, when the UE 704 transmits a request 750 on symbols 0 and 1 and subcarriers 760, the UE 704 is indicating a selected first beam 720a. By way of another example, the UE 704 may indicate a selected seventh beam 722g by transmitting a request on subcarriers 764 (corresponding to a third beam within a range) on symbols 2 and 3 (corresponding to the range of beams 720e-h). The base station 702 may therefore determine a selected beam index based on the at least one resource on which the request is transmitted.

Figure 8:
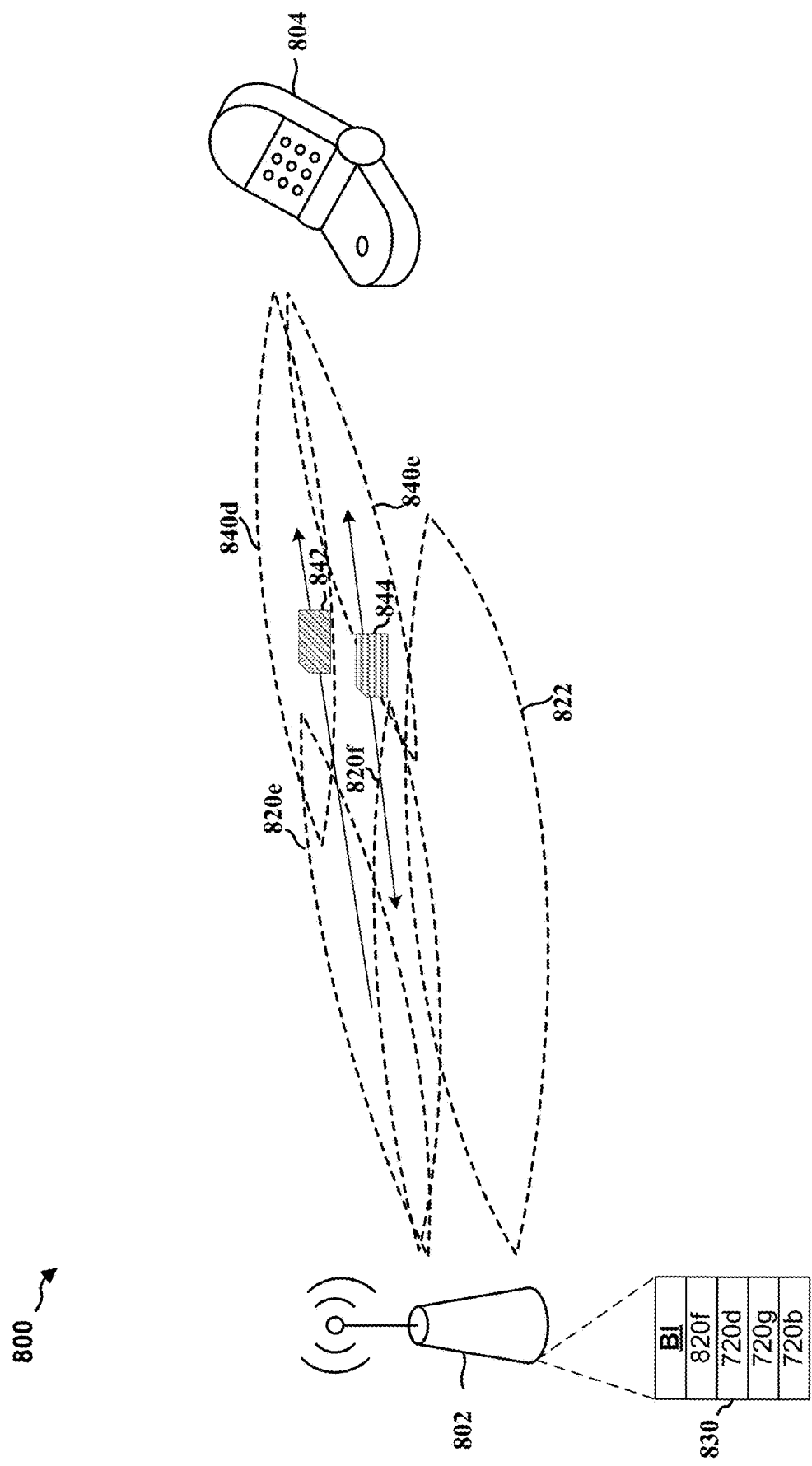
FIG. 8 is a diagram of a wireless communications system.

Referring to FIG. 8, a diagram of a wireless communications system 800 is illustrated. The base station 802 may be an aspect of the base station 702, the base station 602, the base station 502, the base station 310, the base station 102, the mmW base station 180, and/or another base station. The UE 804 may be an aspect of the UE 704, the UE 604, the UE 504, the UE 350, the UE 104, the UE 182, and/or another UE.

In FIG. 8, the UE 804 may communicate with the base station 802 using an active beam 820e (e.g., the active beam 820e may be an aspect of one of the beams 720a-h described in FIG. 7, such as the fifth beam 720e). The UE 804 may communicate with the base station 802 through a set of beams 840d-e at the UE 804. In an aspect, the active beam 802e may be paired with a first beam 840d at the UE 804, which may form an active beam pair. Similarly, the control-information beam 820f may be paired with a second beam at the UE 804, which may form a control-information beam pair. The UE 804 may identify beam pairs for communication (e.g., uplink and/or downlink communication) with the base station 802. In one aspect, the UE 804 may be configured to monitor a control channel (e.g., a PDCCH, an ePDCCH, a new radio (NR) PDCCH, etc.) on one or more beam pair links simultaneously and/or the UE 804 may monitor the control channel on different beam pair link(s) in different OFDM symbols.

The UE 804 and/or the base station 802 may each maintain a set of candidate beam indexes 830. In an aspect, the set of candidate beam indexes 830 includes at least a beam index corresponding to a control-information beam 820f (e.g., the control-information beam 820f may be an aspect of one of the beams 720a-h described in FIG. 7, such as the sixth beam 720f). The set of candidate beam indexes 830 may include additional beams 720d, 722g, 722h (e.g., as described with respect to FIG. 7). The base station 802 and/or the UE 804 may maintain to the set of candidate beam indexes 830 to include additional beams 720d, 722g, 722h that are not currently used for communication with the UE 804 (e.g., the base station 802 may generate one or more of the additional beams 720d, 722g, 722h based on a request 750 to change the active beam). In an aspect, the set of candidate beam indexes 830 may include a set of beam pairs, such as the beam pair 820f, 840e.

The UE 804 and/or the base station 802 may each maintain a set of active beam indexes, which may be similar to the set of candidate beam indexes 830. The set of active beam indexes may include one or more beam indexes to be used for communication between the base station 802 and the UE 804 (including the active beam 820e). The base station 802 and/or the UE 804 may maintain to the set of active beam indexes to include additional beams (e.g., another of beams 720a-h), which may be used for uplink or downlink communication between the base station 802 and the UE 804. In an aspect, the set of active beam indexes may include a set of beam pairs, such as the beam pair 820e, 840d.

The base station 802 and the UE 804 may maintain two sets of beams: an active set and a candidate set. The active set may include the active beam 820e. The candidate set may include at least one beam that may be a candidate for communication between the base station 802 and the UE 804 (e.g., if the active beam 820e fails). In one aspect, the candidate beam set may include the control-information beam 820f.

In one aspect, the UE 804 transmits control information on a control channel so that it is received at the base station 802 using the active beam 820e. In an aspect, the control channel may be a PUCCH. However, the base station 802 may periodically receive control information 844 carried on the control channel through a second beam. For example, the UE 804 may send control information 844 to the base station 802 using a control-information beam 820f. In an aspect, the control-information beam 820f may correspond with a second beam 840e at the UE 802. Therefore, the UE 804 may identify or select the second beam 840e through which to send the control information 844 based on usage of the control-information beam 820f instead of the active beam 820e.

In an aspect, the UE 804 and the base station 802 may be further configured to communicate using a wide beam 822. For example, the base station 802 and the UE 804 may communicate using a mmW RAT or near-mmW RAT in which beamforming weights for the active beam 820e and control-information beam 820f may have a first beam weight, whereas the wide beam 822 may have a second beam weight that is greater than the first beam weight. In an aspect, the base station 802 may sample antenna weights of the base station 802 such that a wider area of a sector associated with the base station 802 is covered. In an aspect, the wide beam 822 may have an angle that is greater than the angle of at least one of the active beam 820e and/or the control-information beam 820f. For example, the active beam 820e and/or the control-information beam 820f may have an angle of approximately five or six degrees, whereas the wide beam 822 may have an angle of approximately twenty or thirty degrees.

In one aspect, the wide beam 822 may be directed toward at least one beam at the UE 804. For example, the wide beam 822 may be directed toward the second beam 840e at the UE 804 and, therefore, when the UE 804 monitors the antenna port or subarray associated with the second beam 840e, the UE 804 may receive information transmitted by the base station 802 through the wide beam 822.

In an aspect, the UE 804 may periodically send information 844 (e.g., control information) to the base station 802 through the wide beam 822. The UE 804 may measure a signal quality or channel estimate associated with communication with the base station 802. For example, the UE 804 may measure a signal quality (e.g., SNR, SINR, received power, received quality, etc.) for a signal (e.g., a BRS, a CSI-RS, a reference signal, etc.), and the UE 804 and may send the signal quality or channel estimate to the base station 802. In various aspects, the information may include UCI, CQI, SR, and/or other control information. The base station 802 may receive the signal quality or channel estimate through the wide beam 822, for example, if the active beam 820*e* and/or the control-information beam 820*f* fail and/or become unsatisfactorily degraded.

In an aspect, the UE 804 may send the information (e.g., control information 844 on a control channel, such as a PUCCH) through the wide beam 822 without explicit signaling from the base station 802. For example, the UE 804 may determine that the UE 804 is to send information through the wide beam 822 after an absence of signaling from the base station 802 on the active beam 820*e* and/or the control-information beam 820*f*.

Accordingly, the base station 802 may receive information (e.g., the control information 844) from the UE 804 through the wide beam 822. In an aspect, the base station 802 may determine that at least one of the active beam 820*e* and/or the control-information beam 820*f* have failed and/or become unsatisfactorily degraded based on reception of the information through the wide beam 822.

In an aspect, the UE 804 may periodically send the control information 844 on the control channel through the control-information beam 820*f*. The base station 802 may estimate uplink channel quality for the control-information beam 820*f* based on the periodic reception of the control information 844 from the UE 804. In one aspect, the UE 804 may measure a quality (e.g., channel quality) associated with the active beam 820*e* and may generate the control information 844 to include an indication of the quality associated with the active beam 820*e*.

The base station 802 receive the information 844. Based on information 844, the base station 802 may determine whether the active beam 820*e* is failing and/or is unsatisfactory (e.g., the quality does not satisfy a threshold).

While FIG. 8 illustrates the communication of the information 844 through the control-information beam 820*f*, the wide beam 822 may serve as the control-information beam, as described. For example, the UE 804 may send the information 844 through a beam corresponding to a beam index included in a set of candidate beams and/or the UE 804 may send the information 844 through the wide beam 822.

The UE 804 and the base station 802 may switch to a beam corresponding to a beam index included in a the set of candidate beam indexes for communication based on the control information 844. For example, the UE 804 and the base station 802 may switch to the control-information beam 820*f* for communication (in which case the control-information beam 820*f* may become the active beam and may carry other data instead or in addition to the control information 844).

In one aspect, the UE 804 and the base station 802 may change the active beam to the control-information beam 820*f* without explicit signaling (e.g., the UE 804 does not need to transmit through RACH or SR to indicate beam index, as described in FIG. 7). For example, the UE 804 may determine that the active beam is to be changed based on the information 844 (e.g., based on a signal quality included in the information 844). Similarly, the base station 802 may determine that the active beam is to be changed based on the information 844.

In an aspect, the base station 802 may transmit, to the UE 804, information 842 indicating the periodicity at which control information is to transmitted on a control channel from the UE 804 to the base station 802. In one aspect, the base station 802 may transmit the information 842 through the active beam 820*e*. In one aspect, the base station 802 may transmit the information 842 to the UE 804 using RRC signaling. In another aspect, the base station 802 may transmit the information 842 to the UE 804 on a PDCCH. For example, the base station 802 the information 842 may indicate the periodicity to the UE 804 using one or more bits of DCI (e.g., one or more bits reserved for information 842 indicating the periodicity) and/or via a DCI format.

The UE 804 may receive the information 842 and may determine the periodicity based on the information 842. The UE 804 may periodically transmit the control information 844 to the base station 802 at the determined periodicity.

FIGS. 9A, 9B, 9C, 9D, 9E illustrate an example wireless communication environment including at least a base station 902 and UE 904. The base station 902 may be an aspect of the base station 802, the base station 702, the base station 602, the base station 502, the base station 310, the base station 102, the mmW base station 180, and/or another base station. The UE 904 may be an aspect of the UE 804, the UE 704, UE 604, the UE 504, the UE 350, the UE 104, the UE 182, and/or another UE.

The UE 904 may include one or more antenna arrays and/or one or more subarrays. The UE 904 may receive, from the base station 902, one or more reference signals (e.g., PSS/BRS, a discrete prolate spheroidal sequence (DPSS), a CSI-RS, a BRRS, etc.) through one or more beams, which may be received at multiple antennas of the UE 904 in accordance with multiple receive angle ranges, which may be detected at the UE 904 at receive combiner(s). Data communication between the base station 902 and the UE 904 may require a combination of one or more of: a best beam at the base station 902 (corresponding to a beam index), a best subarray at the UE 904 (e.g., a subarray at which a highest received power of one or more reference signals is detected), and/or a best receive combiner at the best array or subarray at the UE 904 (e.g., a receive combiner at which a highest received power of one or more reference signals is detected).

In an example, the base station 902 may sweep through the transmit directions according to a sequence A-B-C-D in order to transmit one or more reference signals (e.g., reference signals 950). In another example, the base station 902 may sweep through the transmit directions according to the sequence B-D-A-C. Although only four transmit directions and two transmit sequences are described with respect to FIG. 9A, any number of different transmit directions and transmit sequences are contemplated.

In aspects, the base station 902 may send out a reference signal (e.g., the reference signals 950) on a plurality of successive symbols, although in different directions A-B-C-D. The base station 902 may sweep through the entire sector.

Referring to diagram 920, the UE 904 may listen or detect for reference signals in different receive directions (e.g., directions E, F, G, and H). In an example, the UE 904 may sweep through the receive directions according to a sequence E-F-G-H. In another example, the UE 904 may sweep through the receive directions according to the sequence F-H-E-J. Although only four receive directions and two receive sequences are described, any number of different receive directions and receive sequences are contemplated.

In aspects, the UE 904 may try out different receive subarrays at different periods, such as four reference signal periods. The UE 904 may find the best subarray after the reference signal period(s). For example, the UE 904 may measure a signal quality for each reference signal received at a respective subarray during a respective period.

The UE 904 may determine the best subarray as the subarray having a highest signal quality measured for a reference signal, the subarray having a highest average signal quality for the set of reference signals received during the period in which that subarray is used, or another method of selecting a best subarray.

Figure 9A:
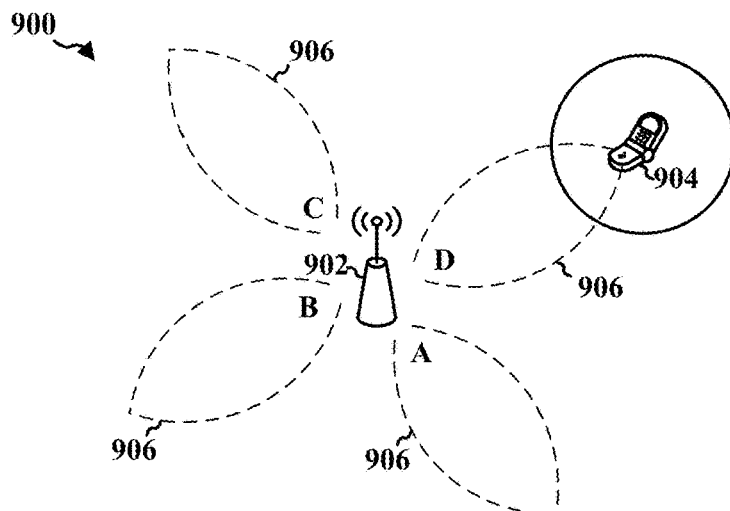
Figure 9B:
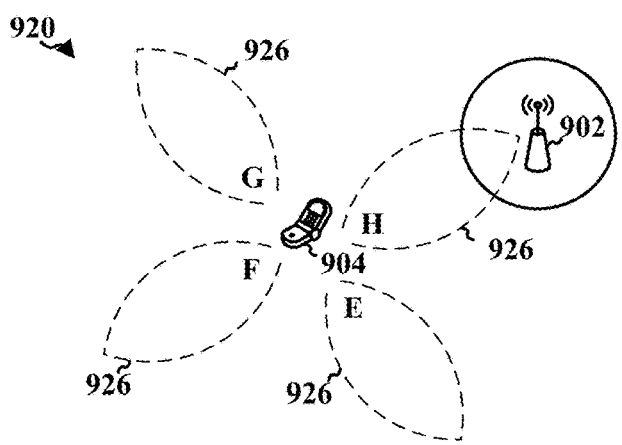
Figure 9C:
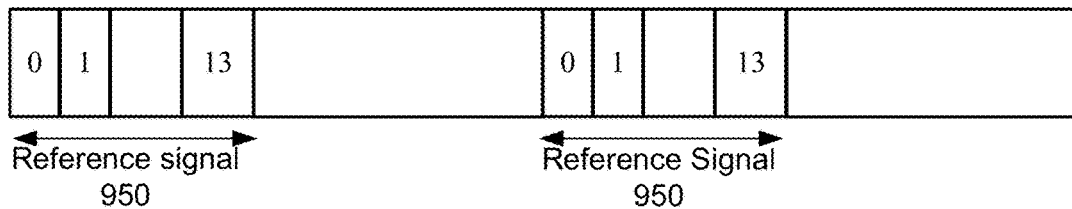

FIG. 9C illustrates an aspect of a reference signal 950. The reference signal 950 may be repeated in successive subframes, slots, or subslots. Fourteen symbols may be reserved for the reference signal 950; however, the reference signal 950 may not be transmitted during each symbol. For example, a reference signal 950 may be transmitted through a first beam on one symbol of the fourteen symbols, and another reference signal may be transmitted through a second beam on a different symbol of the fourteen symbols. The reference signal may be one or more of a PSS, SSS, BRS, BRRS, CSI-RS, DPSS, and the like.

FIG. 9D illustrates a wireless communication system 960 in which a slot 962 includes fourteen symbols. One or more of the fourteen symbols may be used for a reference signal, such as the reference signal 950. In the illustrated aspect, the base station 902 may transmit three beams 970, 972, 974 (e.g., a fine beam set). The base station 902 may transmit a reference signal through the set of beams 970, 972, 974 in the last three symbols 964, 966, 968 of the slot 962.

The base station 902 may cause the reference signal to occupy one out of every fourth tone in each symbol of the three symbols 964, 966, 968. The base station 902 may repeat the reference signal four times in each symbol of the three symbols 964, 966, 968.

In aspects, the UE 904 may try out different receive combiners at different periods, such as four reference signal periods for each of the three symbols 964, 966, 968. The UE 904 may find the best receive combiner after the reference signal period(s). For example, the UE 904 may measure a signal quality for each reference signal received at a respective receive combiner during a respective period. The UE 904 may determine a best receive combiner by determining the receive combiner at which a highest signal quality is measured for a reference signal, the receive combiner at which the highest average signal quality is measured for the set of reference signals received during the period in which the receive combiner is used, or another method of selecting a best receive combiner.

Additionally, the UE 904 may select a best beam corresponding to a beam index at the base station 902 based on the reference signals received during the three symbols 964, 966, 968. For example, the UE 904 may determine a highest signal quality corresponding to reference signal received during one of the three symbols 964, 966, 968. The UE 904 may determine a beam index corresponding to a beam at the base station 902, for example, because each set of symbols of the three symbols 964, 966, 968 may correspond to a different beam. The UE 904 may communicate with the base station 902 through the best beam corresponding to the beam index (e.g., the UE 904 may send information indicating the beam index to the base station 902).

FIG. 9E illustrates an example wireless communication environment 980 including at least a base station 902 and UE 904. In aspects, the base station 902 may need to convey one or more beam indexes to the UE 904, for example, to initiate reference signals transmission. In an aspect, the reference signal may include one or more of a MRS, BRRS, BRS, CSI-RS, PSS, SSS, DPSS, and the like. Based on the reference signal transmissions, the UE 904 may determine a best subarray and/or receive combiner at the UE 904.

The base station 902 may determine one or more indexes associated with one or more beams 972, 974, 974. According to one aspect, the base station 902 may receive one or more beam indexes corresponding to the one or more beams 972, 974, 976, for example, as BSI. The base station 902 may determine that one or more reference signals are to be transmitted through the one or more beams corresponding to the one or more beam indexes most recently indicated to the base station 902 by the UE 904.

For example, during reference signal transmission, the base station 902 may transmit different types of beams. In one aspect, the base station 902 may transmit BRS beams (e.g., coarse beams). The base station 902 may need to convey one or more indexes associated with one or more BRS beams to the UE 904. In such an aspect, nine bits may be required if the BRS duration period is four slots or subframes—e.g., the number of symbols per subframe is fourteen with eight antenna ports. The UE 904 may send, to the base station 902, information indicating one or more beam indexes corresponding to the one or more beams 972, 974, 976 through which one or more BRSs are received.

According to another aspect, the base station 902 may determine the one or more indexes associated with one or more beams 972, 974, 974 based on previously reported beams from the UE 904. For example, the base station 902 may transmit the most recent beams that the UE 904 may have reported. For example, the UE 904 may report one or more beam indexes based on one or more BRSs received through one or more beams (e.g., the beams 972, 974, 976), which may be transmitted by the base station 902 during a synchronization slot or subframe.

In aspects, the UE 904 may transmit information indicating the beam indexes (e.g., BSI) to the base station 902 through PUCCH or PUSCH (e.g., the UE 904 may be able to transmit more information through the PUSCH than the PUCCH). The set of beams used to train the UE 904 receive beams may be implicitly derived based on the latest reported information and/or channel types used to convey that information.

In one aspect, if the base station 902 schedules the reference signal in one or two symbols, the base station 902 may reuse beam information that the base station received on the PUCCH from the UE 904. In another aspect, if the base station 902 schedules the reference signal in more than two symbols, the base station 902 may reuse beam information that the base station 902 received during the PUSCH from the UE 904. The base station 902 may utilize a few bits (e.g., less than nine) to send, to the UE 904, information 990 indicating the one or more beam indexes of the one or more previously reported beams.

In another aspect, the base station 902 may determine the one or more beam indexes based on finer beams 972, 974, 974 previously transmitted to the UE 904. The finer beams 972, 974, 974 may have been previously used for transmission of one or more reference signals (e.g., MRSs, CSI-RSs, and/or BRRSs). The base station 902 may only need to transmit a few bits (e.g., less than nine) to send, to the UE 904, information 990 indicating the fine beams 972, 974, 974.

Based on the determined one or more beams indexes, the base station 902 may transmit information 990 indicating the one or more beams indexes to the UE 904. The base station 902 may transmit the information 990 on a control channel. In an aspect, the control channel may include a PDCCH. For example, the information 990 may be included in one or more bits of a DCI message of the PDCCH.

Based on the information 990, the UE 904 may determine the one or more beam indexes used for reference signals indicated by the information 990. Thereafter, the base station 902 may transmit one or more reference signals to the UE 904 through the one or more beams 972, 974, 976 corresponding to the one or more beam indexes.

The UE 904 may use the best subarray and/or receive combiner to detect the reference signal transmission. For example, the UE 904 may determine the best subarray and/or receive combiner for a symbol in which the reference signal is scheduled to be transmitted. The UE 904 may then detect for the reference signal using the determined subarray and/or receive combiner.

Figure 10A:
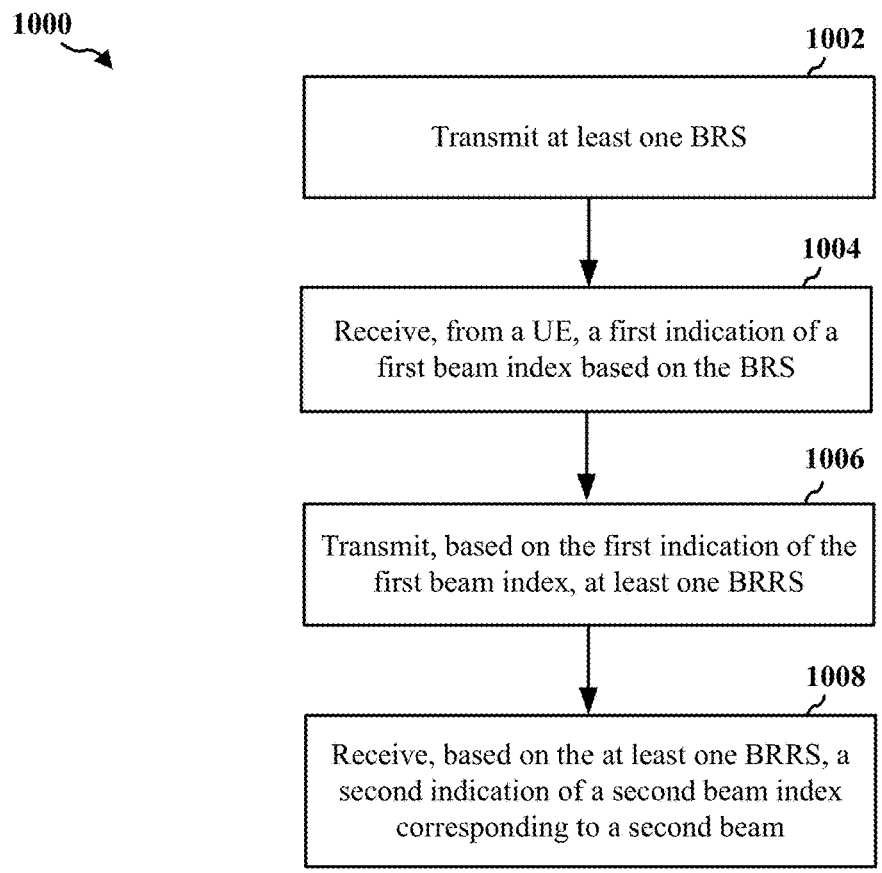
FIGS. 10A and 10B is a flowchart of a method of wireless communication.
Figure 10B:
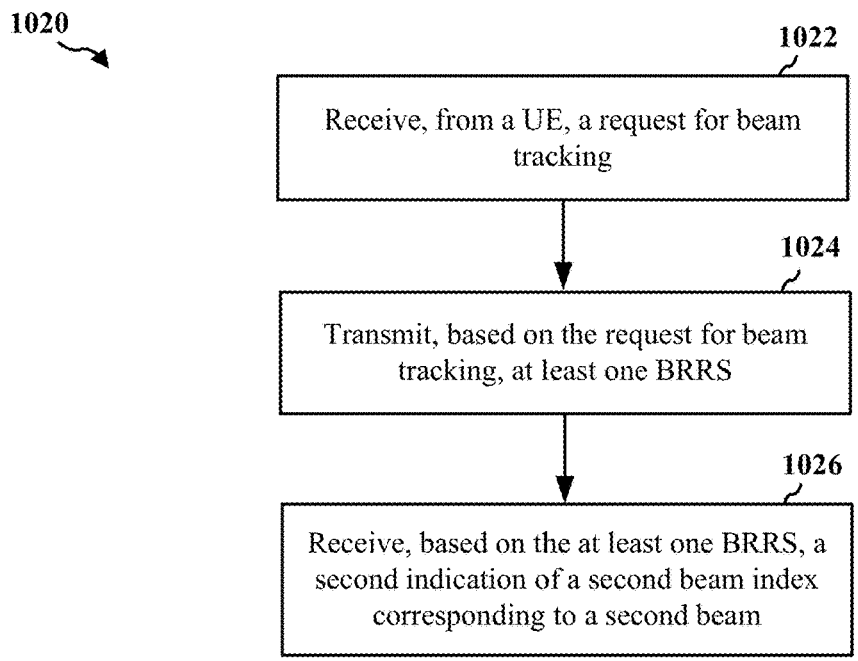

FIGS. 10A and 10B are flowcharts of method 1000, 1020 of wireless communication. The methods 1000, 1020 may be performed by a base station (e.g., the base station 602). In one aspect, the methods 1000, 1020 may be performed by an apparatus. One of ordinary skill would understand that one or more operations may be omitted, transposed, and or performed contemporaneously.

Beginning with FIG. 10A at operation 1002, the base station may transmit at least one BRS. For example, the base station may generate a set of BRSs and the base station may transmit the set of BRSs through a set of beams to be used for communication with a UE. In the context of FIG. 6, the base station 602 may transmit the set of BRSs 612a-h through the set of beams 620a-h, and each BRS of the BRSs 612a-h may correspond to a beam of the beams 620a-h.

At operation 1004, the base station may receive, from the UE, an indication of a first beam index based on the BRS. The first beam index may be a coarse beam index to be used for beam refinement. In the context of FIG. 6, the base station 602 may receive, from the UE 604, an indication of a beam index corresponding a coarse beam, such as the sixth beam 620f. The indication may be the first indication 560, as described in FIG. 5.

At operation 1006, the base station may transmit, based on the first indication of the first beam index, at least one BRRS. In the context of FIG. 6, the first indication may indicate a beam index corresponding to the sixth beam 620f, and the base station may transmit a fine beam set, such as by transmitting the BRRS 614c-f on beams 620c-f that are close to the beam indicated by the coarse beam index.

At operation 1008, the base station may receive, based on the at least one BRRS, a second indication of a second beam index corresponding to a second beam. In the context of FIG. 6, the base station 602 may receive, from the UE 604, an indication of a beam index corresponding a fine beam, such as the sixth beam 620f. The indication may be the second indication 565, as described in FIG. 5.

The base station may communicate with the UE through the beam corresponding to the index indicated in the second indication. The communication may be uplink communication and/or downlink communication.

Turning to FIG. 10B, another method 1020 is illustrated for a base station performing beam tracking. At operation 1022, the base station may receive, from a UE, a request for beam tracking. For example, the base station may receive a BAR. In the context of FIG. 6, the base station 602 may receive, from the UE 604, a request for beam tracking.

At operation 1024, the base station may transmit, based on the request for beam tracking, at least one BRRS. In the context of FIG. 6, the base station may transmit a fine beam set, such as by transmitting the BRRSs 614c-f on beams 620c-f that are close to a beam through which the base station 602 and the UE 604 previous communication (e.g., the fifth beam 620e).

At operation 1026, the base station may receive, based on the at least one BRRS, a second indication of a second beam index corresponding to a second beam. In the context of FIG. 6, the base station 602 may receive, from the UE 604, an indication of a beam index corresponding a fine beam, such as the sixth beam 620f. The indication may be the second indication 565, as described in FIG. 5.

The base station may communicate with the UE through the beam corresponding to the index indicated in the second indication. The communication may be uplink communication and/or downlink communication.

Figure 11A:
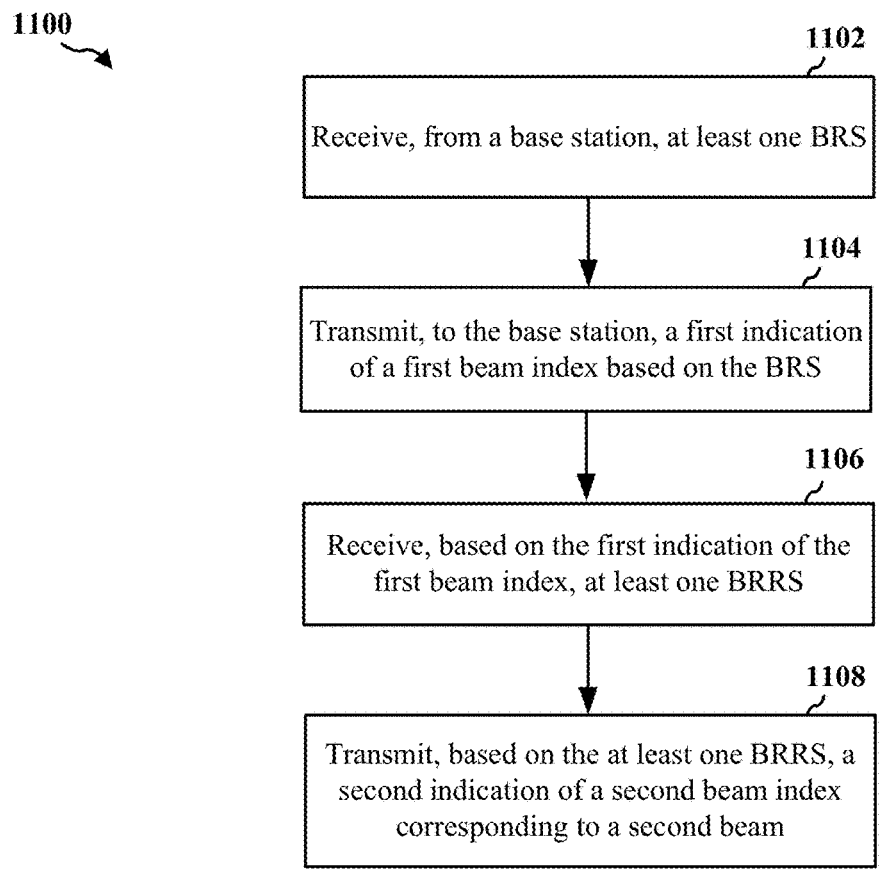
FIGS. 11A and 11B is a flowchart of a method of wireless communication.
Figure 11B:
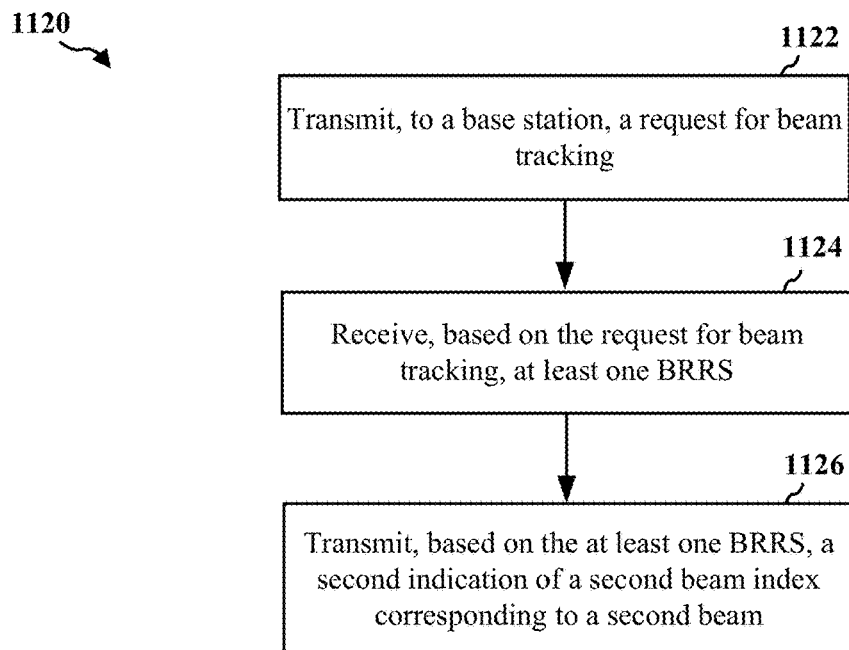

FIGS. 11A and 11B are flowcharts of method 1100, 1120 of wireless communication. The methods 1100, 1120 may be performed by a UE (e.g., the UE 604). In one aspect, the methods 1100, 1120 may be performed by an apparatus. One of ordinary skill would understand that one or more operations may be omitted, transposed, and or performed contemporaneously.

Beginning with FIG. 11A at operation 1102, the UE may receive, from a base station, at least one BRS. In the context of FIG. 6, the UE 604 may receive, from the base station 602, the set of BRSs 612a-h through the set of beams 620a-h, and each BRS of the BRSs 612a-h may correspond to a beam of the beams 620a-h.

At operation 1104, the UE may transmit, to the base station, an indication of a first beam index based on the BRS. The first beam index may be a coarse beam index to be used for beam refinement. For example, the UE may measure a signal quality or power for one or more of the received BRSs and select a beam index corresponding to a beam through which the BRS having a best or highest value is received. In the context of FIG. 6, the UE 604 may transmit, to the base station 602, an indication of a beam index corresponding a coarse beam, such as the sixth beam 620f The indication may be the first indication 560, as described in FIG. 5.

At operation 1106, the UE may receive, from the base station (e.g., based on the first indication of the first beam index), at least one BRRS. In the context of FIG. 6, the UE 604 may receive a fine beam set, such as by receiving the BRRSs 614c-f on beams 620c-f that are close to the beam indicated by the coarse beam index.

At operation 1108, the UE may transmit, based on the at least one BRRS, a second indication of a second beam index corresponding to a second beam. The second beam index may be a fine beam index to be used for communication. For example, the UE may measure a signal quality or power for one or more of the received BRRSs and select a beam index corresponding to a beam through which the BRRS having a best or highest value is received. In the context of FIG. 6, the UE 604 may transmit, to the base station 602, an indication of a beam index corresponding a fine beam, such as the sixth beam 620f. The indication may be the second indication 565, as described in FIG. 5.

The UE may communicate with the UE through the beam corresponding to the index indicated in the second indication. The communication may be uplink communication and/or downlink communication.

Turning to FIG. 11B, another method 1120 is illustrated for a base station performing beam tracking. At operation 1122, the UE may transmit, to the base station, a request for beam tracking. For example, the UE may transmit a BAR.

In the context of FIG. 6, the UE 604 may transmit, to the base station 602, a request for beam tracking 648 (e.g., a BAR).

At operation 1124, the UE may receive, from the base station based on the request for beam tracking, at least one BRRS. In the context of FIG. 6, the UE 604 may receive a fine beam set, such as by receiving the BRRS 614c-f on beams 620c-f that are close to a beam through which the base station 602 and the UE 604 previous communication (e.g., the fifth beam 620e).

At operation 1126, the UE may transmit, to the base station and based on the at least one BRRS, an indication of a beam index corresponding to a beam. For example, the UE may measure a signal quality or power for one or more of the received BRRSs and select a beam index corresponding to a beam through which the BRRS having a best or highest value is received. In the context of FIG. 6, the UE 604 may transmit, to the base station 602, an indication of a beam index corresponding a fine beam, such as the sixth beam 620f. The indication may be the second indication 565, as described in FIG. 5.

The base station may communicate with the UE through the beam corresponding to the index indicated in the indication. The communication may be uplink communication and/or downlink communication.

Figure 12:
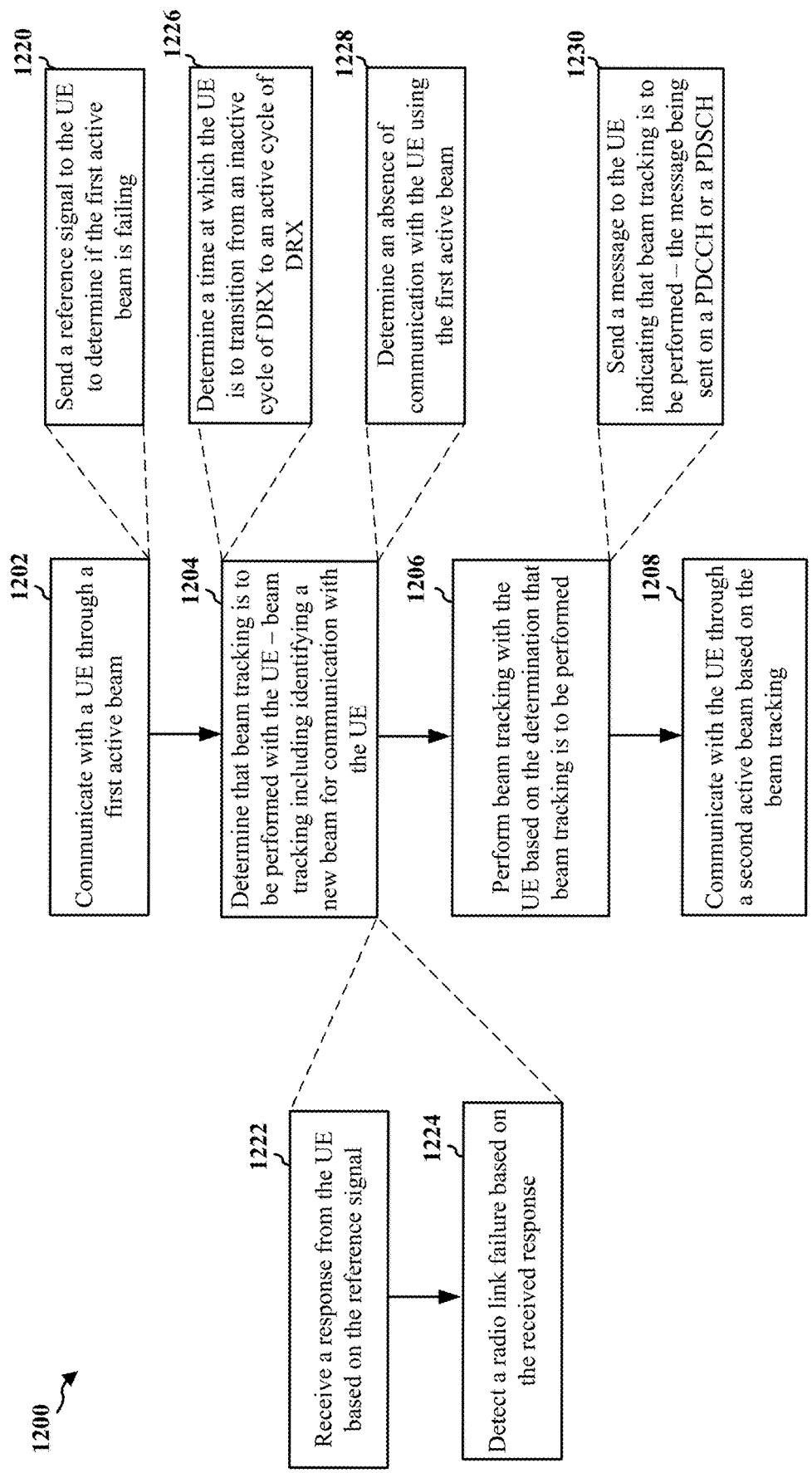
FIG. 12 is a flowchart of a method of wireless communication.

FIG. 12 is a flowchart of method 1200 of wireless communication. The method 1200 may be performed by a base station (e.g., the base station 602). In one aspect, the method 1200 may be performed by an apparatus. One of ordinary skill would understand that one or more operations may be omitted, transposed, and or performed contemporaneously.

Beginning with operation 1202, the base station may communicate with a UE through a first active beam. In an aspect, the communication may be downlink communication. For example, the base station may determine data to be transmitted to the UE and then the base station may send the determined data through the first active beam. In an aspect, the communication may be uplink communication. For example, the base station may determine a time (e.g., slot) at which the UE is scheduled to send data to the base station, and then the base station may receive the data through the first active beam at the scheduled time. In the context of FIG. 6, the base station 602 may communicate with the UE 604 through a first active beam, such as the fifth beam 620e.

In an aspect, operation 1202 may include operation 1220. At operation 1220, the base station may send, to the UE, a reference signal to determine if the first active beam is failing. In an aspect, the reference signal may be a CSI-RS, a CRS, an SSS, an MRS, a DMRS, or a BRS. In the context of FIG. 6, the base station 602 may send the reference signal 644 through the first active beam (e.g., the fifth beam 620e).

At operation 1204, the base station may determine that beam tracking is to be performed with the UE. For example, the base station may determine that the first active beam is failing, and then the base station may initiate beam tracking in order to select a new active beam. In the context of FIG. 6, the base station 602 may determine that beam tracking is to be performed with the UE 604.

In an aspect, operation 1204 may include operation 1222 and operation 1224. At operation 1222, the base station may receive a response from the UE based on a reference signal transmitted to the UE (e.g., the reference signal described at operation 1220). In an aspect, the response may include at least one of a CQI, an SINR, an SNR, an RSSI, an RSRP, or an RSRQ. In the context of FIG. 6, the base station 602 may receive, from the UE 604, the response 646.

At operation 1224, the base station may detect a radio link failure based on the received response. For example, the base station may determine that a value (e.g., a CQI, SINR, SNR, RSRP, RSRQ, etc.) may be below a threshold, and the base station may determine that the value being below the threshold indicates a radio link failure. In another example, the base station may determine that the response indicates a NACK or that the response is absent, and the base station may determine a radio link failure has occurred based on the NACK or the absence of the response. In the context of FIG. 6, the base station 602 may detect the radio link failure through the first active beam (e.g., the fifth beam 620e) based on the response 646 or based on the absence of the response 646.

In another aspect, operation 1204 may include operation 1226. At operation 1226, the base station may determine a time at which the UE is to transition from an inactive cycle of DRX to an active cycle of DRX. Because the base station and the UE may not communicate while the UE is in an inactive DRX cycle, the base station may determine that beam tracking is to be performed with the UE when the UE transition to an active cycle of DRX (e.g., because the UE may have shifted during the inactive DRX cycle). In the context of FIG. 6, the base station 602 may determine DRX cycles for the UE 604 (e.g., the base station 602 may configure DRX cycles for the UE 604), and when the UE 604 is to transition from an inactive DRX cycle to an active DRX cycle, the base station 602 may determine that the beam tracking is to be performed with the UE 604.

In another aspect, operation 1204 may include operation 1228. At operation 1228, the base station may determine an absence of communication with the UE using the first active beam. For example, the base station may determine that the base station is not receiving data from the UE when the UE is scheduled to communicate with the base station. In another example, the base station may receive one or more NACK messages that indicate an absence of communication with the UE. In the context of FIG. 6, the base station 602 may determine an absence of the communication 640 with the UE 604 using the first active beam (e.g., the fifth beam 620e).

At operation 1206, the base station may perform beam tracking with the UE based on the determination that the beam tracking is to be performed. For example, the base station may perform one or more operations described with respect to FIG. 10A and/or 10B. In the context of FIG. 6, the base station 602 may perform beam tracking with the UE 604.

In an aspect, operation 1206 includes operation 1230. At operation 1230, the base station may send, to the UE, a message indicating that beam tracking is to be performed. The base station may send the message on a PDCCH or a PDSCH. In the context of FIG. 6, the base station 602 may send, to the UE 604, the message 642 indicating that beam tracking is to be performed. The base station 602 may then perform one or more operations described with respect to FIGS. 10A and/or 10B.

At operation 1208, the base station may communicate with the UE through the second active beam based on the beam tracking. For example, the base station may receive, from the UE, an indication of a beam index corresponding to a beam at the base station. The base station may select the beam corresponding to the indicated beam index for at least one of uplink or downlink communication with the UE. In the context of FIG. 6, the base station 602 may communicate with the UE 604 through the second active beam (e.g., the sixth beam 620f).

Figure 13:
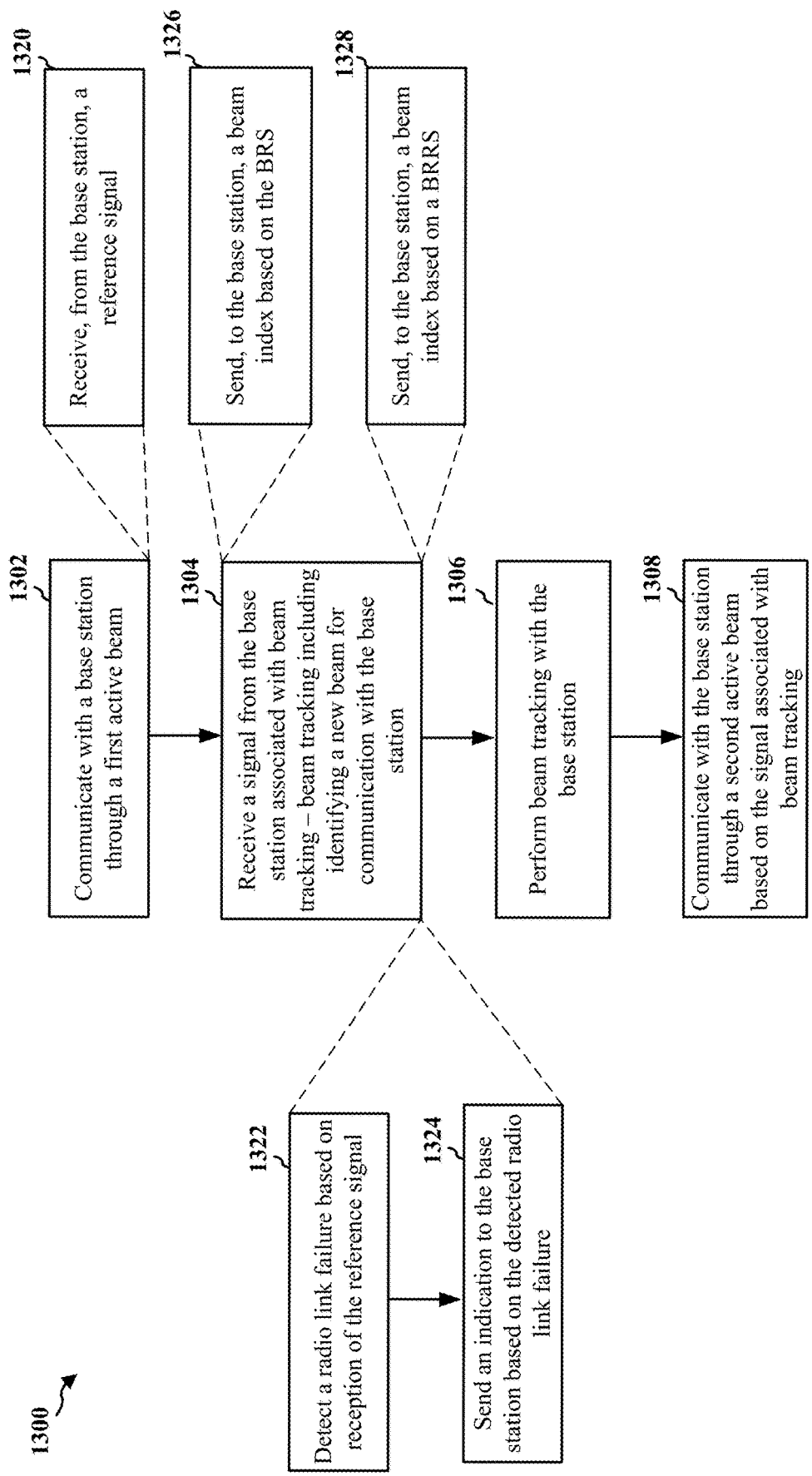
FIG. 13 is a flowchart of a method of wireless communication.

FIG. 13 is a flowchart of method 1300 of wireless communication. The method 1300 may be performed by a UE (e.g., the UE 604). In one aspect, the method 1300 may be performed by an apparatus. One of ordinary skill would understand that one or more operations may be omitted, transposed, and or performed contemporaneously.

Beginning with operation 1302, the UE may communicate with a base station through a first active beam. In an aspect, the communication may be downlink communication. For example, the UE may receive data to from the base station. In an aspect, the communication may be uplink communication. For example, the UE may determine a time (e.g., slot) at which the UE is scheduled to send data to the base station, and then the UE may transmit the data through the first active beam at the scheduled time. In the context of FIG. 6, the UE 604 may communicate with the base station 602 through a first active beam, such as the fifth beam 620e.

In an aspect, operation 1302 may include operation 1320. At operation 1320, the UE may receive, from the base station, a reference signal. In an aspect, the reference signal may be a CSI-RS, a CRS, an SSS, an MRS, a DMRS, or a BRS. In the context of FIG. 6, the UE 604 may receive, from the base station 602, the reference signal 644 through the first active beam (e.g., the fifth beam 620e).

At operation 1304, the UE may receive, from the base station, a signal associated with beam tracking. In an aspect, the signal may be the reference signal. In another aspect, the signal may be a BRS. In another aspect, the signal may be a BRRS. In another aspect, the signal may be a message indicating that beam tracking is to be performed between the UE and the base station. In the context of FIG. 6, the UE 604 may receive, from the base station 602, a signal associated with beam tracking. The signal may be a BRS of the BRSs 612a-h, a BRRS of the BRRSs 614c-f, the message 642, the reference signal 644, or another signal.

In an aspect, operation 1304 may include operation 1322 and operation 1324. At operation 1322, the UE may detect a radio link failure based on reception of the reference signal (as described at operation 1320). For example, the UE may measure a signal quality (e.g., an SINR, an SNR, a BRSRP, an RSRP, an RSRQ, or another signal quality) and compare the measured signal quality to a threshold. Based on the comparison, the UE may determine that communicate through the first active beam is failing or degraded. In the context of FIG. 6, the UE 604 may detect a radio link failure associated with the first active beam (e.g., the fifth beam 620e) based on reception of the reference signal 644.

At operation 1324, the UE may send an indication of the detected radio link failure to the base station based on the detected radio link failure. For example, the UE may send a measured signal quality associated with the reference signal (e.g., an SINR, an SNR, a BRSRP, an RSRP, an RSRQ, etc.), a CQI, or a BAR, or another indication of the detected radio link failure to the base station. In the context of FIG. 6, the UE 604 may send the response 646 to the base station 602.

In an aspect, operation 1304 may include operation 1326. At operation 1326, the UE may send, to the base station, a beam index based on a BRS. For example, the UE may measure signal qualities for a plurality of BRSs and may determine a best (e.g., highest) signal quality corresponding to a best BRS. The UE may determine a beam index corresponding to the beam through which the best BRS is received and may send the determined beam index to the base station. In an aspect, this beam index may be a coarse beam index. In the context of FIG. 6, the UE 604 may send, to the base station 602, a beam index corresponding to a beam of the beams 620a-h through which a best BRS of the BRSs 612a-h is received. For example, the UE 604 may send the first indication 560, as described in FIG. 5.

In an aspect, operation 1304 may include operation 1328. At operation 1328, the UE may send, to the base station, a beam index based on a BRRS. For example, the UE may measure signal qualities for a plurality of BRRSs and may determine a best (e.g., highest) signal quality corresponding to a best BRRS. The UE may determine a beam index corresponding to the beam through which the best BRRS is received and may send the determined beam index to the base station. In an aspect, this beam index may be a fine beam index. In the context of FIG. 6, the UE 604 may send, to the base station 602, a beam index corresponding to a beam of the beams 620c-f through which a best BRRS of the BRRSs 614c-f is received. For example, the UE 604 may send the second indication 565, as described in FIG. 5.

At operation 1306, the UE may perform beam tracking with the base station, for example, based on the signal associated with beam tracking. For example, the UE may perform one or more operations described with respect to FIG. 11A and/or 11B. For example, the UE 604 may send the request for beam tracking 648. Based on the beam tracking, the UE may determine a second beam corresponding to a second beam index for communication with the base station. In the context of FIG. 6, the UE 604 may perform beam tracking with the base station 602.

At operation 1308, the UE may communicate with the base station through the second active beam based on the beam tracking. For example, the UE may transmit, to the base station, an indication of a beam index corresponding to a beam at the base station. The UE may select second active beam for at least one of uplink or downlink communication with the UE. In the context of FIG. 6, the UE 604 may communicate with the base station 602 through the second active beam (e.g., the sixth beam 620f).

Figure 14:
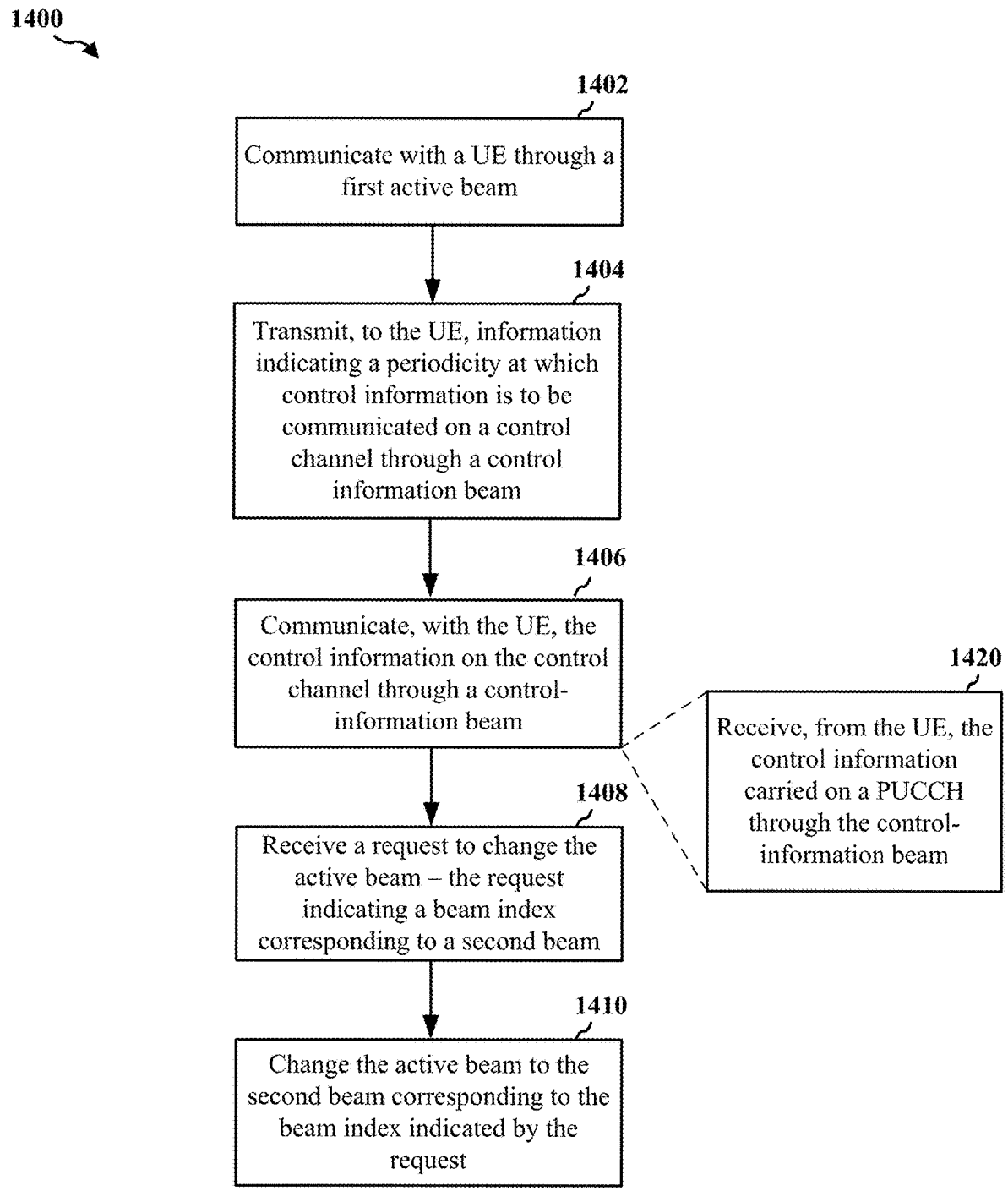
FIG. 14 is a flowchart of a method of wireless communication.

FIG. 14 is a flowchart of method 1400 of wireless communication. The method 1400 may be performed by a base station (e.g., the base station 702 and/or the base station 802). In one aspect, the method 1400 may be performed by an apparatus. One of ordinary skill would understand that one or more operations may be omitted, transposed, and or performed contemporaneously.

Beginning with operation 1402, the base station may communicate with a UE through a first active beam. In an aspect, the communication may be downlink communication. For example, the base station may determine data to be transmitted to the UE and then the base station may send the determined data through the first active beam. In an aspect, the communication may be uplink communication. For example, the base station may determine a time (e.g., slot) at which the UE is scheduled to send data to the base station, and then the base station may receive the data through the first active beam at the scheduled time. In the context of FIG. 7, the base station 702 may communicate with the UE 704 through a first active beam, such as the fifth beam 720e. In the context of FIG. 8, the base station 802 may communicate with the UE 804 through the active beam 820e.

At operation 1404, the base station may transmit, to the UE, information indicating a periodicity at which control information is to be communicated on a control channel through a control-information beam. For example, the base station may determine a periodicity at which control information is to be sent to the base station by the UE (e.g., based on one or more standards promulgated by 3GPP). The base station may generate a message that indicates the periodicity and may transmit the generated message to the UE, for example, through the active beam. In the context of FIG. 7, the base station 702 may transmit, to the UE 704, information indicating the periodicity through a current active beam, such as the fifth beam 720e. In the context of FIG. 8, the base station 802 may transmit, to the UE 804, the information 842 indicating the periodicity through the active beam 820e.

In one aspect, the base station may transmit the information indicating the periodicity to the UE through RRC signaling. In another aspect, the base station may transmit the information indicating the periodicity to the UE on a PDCCH. For example, the base station may indicate the information in DCI of the PDCCH, such as one or more bits of one or more DCI formats that are reserved for information indicating the periodicity.

At operation 1406, the base station may communicate, with the UE, the control information on the control channel through the control-information beam at the periodicity. For example, the base station may receive (e.g., attempt to receive, detect for, monitor for, etc.) the control information at each period corresponding to the indicated periodicity. The control information may include UCI, CQI, and the like. The base station may determine a quality (e.g., channel quality) associated with the active beam based on the control information. Accordingly, the base station may determine whether the active beam is satisfactory based on the control information. Alternatively, the base station may determine that the active beam is failing and/or unsatisfactory based on the control information, and the base station may determine that the active beam is to be changed. In the context of FIG. 7, the base station 702 may communicate, with the UE 704, control information on a control channel through a beam of the beams 720a-h, such as the sixth beam 720f when the fifth beam 720e is the active beam for communication between the base station 702 and the UE 704. In the context of FIG. 8, the base station 802 may communicate, with the UE 804, the information 844 on a control channel.

In one aspect, the base station may receive the control information through the control-information beam, which may be a beam corresponding to a beam index included in a set of a candidate beam indexes. In the context of FIG. 8, the base station 802 may communicate, with the UE 804, the information 844 on a control channel through the control-information beam 820f, and the beam index corresponding to the control-information beam 820f may be included in the set of candidate beam indexes 830.

In another aspect, the base station may receive the control information through the control-information beam, which may be a wide beam having an angle greater than that of the active beam. In the context of FIG. 8, the base station 802 may communicate, with the UE 804, the information 844 on a control channel through the wide beam 822 (e.g., the wide beam 822 may serve as the control-information beam).

In an aspect, operation 1406 may include operation 1420. In such an aspect, the control channel may be a PUCCH. At operation 1420, the base station may receive, from the UE, the control information carried on the PUCCH through the control-information beam. In the context of FIG. 7, the base station 702 may receive, from the UE 704, control information on a PUCCH through a beam of the beams 720a-h, such as the sixth beam 720f when the fifth beam 720e is the active beam for communication between the base station 702 and the UE 704. In the context of FIG. 8, the base station 802 may receive, from the UE 804, the information 844 on a PUCCH, for example, through the control-information beam 820f and/or the wide beam 822.

At operation 1408, the base station may receive a request to change the active beam. The request may indicate a beam index corresponding to a second beam. In an aspect, the request indicates the beam index through at least one of a cyclic shift and/or spreading across symbols. In an aspect, the request indicates the beam index through at least one of a subcarrier region (e.g., SR resources (e.g., region) of a subframe) and/or through RACH (e.g., RACH resources (e.g., region) of a subframe).

In the context of FIG. 7, the base station 702 may receive, from the UE 704, the request 750, which may indicate a beam index corresponding to a beam of the beams 720a-h. In the context of FIG. 8, the base station 802, may receive, from the UE 804, a request, which may indicate a beam index corresponding to another beam other than the current active beam 820e—e.g., the request may indicate the beam index corresponding to the control-information beam 820f, which may be a candidate beam corresponding to a beam index included in a set of candidate beam indexes (e.g., the set of candidate beam indexes 830).

At operation 1410, the base station may change the active beam to the second beam that corresponds to the beam index indicated by the request. The base station may then communicate with the UE through the second beam, which may be the new active beam. In the context of FIG. 7, the base station 702 may change the active beam to a beam of the beams 720a-h that corresponds to the beam index indicated by the request. In the context of FIG. 8, the base station 802, may change the active beam from the current active beam 820e to a second beam corresponding to the beam index indicated by the request—e.g., the base station 802 may change the active beam to the control-information beam 820f, which may be a candidate beam corresponding to a beam index included in a set of candidate beam indexes (e.g., the set of candidate beam indexes 830).

Figure 15:
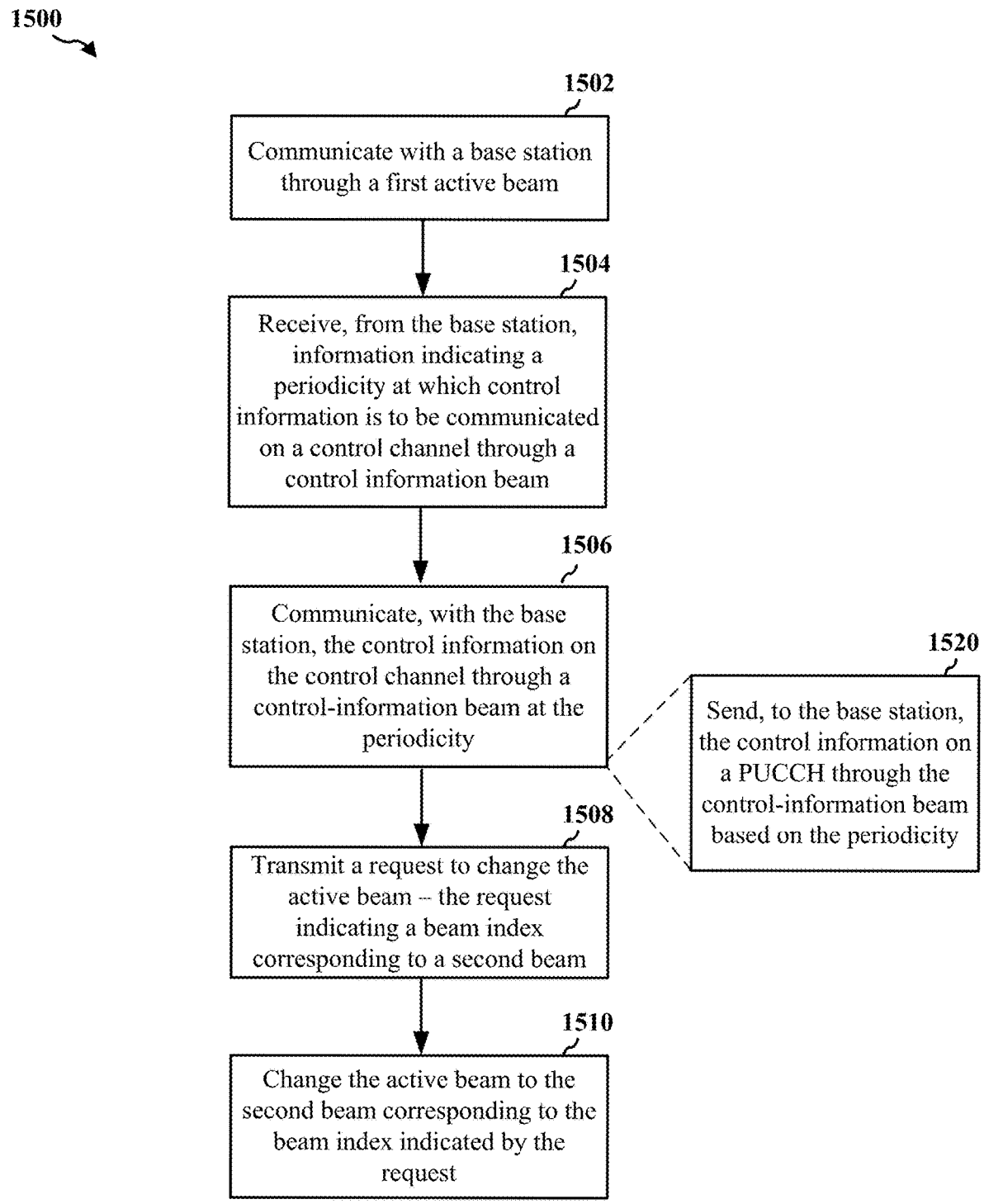
FIG. 15 is a flowchart of a method of wireless communication.

FIG. 15 is a flowchart of method 1500 of wireless communication. The method 1500 may be performed by a UE (e.g., the UE 704 and/or the UE 804). In one aspect, the method 1500 may be performed by an apparatus. One of ordinary skill would understand that one or more operations may be omitted, transposed, and or performed contemporaneously.

Beginning with operation 1502, the UE may communicate with a base station through a first active beam. In an aspect, the communication may be downlink communication. For example, the UE may receive data to from the base station. In an aspect, the communication may be uplink communication. For example, the UE may determine a time (e.g., slot) at which the UE is scheduled to send data to the base station, and then the UE may transmit the data through the first active beam at the scheduled time. In the context of FIG. 7, the UE 704 may communicate with the base station 702 through a first active beam, such as the fifth beam 720e. In the context of FIG. 8, the UE 804 may communicate with the base station 802 through the active beam 820e.

At operation 1504, the UE may receive, from the base station, information indicating a periodicity at which control information is to be communicated on a control channel through a control-information beam. For example, the UE may receive, from the base station, information that indicates the periodicity through the active beam. In the context of FIG. 7, the UE 704 may receive, from the base station 702, information indicating the periodicity through a current active beam, such as the fifth beam 720e. In the context of FIG. 8, the base station 802 may transmit, to the UE 804, the information 842 indicating the periodicity through the active beam 820e.

In one aspect, the UE may receive the information indicating the periodicity to the UE through RRC signaling. In another aspect, the UE may receive the information indicating the periodicity on a PDCCH. For example, the information may be indicated by DCI of the PDCCH, such as one or more bits of one or more DCI formats that are reserved for information indicating the periodicity. Accordingly, the UE may determine the information based on the DCI of the PDCCH.

At operation 1506, the UE may communicate, with the base station, the control information on the control channel through the control-information beam at the periodicity. For example, the UE may transmit the control information at each period corresponding to the indicated periodicity. In various aspects, the UE may measure a signal quality or channel estimate associated with communication with the base station, e.g., through the active beam. For example, the UE may measure a signal quality (e.g., SNR, SINR, received power, received quality, etc.) for a signal (e.g., a BRS, a CSI-RS, a reference signal, etc.). The UE may generate a message to indicate the signal quality or channel estimate to the base station, and the UE may send the message to the base station. In various aspects, the information may include UCI, CQI, SR, and/or other control information. In the context of FIG. 7, the UE 704 may communicate, with the base station 702, control information on a control channel through a beam of the beams 720a-h, such as the sixth beam 720f when the fifth beam 720e is the active beam for communication between the base station 702 and the UE 704. In the context of FIG. 8, the base station 802 may communicate, with the UE 804, the information 844 on a control channel.

In one aspect, the UE may send the control information through the control-information beam, which may be a beam corresponding to a beam index included in a set of a candidate beam indexes. In the context of FIG. 8, the UE 804 may send, to the base station 802, the information 844 on a control channel through the control-information beam 820f, and the beam index corresponding to the control-information beam 820f.

In another aspect, the UE may send the control information through the control-information beam, which may be a wide beam having an angle greater than that of the active beam. In the context of FIG. 8, the UE 804 may send, to the base station 802, the information 844 on a control channel through the wide beam 822 (e.g., the wide beam 822 may serve as the control-information beam).

In an aspect, operation 1506 may include operation 1520. In such an aspect, the control channel may be a PUCCH. At operation 1520, the UE may send, to the base station, the control information on the PUCCH through the control-information beam. In the context of FIG. 7, the UE 704 may send, to the base station 702, control information on a PUCCH through a beam of the beams 720a-h, such as the sixth beam 720f when the fifth beam 720e is the active beam for communication between the base station 702 and the UE 704. In the context of FIG. 8, the UE 804 may send, to the base station 802, the information 844 on a PUCCH, for example, through the control-information beam 820f and/or the wide beam 822.

At operation 1508, the UE may send, to the base station, a request to change the active beam. The request may indicate a beam index corresponding to a second beam. For example, the UE may determine that the active beam is failing and/or unsatisfactory based on the measured signal quality (e.g., based on comparison of the measured signal quality to a threshold). Accordingly, the UE may request the base station to change the active beam because the current active beam is failing and/or unsatisfactory. In an aspect, the request indicates the beam index through at least one of a cyclic shift and/or spreading across symbols. In an aspect, the request indicates the beam index through at least one of a subcarrier region (e.g., SR resources (e.g., region) of a subframe) and/or through RACH (e.g., RACH resources (e.g., region) of a subframe).

In the context of FIG. 7, the UE 704 may transmit, to the base station 702, the request 750, which may indicate a beam index corresponding to a beam of the beams 720a-h. In the context of FIG. 8, the UE 804 may transmit, to the base station 802, a request, which may indicate a beam index corresponding to another beam other than the current active beam 820e—e.g., the request may indicate the beam index corresponding to the control-information beam 820f, which may be a candidate beam corresponding to a beam index included in a set of candidate beam indexes (e.g., the set of candidate beam indexes 830).

At operation 1510, the UE may change the active beam to the second beam that corresponds to the beam index indicated by the request. The UE may then communicate with the base station through the second beam, which may be the new active beam. In the context of FIG. 7, the UE 704 may change the active beam to a beam of the beams 720a-h that corresponds to the beam index indicated by the request. In the context of FIG. 8, the UE 804, may change the active beam from the current active beam 820e to a second beam corresponding to the beam index indicated by the request— e.g., the UE 804 may change the active beam to the control-information beam 820f, which may be a candidate beam corresponding to a beam index included in a set of candidate beam indexes (e.g., the set of candidate beam indexes 830).

Figure 16:
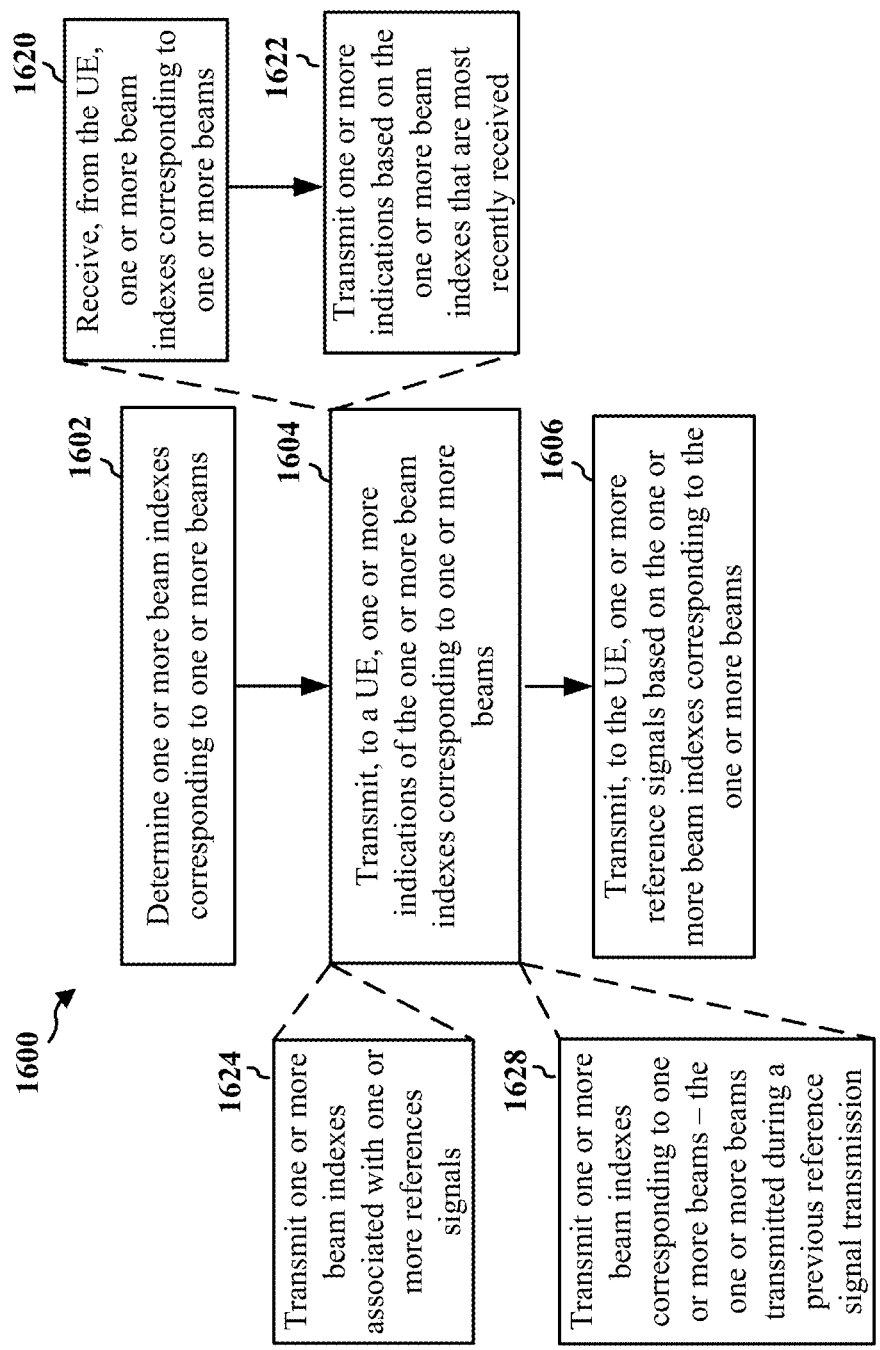
FIG. 16 is a flowchart of a method of wireless communication.

FIG. 16 illustrates a flowchart 1600 of a method of wireless communication. The method may be performed by a base station (e.g., the base station 902) communicating with a UE (e.g., the UE 904). One of ordinary skill would understand that one or more operations may be omitted, transposed, and or performed contemporaneously.

At operation 1602, the base station may determine one or more indexes associated with one or more beams. For example, the base station may receive BSI from the UE that includes one or more beam indexes corresponding to one or more beams of the base station. The base station may then identify a fine beam set based on BSI received from the UE. In the context of FIG. 9A-E, the base station 902 may determine one or more indexes corresponding to the one or more beams 970, 972, 974.

At operation 1604, the base station may transmit, to a UE, one or more indications of the one or more beam indexes. In various aspects, the one or more indications may be carried on a control channel, such as a PDCCH. For example, the one or more indications may be indicated through a DCI message of the PDCCH. In the context of FIG. 9A-E, the base station 902 may transmit the information 990 to the UE 904.

In an aspect, operation 1604 includes operations 1620 and 1622. At operation 1620, the base station may receive, from the UE, information indicating one or more indexes corresponding to one or more beams. In one aspect, the one or more indexes may be received from the UE through a PUSCH or a PUCCH. In one aspect, the information indicating the one or more beam indexes may be one or more BSI reports. In the context of FIG. 9A-E, the base station 902 may receive, from the UE 904, one or more indexes associated with one or more beams.

At operation 1622, the base station may transmit one or more indexes based on the one or more indexes that are most recently received from the UE. In one aspect, the base station may transmit one or more indexes based on one or more indexes received from the UE through the PUSCH when more than two symbols are reserved for reference signal transmission. In another aspect, the base station may transmit one or more indexes based on one or more indexes received from the UE through the PUCCH if one or two symbols are reserved for reference signal transmission. In the context of FIG. 9A-E, the base station 902 may transmit the information 990 indicating the one or more indexes to the UE 904 based on the one or more indexes that are most recently received from the UE 904.

In one aspect, operation 1604 may include operation 1624. At operation 1624, the base station may transmit one or more indexes associated with one or more beam reference signals (e.g., one or more BRSs). The one or more beam reference signals may be transmitted during a synchronization subframe. In the context of FIG. 9A-E, the base station 902 may transmit one or more indexes associated with one or more beam reference signals, which may be used for coarse beam training with the UE 904.

In one aspect, operation 1604 may include operation 1628. At operation 1628, the base station may transmit one or more indexes corresponding to one or more beams that were transmitted during a previous reference signal transmission (e.g., CSI-RS or BRRS transmission). In the context of FIG. 9A-E, the base station 902 may transmit the information 990 indicating the one or more beam indexes associated with one or more beams that were transmitted during a previous reference signal transmission to the UE 904.

At operation 1606, the base station may transmit, to the UE, a reference signal based on the one or more Dis associated with the one or more beams (e.g., as determined at operation 1602). In various aspects, the reference signal may be a CSI-RS, a BRRS, an MRS, or another reference signal described herein. In the context of FIG. 9A-E, the base station 902 may transmit, to the UE 904, one or more reference signals based on the one or more indexes associated with the one or more beams.

Figure 17:
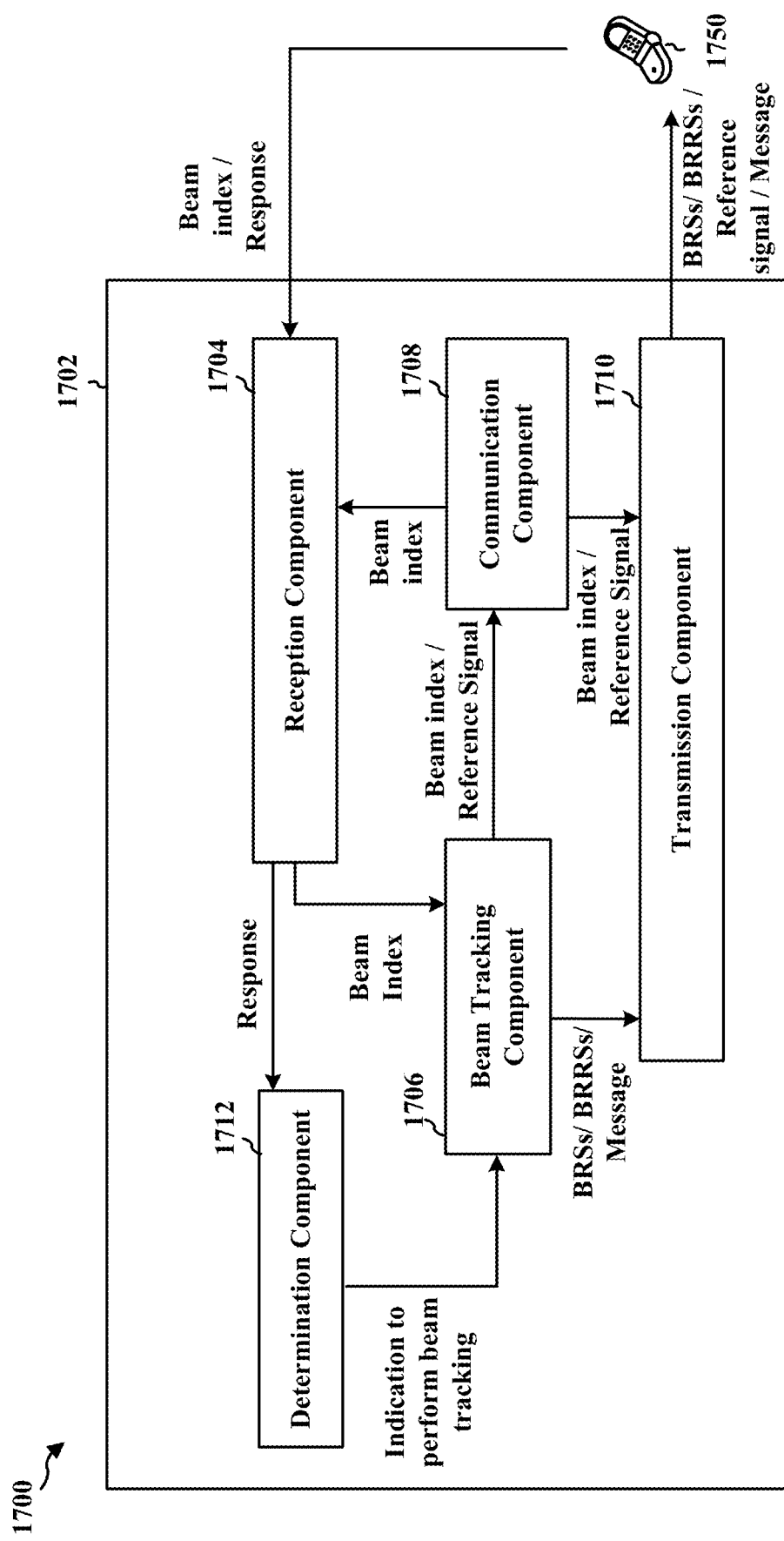
FIG. 17 is a conceptual data flow diagram illustrating the data flow between different means/components in an exemplary apparatus.

FIG. 17 is a conceptual data flow diagram 1700 illustrating the data flow between different means/components in an exemplary apparatus 1702. The apparatus may be a base station (e.g., the base station 602). The data flow illustrated in the diagram 1700 is to be regarded as illustrative. Therefore, one or more additional means/components may be present, and one or more illustrated means/components may be absent, according to various aspects. Further, various data flow may occur between means/components in addition to and/or instead of the illustrated data flow.

The apparatus 1702 may include a reception component 1704 configured to receive signals from a UE (e.g., the UE 1750, a mmW UE, etc.). The apparatus 1702 may further include a transmission component 1710 configured to transmit signals to a UE (e.g., the UE 1750, a mmW UE, etc.).

The apparatus 1702 may include a communication component 1708. The communication component 1708 may be configured to determine a beam corresponding to a beam index. The communication component 1708 may provide an indication of the beam index to the reception component 1704 so that the reception component 1704 may receive data from the UE 1750 through the beam corresponding to the beam index. The communication component 1708 may provide an indication of the beam index to the transmission component 1710 so that the transmission component 1710 may transmit data to the UE 1750 through the beam corresponding to the beam index. The beam through which the apparatus 1702 communicates with the UE 1750 may be an active beam.

In an aspect, the communication component 1708 may generate a reference signal. The reference signal may be a CSI-RS, a CRS, an SSS, an MRS, a DMRS, or a BRS. The communication component 1708 may cause the transmission component 1710 to transmit the reference signal to the UE 1750 through a first active beam. In aspect, the communication component 1708 may cause the reference signal to be transmitted through a first RAT having a first carrier frequency (e.g., a 5G RAT, a mmW RAT, and/or a near-mmW RAT).

The apparatus 1702 may include a determination component 1712. The determination component 1712 may be configured to determine that beam tracking is to be performed with the UE 1750. Beam tracking may include selection or identification of an active beam through which the apparatus 1702 is to communicate with the UE 1750. The determination component 1712 may provide an indication that beam tracking is to be performed to the beam tracking component 1706 in order to perform beam tracking.

In one aspect, the determination component 1712 may be configured to determine a time at which the UE 1750 is to transition from an inactive cycle of DRX to an active cycle of DRX. The determination component 1712 may determine that beam tracking is to be performed when the UE 1750 transition to the active cycle of DRX. The determination component 1712 may indicate, to the beam tracking component 1706, that beam tracking is to be performed with the UE 1750 at the time at which the UE 1750 transition from the inactive cycle of DRX to the active cycle of DRX.

In one aspect, the determination component 1712 may be configured to determine that beam tracking is to be performed with the UE 1750 based on a response to the reference signal received from the UE 1750. In an aspect, the response may be received through a second RAT having a different carrier frequency than the first RAT—e.g., the second RAT may have a lower carrier frequency than the first RAT, and the second RAT may be a sub-6 GHz RAT and/or LTE RAT). In an aspect, the response may include at least one of a CQI, an SINR, an SNR, an RSSI, a BRSRP, an RSRP, or an RSRQ. Thus, the response may indicate, to the determination component 1712, a signal quality. The determination component 1712 may compare the signal quality to a threshold and determine that beam tracking is to be performed based on the comparison of the signal quality to the threshold.

In one aspect, the determination component 1712 may detect a radio link failure, for example, based on the response, an absence of the response, or at least one NACK message. The determination component 1712 may determine that beam tracking is to be performed based on the detected radio link failure.

In one aspect, the determination component 1712 may determine an absence of communication with the UE 1750 through the current active beam. The determination component 1712 may determine that beam tracking is to be performed based on the absence of communication. For example, the determination component 1712 may determine an absence of communication using a current active beam based on an absence of data carried on a PUCCH (e.g., when the UE 1750 is scheduled to communicate uplink data on the PUCCH), an absence of data carried on a PUSCH (e.g., when the UE 1750 is scheduled to communicate uplink data on the PUSCH), and/or an absence of ACK/NACK messages from the UE 1750 (e.g., in response to downlink data communicated to the UE 1750).

In one aspect, the beam tracking component 1706 may perform beam tracking with the UE 1750. Beam tracking may allow the apparatus 1702 to select or identify an active beam (e.g., a new beam) for communication with the UE 1750. In an aspect, the beam tracking component 1706 may cause the transmission component 1710 to transmit one or more BRSs (e.g., a coarse beam set). The beam tracking component 1706 may receive, through the reception component 1704, a first indication of a first beam index based on one or more of the BRSs. The first beam index may be a coarse beam index. Based on the first beam index, the beam tracking component 1706 may select or identify a fine set of beams through which one or more BRRSs are to be transmitted, for example, for beam refinement. The beam tracking component 1706 may select or identify the fine beam set as one or more beams that are proximate or close to the beam corresponding to the first beam index. The beam tracking component 1706 may then transmit one or more BRRSs through the fine set of beams. The beam tracking component 1706 may receive, through the reception component 1704, a second indication of a second beam index based on one or more of the BRRSs. The second beam index may be a fine beam index. Based on the second beam index, the beam tracking component 1706 may select or identify a fine beam through the communication component 1708 is to communicate with the UE 1750. The beam tracking component 1706 may indicate, to the communication component 1708, the second beam index, which may be a new active beam for communication (e.g., uplink and/or downlink communication) with the UE 1750.

In one aspect, the beam tracking component 1706 may receive, through the reception component 1704, a request to perform beam tracking (e.g., a BAR) from the UE 1750. Based on the request to perform beam tracking, the beam tracking component 1706 may select or identify a fine set of beams through which one or more BRRSs are to be transmitted, for example, for beam refinement. The beam tracking component 1706 may select or identify the fine beam set as one or more beams that are proximate or close to a beam used for communication with the UE 1750 (e.g., a most recent beam through which the apparatus 1702 communicated with the UE 1750). The beam tracking component 1706 may then transmit one or more BRRSs through the fine set of beams. The beam tracking component 1706 may receive, through the reception component 1704, an indication of a beam index based on one or more of the BRRSs. The beam index may be a fine beam index. Based on the beam index, the beam tracking component 1706 may select or identify a fine beam through the communication component 1708 is to communicate with the UE 1750. The beam tracking component 1706 may indicate, to the communication component 1708, the beam index, which may be a new active beam for communication (e.g., uplink and/or downlink communication) with the UE 1750.

In an aspect, the beam tracking component 1706 may indicate, to the UE 1750, that beam tracking is to be performed by causing transmission of a message. For example, the beam tracking component 1706 may cause transmission of a message indicating that beam tracking is to be performed, and the message may be carried on a PDCCH or a PDSCH. In an aspect, the message may be sent through DCI in the PDCCH.

The apparatus 1702 may include additional components that perform each of the blocks of the algorithm in the aforementioned flowcharts of FIGS. 10A, 10B, and/or 12. As such, each block in the aforementioned flowcharts of FIGS. 10A, 10B, and/or 12 may be performed by a component and the apparatus 1702 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
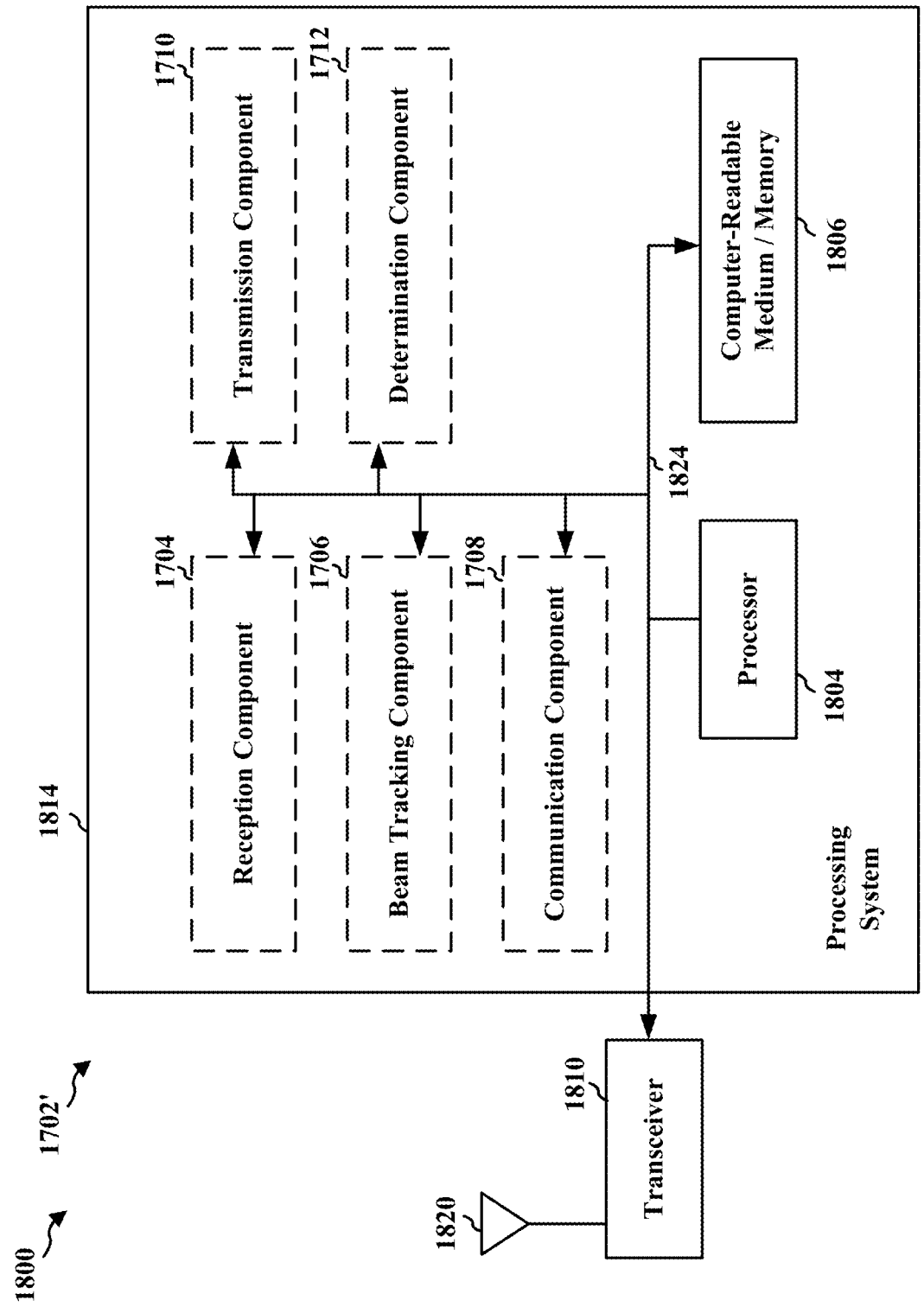
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, 1712 and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1710, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710, 1712. The components may be software components running in the processor 1804, resident/stored in the computer readable medium/memory 1806, one or more hardware components coupled to the processor 1804, or some combination thereof. The processing system 1814 may be a component of the base station 310 and may include the memory 376 and/or at least one of the TX processor 316, the RX processor 370, and the controller/processor 375.

In one configuration, the apparatus 1702/1702' for wireless communication includes means for communicating with a UE through a first active beam. The apparatus 1702/1702' may further include means for determining that beam tracking is to be performed with the UE—the beam tracking including identifying a new beam for communication between the UE and the base station. The apparatus 1702/1702' may further include means for performing beam tracking with the UE based on the determination that beam tracking is to be performed. The apparatus 1702/1702' may further include means for communicating with the UE through a second active beam based on the beam tracking.

In an aspect, the means for determining that beam tracking is to be performed for the UE is configured to determine a time at which the UE is to transition from an inactive cycle of DRX to an active cycle of DRX, and the means for performing the beam tracking is configured to perform the beam tracking based on the determined time.

In an aspect, the means for performing the beam tracking is configured for one or more of: transmission of at least one beam reference signal; reception, from the UE, of a first indication of a first beam index based on the beam reference signal; transmission, based on the first indication of the first beam index, of at least one beam refinement reference signal; and reception, based on the at least one beam refinement reference signal, of a second indication of a second beam index, the second beam index corresponding to the second active beam.

In an aspect, the means for performing the beam tracking is configured for one or more of: reception, from the UE, of a request for beam tracking; transmission, based on the request for beam tracking, of at least one beam refinement reference signal; and reception, based on the at least one beam refinement reference signal, of an indication of a beam index, the beam index corresponding to the second active beam.

In an aspect, the means for communicating with the UE through the first active beam is configured to send a reference signal to the UE to determine if the first active beam is failing, and the means for determining that beam tracking is to be initiated for the UE is configured to receive a response from the UE based on the reference signal; and detect a radio link failure based on the received response.

In an aspect, the communication with the UE through the first active beam is performed with a first RAT, and the response is received through a second RAT, the second RAT having a lower carrier frequency than the first RAT. In an aspect, the reference signal is one of a CSI-RS, a CRS, an SSS, an MRS, a DMRS, or a BRS, and the response includes at least one of a CQI, an SINR, an SNR, an RSSI, an RSRP, or a RSRQ.

In an aspect, the means for performing beam tracking with the UE is configured to send a message to the UE indicating that beam tracking is to be performed, and the message is sent on a PDCCH or a PDSCH. In an aspect, the message is sent through DCI in the PDCCH.

In an aspect, the means for determining that beam tracking is to be initiated for the UE is configured to determine an absence of communication with the UE through the first active beam. In an aspect, the determination of the absence of the communication with the UE through the first active beam is based on an absence of data carried on a PUCCH, an absence of data carried on a PUSCH, or an absence of ACK/NACK messages from the UE.

The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 19:
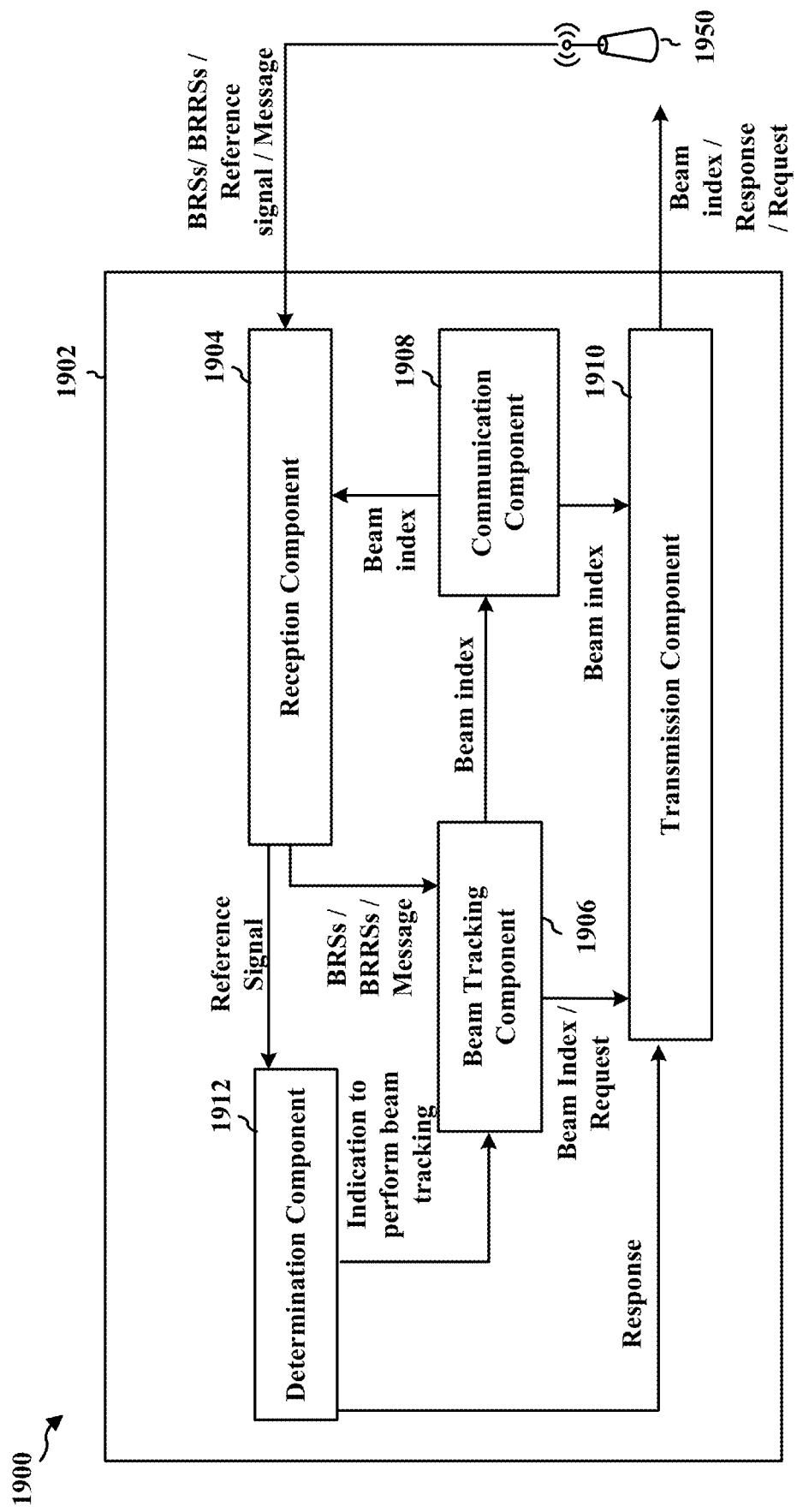
FIG. 19 is a conceptual data flow diagram illustrating the data flow between different means/components in an exemplary apparatus.

FIG. 19 is a conceptual data flow diagram 1900 illustrating the data flow between different means/components in an exemplary apparatus 1902. The apparatus may be a UE (e.g., the UE 604). The data flow illustrated in the diagram 1900 is to be regarded as illustrative. Therefore, one or more additional means/components may be present, and one or more illustrated means/components may be absent, according to various aspects. Further, various data flow may occur between means/components in addition to the illustrated data flow.

The apparatus 1902 may include a reception component 1904 configured to receive signals from a base station (e.g., the base station 1950, a mmW base station, an eNB, etc.). The apparatus 1902 may further include a transmission component 1910 configured to transmit signals to a base station (e.g., the base station 1950, a mmW base station, an eNB, etc.).

In an aspect, The apparatus 1902 may include a communication component 1908. The communication component 1908 may be configured to determine a beam corresponding to a beam index, which may be a beam and corresponding beam index at the base station 1950. The communication component 1908 may provide an indication of the beam index to the reception component 1904 so that the reception component 1904 may receive data from the base station 1950 through the beam corresponding to the beam index. The communication component 1908 may provide an indication of the beam index to the transmission component 1910 so that the transmission component 1910 may transmit data to the base station 1950 through the beam corresponding to the beam index. The beam through which the apparatus 1902 communicates with the base station 1950 may be an active beam.

In one aspect, the beam tracking component 1906 may perform beam tracking with the base station 1950. Beam tracking may allow the apparatus 1902 to select or identify an active beam (e.g., a new beam) for communication with the base station 1950. In an aspect, the beam tracking component 1906 may receive, through the reception component 1904, one or more BRSs (e.g., a coarse beam set). The beam tracking component 1906 may measure respective signal qualities for one or more received BRSs and may select a best beam corresponding to a best (e.g., highest) signal quality for a received BRS. The beam tracking component 1906 may transmit, through the transmission component 1910, a first indication of a first beam index corresponding to the selected best beam. The first beam index may be a coarse beam index. Based on the first beam index, the beam tracking component 1906 may receive one or more BRRSs, e.g., through a fine set of beams. The beam tracking component 1906 may select a fine beam based on the one or more BRRSs (e.g., the beam tracking component may select a best beam based on a best or highest signal quality for a BRRS). The beam tracking component 1906 may transmit, through the transmission component 1910, a second indication of a second beam index corresponding to a BRRS having a best or highest signal quality. The second beam index may be a fine beam index. The beam tracking component 1906 may indicate, to the communication component 1908, the second beam index, which may be a new active beam for communication (e.g., uplink and/or downlink communication) with the base station 1950.

In one aspect, the beam tracking component 1906 may transmit, through the transmission component 1910, a request to perform beam tracking (e.g., a BAR). Based on the request for beam tracking, the beam tracking component 1906 may receive one or more BRRSs, e.g., through a fine set of beams. The beam tracking component 1906 may select a fine beam based on the one or more BRRSs (e.g., the beam tracking component may select a best beam based on a best or highest signal quality for a BRRS). The beam tracking component 1906 may transmit, through the transmission component 1910, an indication of a beam index corresponding to a BRRS having a best or highest signal quality. The beam index may be a fine beam index. The beam tracking component 1906 may indicate, to the communication component 1908, the second beam index, which may be a new active beam for communication (e.g., uplink and/or downlink communication) with the base station 1950.

In an aspect, the beam tracking component 1906 may receive, from the base station 1950, a message (e.g., signal) indicating that beam tracking is to be performed. For example, the beam tracking component 1906 may receive, through the reception component 1904, a message indicating that beam tracking is to be performed, and the message may be carried on a PDCCH or a PDSCH. In an aspect, the message may be received through DCI in the PDCCH.

The apparatus 1902 may include a determination component 1912. The determination component 1912 may be configured to determine that beam tracking is to be performed with the base station 1950. Beam tracking may include selection or identification of an active beam through which the apparatus 1902 is to communicate with the base station 1950. The determination component 1912 may provide an indication that beam tracking is to be performed to the beam tracking component 1906 in order to perform beam tracking.

In one aspect, the determination component 1912 may be configured to receive, through the reception component 1904, a signal associated with beam tracking. In one aspect, the signal may be a BRS or BRRS. In another aspect, the signal may be a reference signal. The reference signal may be one of a CSI-RS, a CRS, an SSS, an MRS, a DMRS, or the like.

In one aspect, the determination component 1912 may be configured to cause the transmission component 1910 to transmit a response to the reference signal. In various aspects, the response may include one of a CQI, an SINR, an SNR, an RSSI, a BRSRP, an RSRP, or an RSRQ. For example, the determination component 1912 may measure a signal quality (e.g., an SINR, an SNR, an RSSI, a BRSRP, an RSRP, an RSRQ, etc.) based on the reference signal. The determination component 1912 may generate a response that includes the measured signal quality.

In an aspect, the determination component 1912 may receive the signal through a first RAT (e.g., a 5G RAT, a mmW RAT, a near-mmW RAT, etc.). However, the determination component 1912 may cause transmission of the response through a second RAT having a different carrier frequency than the first RAT—e.g., the second RAT may have a lower carrier frequency than the first RAT, and the second RAT may be a sub-6 GHz RAT and/or LTE RAT.

In one aspect, the determination component 1912 may detect a radio link failure, for example, based on the signal (e.g., reference signal). For example, the determination component 1912 may measure a signal quality of the reference signal. The determination component 1912 may compare the signal quality to a threshold and detect a radio link failure based on comparison of the measured signal quality to the threshold. The determination component 1912 may determine that beam tracking is to be performed based on the detected radio link failure. The determination component 1912 may cause the transmission component 1910 to transmit, to the base station 1950, an indication of the detected radio link failure and/or the determination component 1912 may indicate to the beam tracking component 1906 that beam tracking is to be performed, for example, to recover an active beam for communication.

The apparatus may include additional components that perform each of the blocks of the algorithm in the aforementioned flowcharts of FIGS. 11A, 11B, and/or 13. As such, each block in the aforementioned flowcharts of FIGS. 11A, 11B, and/or 13 may be performed by a component and the apparatus 1902 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
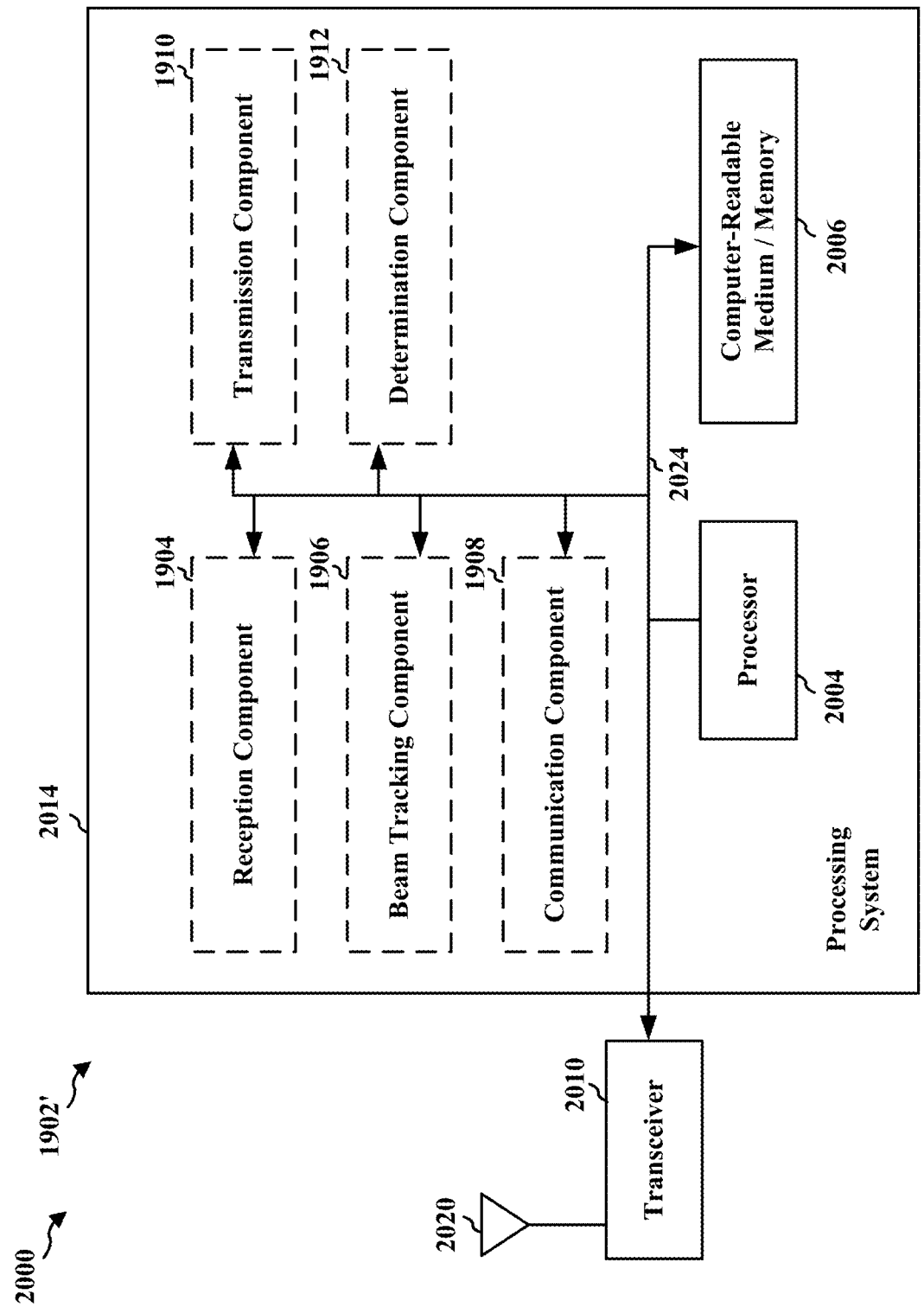
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, the components 1904, 1906, 1908, 1910, 1912, and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 1904. In addition, the transceiver 2010 receives information from the processing system 2014, specifically the transmission component 1910, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system 2014 further includes at least one of the components 1904, 1906, 1908, 1910, 1912. The components may be software components running in the processor 2004, resident/stored in the computer readable medium/memory 2006, one or more hardware components coupled to the processor 2004, or some combination thereof. The processing system 2014 may be a component of the UE 350 and may include the memory 360 and/or at least one of the TX processor 368, the RX processor 356, and the controller/processor 359.

In one configuration, the apparatus 1902/1902' for wireless communication includes means for communicating with a base station through a first active beam. The apparatus 1902/1902' may further include means for receiving a signal from the base station associated with beam tracking, the beam tracking including identifying a new beam for communication between the apparatus 1902/1902' and the base station. The apparatus 1902/1902' may further include means for communicating with the base station through a second active beam based on the signal associated with beam tracking.

In an aspect, the signal includes a BRRS, and the apparatus 1902/1902' further includes means for sending, to the base station, a beam index corresponding to the second active beam based on the BRRS. In an aspect, the signal includes a BRS, and the apparatus 1902/1902' further includes means for sending, to the base station, a beam index corresponding to a coarse beam. In an aspect, the apparatus 1902/1902' may further includes means for sending, to the base station, a request to perform beam tracking based on the signal.

In an aspect, the means for communicating with the base station through the first active beam is configured to receive a reference signal, and the apparatus 1902/1902' further includes means for detecting a radio link failure based on the reception of the reference signal and means for sending an indication to the base station based on the detected radio link failure. In an aspect, the reference signal is one of a CSI-RS, a CRS, an SSS, an MRS, a DMRS, or a BRS, and the indication includes at least one of a CQI, an SINR, an SNR, an RSSI, an RSRP, or an RSRQ. In an aspect, the means for communicating with the base station through the first active beam is performed with a first RAT, and the means for sending the indication is configured to send the indication through a second RAT, the first RAT having a higher carrier frequency than the second RAT.

In an aspect, the apparatus 1902/1902' further includes means for performing beam tracking with the base station. In an aspect, the means for performing the beam tracking is configured for one or more of: reception, from the base station, of at least one BRS; transmission, to the base station, of a first indication of a first beam index based on the BRS; reception of at least one BRRS; and transmission, based on the at least one BRRS, of a second indication of a second beam index.

In an aspect, the signal is received on a PDCCH or a PDSCH. In an aspect, the signal is received through DCI on the PDCCH.

The aforementioned means may be one or more of the aforementioned components of the apparatus 1902 and/or the processing system 2014 of the apparatus 1902' configured to perform the functions recited by the aforementioned means. As described supra, the processing system 2014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 21:
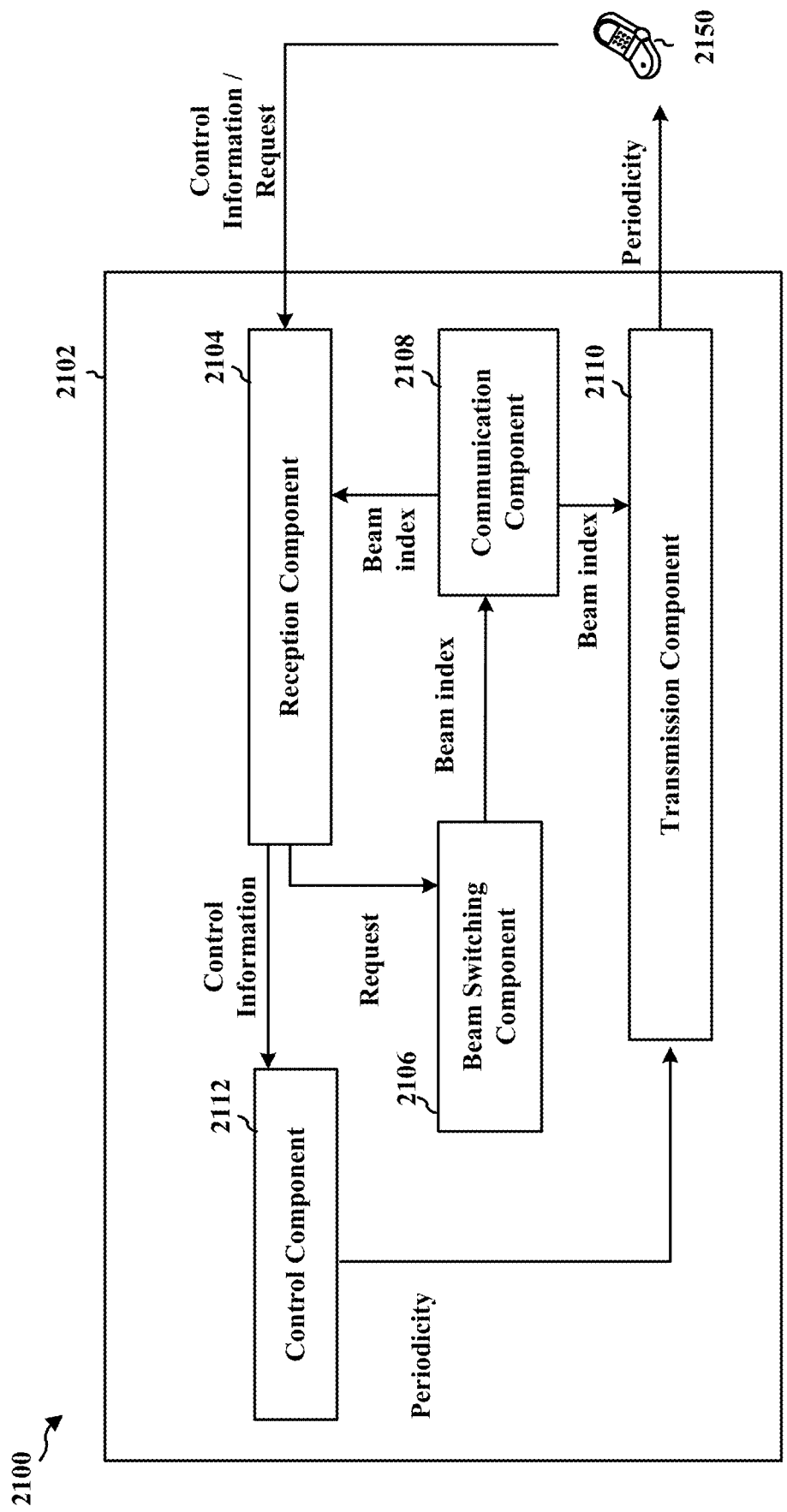
FIG. 21 is a conceptual data flow diagram illustrating the data flow between different means/components in an exemplary apparatus.

FIG. 21 is a conceptual data flow diagram 2100 illustrating the data flow between different means/components in an exemplary apparatus 2102. The apparatus may be a base station (e.g., the base station 702, the base station 802, etc.). The data flow illustrated in the diagram 2100 is to be regarded as illustrative. Therefore, one or more additional means/components may be present, and one or more illustrated means/components may be absent, according to various aspects. Further, various data flow may occur between means/components in addition to and/or instead of the illustrated data flow.

The apparatus 2102 may include a reception component 2104 configured to receive signals from a UE (e.g., the UE 2150, a mmW UE, etc.). The apparatus 2102 may further include a transmission component 2110 configured to transmit signals to a UE (e.g., the UE 2150, a mmW UE, etc.).

The apparatus 2102 may include a communication component 2108. The communication component 2108 may be configured to determine a beam corresponding to a beam index. The communication component 2108 may provide an indication of the beam index to the reception component 2104 so that the reception component 2104 may receive data from the UE 2150 through the beam corresponding to the beam index. The communication component 2108 may provide an indication of the beam index to the transmission component 2110 so that the transmission component 2110 may transmit data to the UE 2150 through the beam corresponding to the beam index. The beam through which the apparatus 2102 communicates with the UE 2150 may be an active beam.

In an aspect, the apparatus 2102 may include a control component 2112. The control component 2112 may be configured to determine a periodicity at which control information is to be communicated on a control channel through a control-information beam. In an aspect, the control component 2112 may cause the transmission component to transmit information indicating the periodicity to the UE. In one aspect, the control component 2112 may cause transmission of the information indicating the periodicity through RRC signaling. In another aspect, the control component 2112 may cause transmission of the information indicating the periodicity on a PDDCH. For example, the control component 2112 may cause transmission of the information indicating the periodicity as DCI of the PDCCH.

In an aspect, the control component 2112 may communicate, with the UE, the control information on the control channel through a control-information beam at the periodicity. The control-information beam may be different than the active beam. In an aspect, the control-information beam includes at least one candidate beam corresponding to a beam index included in a set of candidate beam indexes. In an aspect, the control-information beam includes at least one wide beam, which may have an angle greater than that of the active beam.

In an aspect, the control channel may include a PUCCH. The control component 2112 may be configured to receive, through the reception component, the control information carried on a PUCCH through the control-information beam based on the periodicity.

The apparatus 2102 may include a beam switching component 2106 for switching or changing the active beam. The beam switching component 2106 may receive, through the reception component 2104, a request to change the active beam. The request may indicate a beam index corresponding to a second beam. For example, the request may indicate the beam index through at least one of a cyclic shift or spreading across symbols. In another example, the request may indicate the beam index through at least one of a subcarrier region or a RACH. The beam switching component 2106 may determine the second beam based on the request and provide the beam index to the communication component 2108 for communication through the new active beam.

The apparatus may include additional components that perform each of the blocks of the algorithm in the aforementioned flowcharts of FIG. 14. As such, each block in the aforementioned flowcharts of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 22:
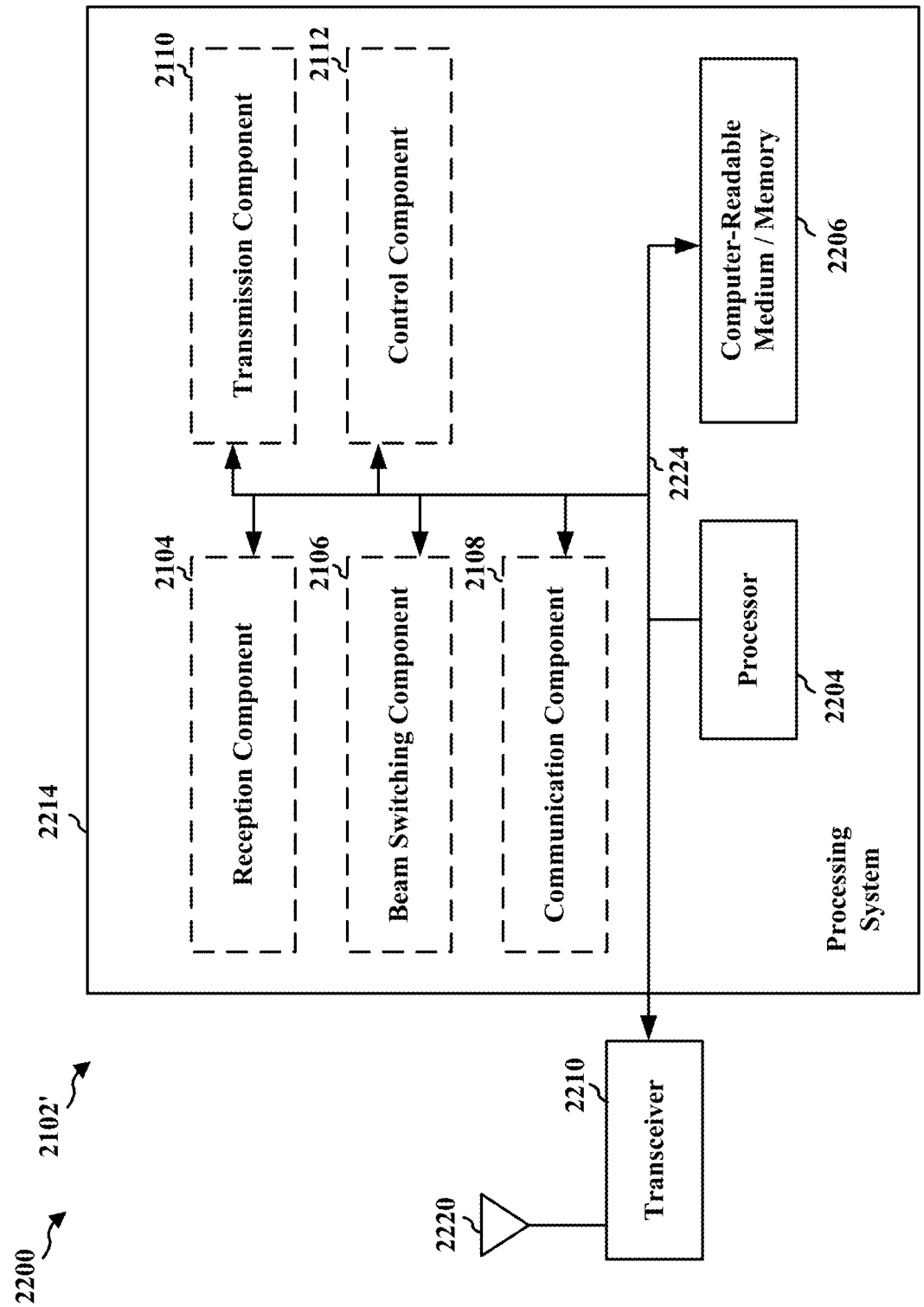
FIG. 22 is a diagram illustrating an example of a hardware implementation for an apparatus employing a processing system.

FIG. 22 is a diagram 2200 illustrating an example of a hardware implementation for an apparatus 2102' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware components, represented by the processor 2204, the components 2104, 2106, 2108, 2110, 2112 and the computer-readable medium/memory 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214, specifically the reception component 2104. In addition, the transceiver 2210 receives information from the processing system 2214, specifically the transmission component 2110, and based on the received information, generates a signal to be applied to the one or more antennas 2220. The processing system 2214 includes a processor 2204 coupled to a computer-readable medium/memory 2206. The processor 2204 is responsible for general processing, including the execution of software stored on the computer-readable medium/memory 2206. The software, when executed by the processor 2204, causes the processing system 2214 to perform the various functions described supra for any particular apparatus. The computer-readable medium/memory 2206 may also be used for storing data that is manipulated by the processor 2204 when executing software. The processing system 2214 further includes at least one of the components 2104, 2106, 2108, 2110, 2112. The components may be software components running in the processor 2204, resident/stored in the computer readable medium/memory 2206, one or more hardware components coupled to the processor 2204, or some combination thereof. The processing system 2214 may be a component of the base station 310 and may include the memory 376 and/or at least one of the TX processor 316, the RX processor 370, and the controller/processor 375.

In one configuration, the apparatus 2102/2102' for wireless communication includes means for communicating with a UE through an active beam. The apparatus 2102/2102' further includes means for transmitting, to the UE, information indicating a periodicity at which control information is to be communicated on a control channel through a control-information beam. The apparatus 2102/2102' further includes means for communicating, with the UE, the control information on the control channel through the control-information beam at the periodicity.

In an aspect, the control channel includes a PUCCH, and the means for communicating, with the UE, the control information on the control channel is configured to receive, from the UE, the control information carried on the PUCCH through the control-information beam based on the periodicity.

In an aspect, the control-information beam includes at least one candidate beam, the at least one candidate beam corresponding to a beam index included in a set of candidate beam indexes maintained by the base station. In an aspect, the control-information beam includes at least one wide beam, the at least one wide beam having an angle greater than that of the active beam.

In an aspect, the information indicating the periodicity is transmitted through RRC signaling. In an aspect, the information indicating the periodicity is transmitted on a PDCCH. In an aspect, the information indicating the periodicity includes DCI of the PDCCH.

In an aspect, the apparatus 2102/2102' may further include means for receiving a request to change the active beam, the request indicating a beam index corresponding to a second beam. In an aspect, the apparatus 2102/2102' may further include means for changing the active beam to the second beam corresponding to the beam index indicated by the request. In an aspect, the request indicates the beam index through at least one of a cyclic shift or spreading across symbols. In an aspect, the request indicates the beam index through at least one of a subcarrier region or a RACH.

The aforementioned means may be one or more of the aforementioned components of the apparatus 2102 and/or the processing system 2214 of the apparatus 2102' configured to perform the functions recited by the aforementioned means. As described supra, the processing system 2214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 23:
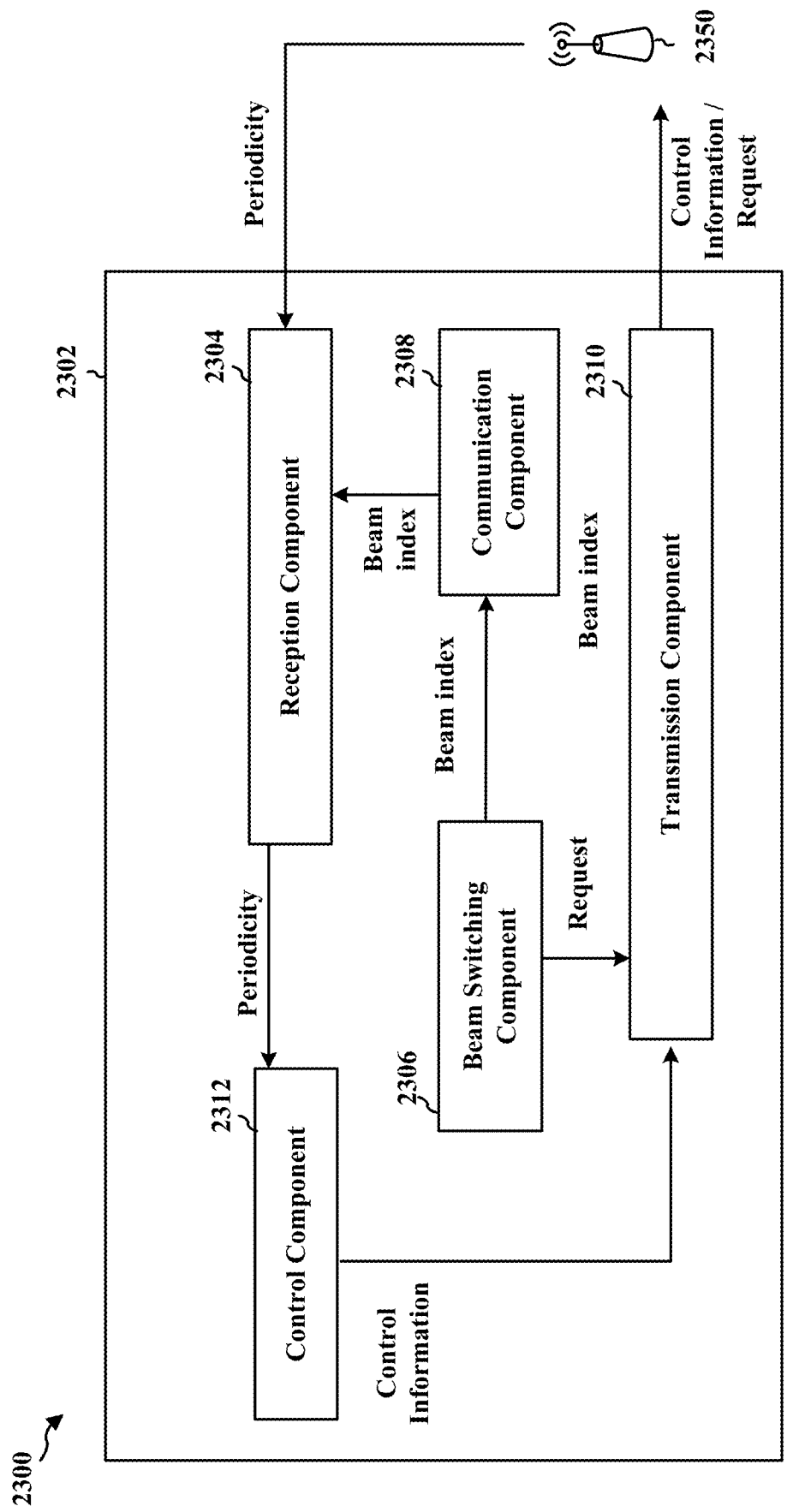
FIG. 23 is a conceptual data flow diagram illustrating the data flow between different means/components in an exemplary apparatus.

FIG. 23 is a conceptual data flow diagram 2300 illustrating the data flow between different means/components in an exemplary apparatus 2302. The apparatus may be a UE (e.g., the UE 704, the UE 804, etc.). The data flow illustrated in the diagram 2300 is to be regarded as illustrative. Therefore, one or more additional means/components may be present, and one or more illustrated means/components may be absent, according to various aspects. Further, various data flow may occur between means/components in addition to the illustrated data flow.

The apparatus 2302 may include a reception component 2304 configured to receive signals from a base station (e.g., the base station 2350, a mmW base station, an eNB, etc.). The apparatus 2302 may further include a transmission component 2310 configured to transmit signals to a base station (e.g., the base station 2350, a mmW base station, an eNB, etc.).

In an aspect, The apparatus 2302 may include a communication component 2308.

The communication component 2308 may be configured to determine a beam corresponding to a beam index, which may be a beam and corresponding beam index at the base station 2350. The communication component 2308 may provide an indication of the beam index to the reception component 2304 so that the reception component 2304 may receive data from the base station 2350 through the beam corresponding to the beam index. The communication component 2308 may provide an indication of the beam index to the transmission component 2310 so that the transmission component 2310 may transmit data to the base station 2350 through the beam corresponding to the beam index. The beam through which the apparatus 2302 communicates with the base station 2350 may be an active beam.

In an aspect, the apparatus 2302 may include a control component 2312. The control component 2312 may be configured to determine a periodicity at which control information is to be communicated on a control channel through a control-information beam. In an aspect, the control component 2312 may receive, through the reception component 2304, the transmission component to transmit information indicating the periodicity from the base station 2350. The control component 2312 may determine the periodicity based on the information indicating the periodicity. In one aspect, the control component 2312 may receive the information indicating the periodicity through RRC signaling. In another aspect, the control component 2312 may receive the information indicating the periodicity on a PDDCH. For example, the control component 2312 may receive the information indicating the periodicity as DCI of the PDCCH.

In an aspect, the control component 2312 may communicate, with the base station 2350, the control information on the control channel through a control-information beam at the periodicity. The control-information beam may be different than the active beam. In an aspect, the control-information beam includes at least one candidate beam corresponding to a beam index included in a set of candidate beam indexes. In an aspect, the control-information beam includes at least one wide beam, which may have an angle greater than that of the active beam.

In an aspect, the control channel may include a PUCCH. The control component 2312 may be configured to send, to the base station 2350, the control information through the control-information beam based on the periodicity.

The apparatus 2302 may include a beam switching component 2306 for switching or changing the active beam. The beam switching component 2306 may send, through the transmission component 2310, a request to change the active beam. The request may indicate a beam index corresponding to a second beam. For example, the request may indicate the beam index through at least one of a cyclic shift or spreading across symbols. In another example, the request may indicate the beam index through at least one of a subcarrier region or a RACH. The beam switching component 2306 may provide the beam index to the communication component 2308 for communication through the new active beam, which may match the active beam at the base station 2350 after transmission of the request.

The apparatus may include additional components that perform each of the blocks of the algorithm in the aforementioned flowcharts of FIG. 15. As such, each block in the aforementioned flowcharts of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 24:
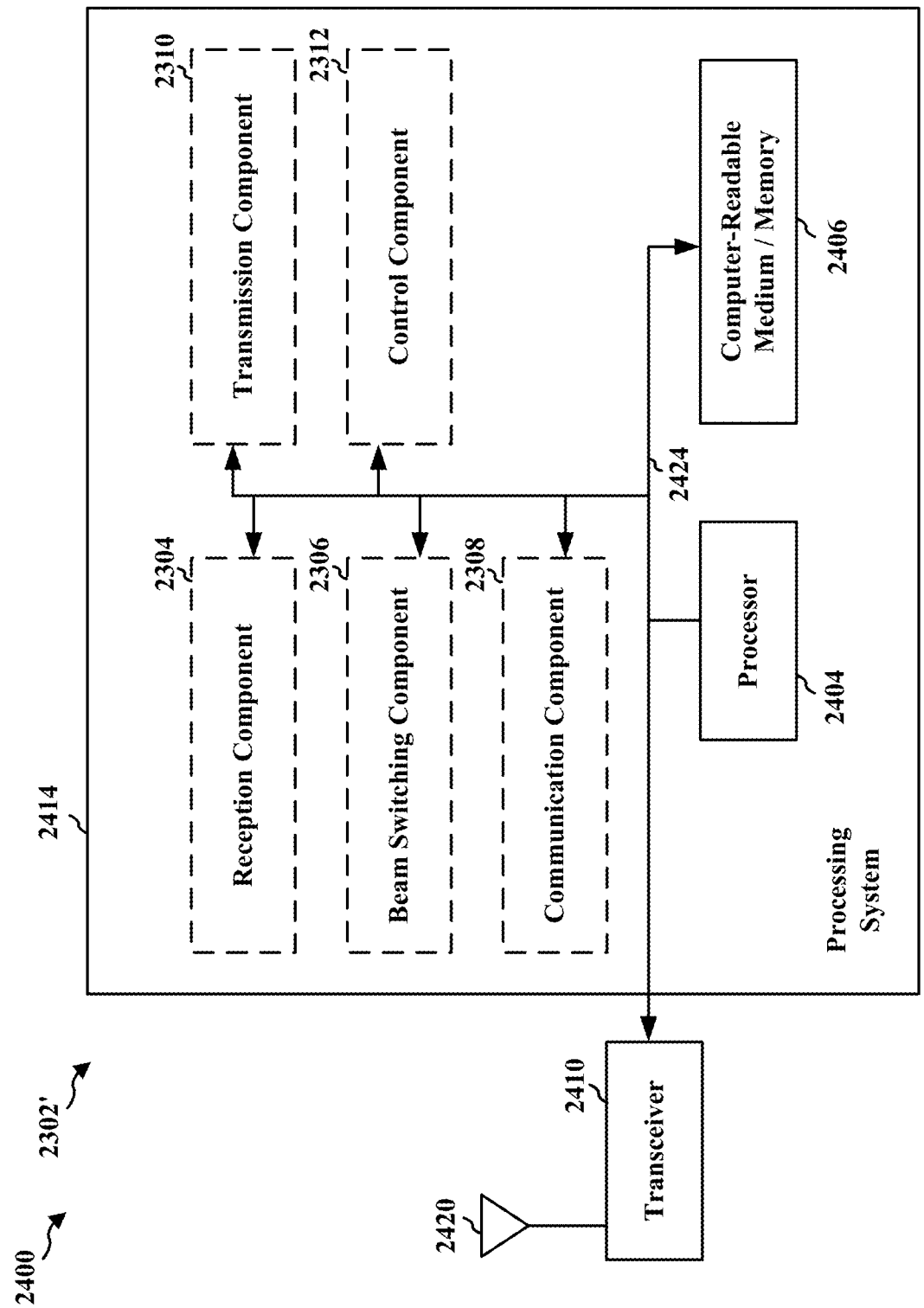
FIG. 24 is a diagram illustrating an example of a hardware implementation for an apparatus employing a processing system.

FIG. 24 is a diagram 2400 illustrating an example of a hardware implementation for an apparatus 2302' employing a processing system 2414. The processing system 2414 may be implemented with a bus architecture, represented generally by the bus 2424. The bus 2424 may include any number of interconnecting buses and bridges depending on the specific application of the processing system 2414 and the overall design constraints. The bus 2424 links together various circuits including one or more processors and/or hardware components, represented by the processor 2404, the components 2304, 2306, 2308, 2310, 2312 and the computer-readable medium/memory 2406. The bus 2424 may also link various other circuits such as timing sources, peripherals, voltage regulators, and power management circuits, which are well known in the art, and therefore, will not be described any further.

The processing system 2414 may be coupled to a transceiver 2410. The transceiver 2410 is coupled to one or more antennas 2420. The transceiver 2410 provides a means for communicating with various other apparatus over a transmission medium. The transceiver 2410 receives a signal from the one or more antennas 2420, extracts information from the received signal, and provides the extracted information to the processing system 2414, specifically the reception component 2304. In addition, the transceiver 2410 receives information from the processing system 2414, specifically the transmission component 2310, and based on the received information, generates a signal to be applied to the one or more antennas 2420. The processing system 2414 includes a processor 2404 coupled to a computer-readable medium/memory 2406. The processor 2404 is responsible for general processing, including the execution of software stored on the computer-readable medium/memory 2406. The software, when executed by the processor 2404, causes the processing system 2414 to perform the various functions described supra for any particular apparatus. The computer-readable medium/memory 2406 may also be used for storing data that is manipulated by the processor 2404 when executing software. The processing system 2414 further includes at least one of the components 2304, 2306, 2308, 2310, 2312. The components may be software components running in the processor 2404, resident/stored in the computer readable medium/memory 2406, one or more hardware components coupled to the processor 2404, or some combination thereof. The processing system 2414 may be a component of the UE 350 and may include the memory 360 and/or at least one of the TX processor 368, the RX processor 356, and the controller/processor 359.

In one configuration, the apparatus 2302/2302' for wireless communication includes means for communicating with a base station through an active beam. In an aspect, the apparatus 2302/2302' further includes means for receiving, from the base station, information indicating a periodicity at which control information is to be communicated on a control channel through a control-information beam. In an aspect, the apparatus 2302/2302' further includes means for communicating, with the base station, the control information on the control channel through the control-information beam at the periodicity.

In an aspect, the control channel includes a PUCCH, and the means for communicating the control information on the control channel is configured to send, to the base station, the control information on the PUCCH through the control-information beam based on the periodicity.

In an aspect, the control-information beam includes at least one candidate beam, the at least one candidate beam corresponding to a beam index included in a set of candidate beam indexes. In an aspect, the control-information beam includes at least one wide beam, the at least one wide beam having an angle greater than that of the active beam. In an aspect, the information indicating the periodicity is received using RRC signaling. In an aspect, the information indicating the periodicity is received on a PDCCH. In an aspect, the information indicating the periodicity is indicated by DCI of the PDCCH.

In an aspect, the apparatus 2302/2302' further includes means for transmitting, to the base station, a request to change the active beam, the request indicating a beam index corresponding to a second beam. In an aspect, the apparatus 2302/2302' further includes means for changing the active beam to the second beam corresponding to the beam index indicated by the request. In an aspect, the request indicates the beam index through at least one of a cyclic shift or spreading across symbols. In an aspect, the request indicates the beam index through at least one of a subcarrier region or a RACH.

The aforementioned means may be one or more of the aforementioned components of the apparatus 2302 and/or the processing system 2414 of the apparatus 2302' configured to perform the functions recited by the aforementioned means. As described supra, the processing system 2414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 25:
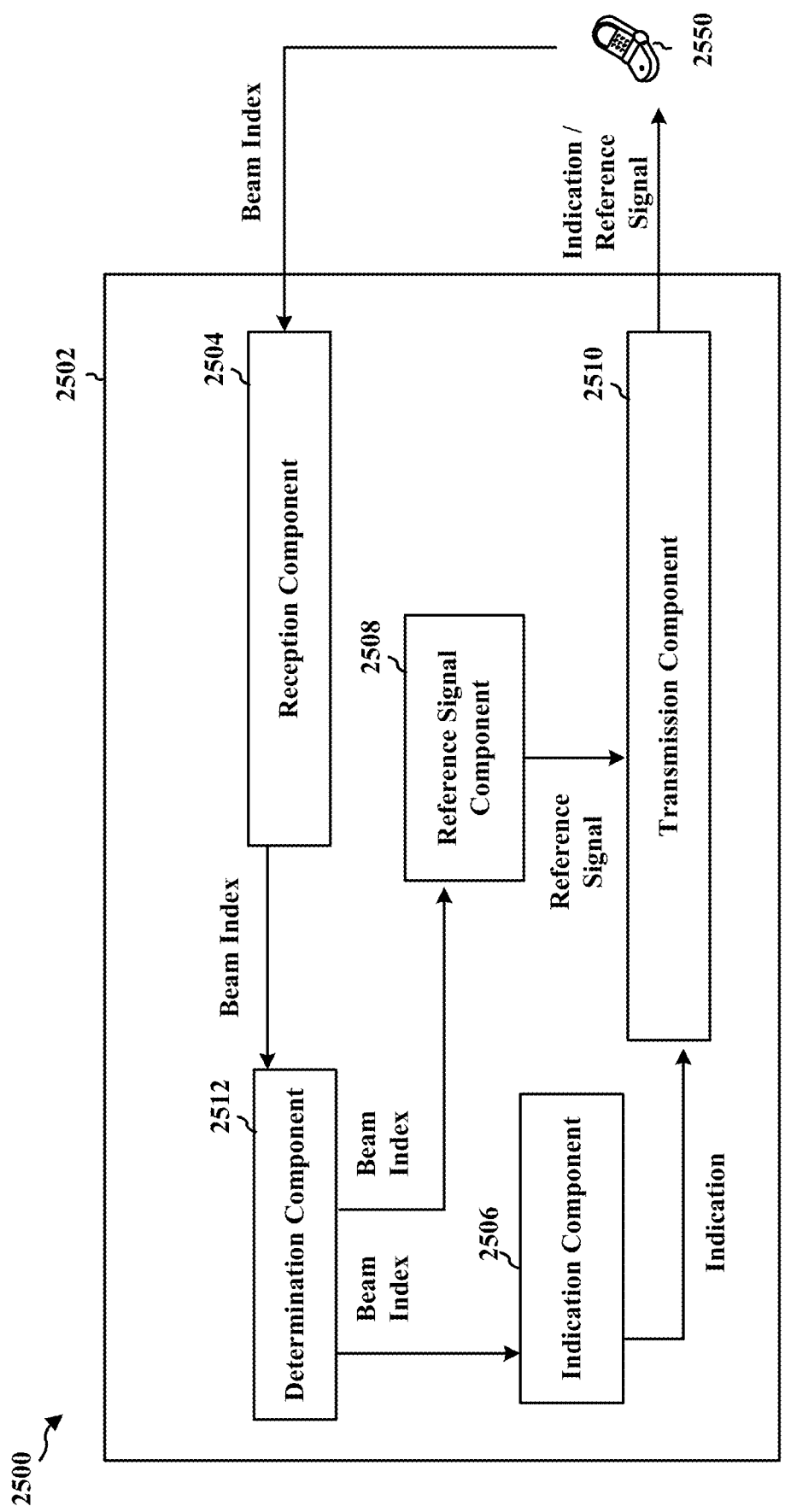
FIG. 25 is a conceptual data flow diagram illustrating the data flow between different means/components in an exemplary apparatus.

FIG. 25 is a conceptual data flow diagram 2500 illustrating the data flow between different means/components in an exemplary apparatus 2502. The apparatus may be a base station (e.g., the base station 902, etc.). The data flow illustrated in the diagram 2500 is to be regarded as illustrative. Therefore, one or more additional means/components may be present, and one or more illustrated means/components may be absent, according to various aspects. Further, various data flow may occur between means/components in addition to and/or instead of the illustrated data flow.

The apparatus 2502 may include a reception component 2504 configured to receive signals from a UE (e.g., the UE 2550, a mmW UE, etc.). The apparatus 2502 may further include a transmission component 2510 configured to transmit signals to a UE (e.g., the UE 2550, a mmW UE, etc.).

In aspects, the apparatus 2502 may include a determination component 2512. The determination component 2512 may be configured to determine one or more beam indexes corresponding to one or more beams of the apparatus 2502 through which one or more reference signals are to be transmitted. For example, the determination component 2512 may receive, through the reception component 2504, one or more beam indexes from the UE 2550. The beam indexes may be based on one or more reference signals previously sent be the apparatus 2502, such as one or more BRSs, BRRSs, CSI-RSs, or another reference signal.

In one aspect, the one or more beam indexes are received from the UE 2550 in one or more BSI reports. In one aspect, the one or more beam indexes corresponding to the one or more beams are received on a PUSCH or a PUCCH. The one or more beam indexes corresponding to the one or more beams may be received on a PUSCH when more than two symbols are reserved for reference signal transmission. The one or more beam indexes corresponding to the one or more beams may be received on a PUCCH when two or fewer symbols are reserved for reference signal transmission.

In one aspect, the determination component 2512 may determine the one or more beam indexes based on one more beam indexes that are most recently received form the UE 2550. In one aspect, the determination component 2512 may determine the one or more beam indexes based on transmitting one or more BRSs during a synchronization subframe. The determination component 2512 may reuse the beams one which the one or more BRSs are transmitted, for example, based on feedback from the UE 2550 indicating the best beam indexes corresponding to the best beams (e.g., the beam(s) through an associated BRS is transmitted, and the BRS has a highest measured signal quality).

The determination component 2512 may provide an indication of the one or more beam indexes corresponding to the one or more beams to an indication component 2506. The indication component 2506 may be configured to generate one or more indications of the one or more beam indexes corresponding to the one or more beams. The indication component 2506 may then cause the transmission component 2510 to transmit the one or more indications to the UE 2550. In one aspect, the one or more indications may be carried on a PDCCH. For example, the one or more indications may be included in one or more bits of a DCI message of a PDCCH.

The determination component 2512 may provide an indication of the one or more beam indexes corresponding to the one or more beams to a reference signal component 2508. The reference signal component 2508 may be configured to generate one or more reference signals. A generated reference signal may be at least one of a BRRS or a CSI-RS. The reference signal component 2508 may then cause the transmission component 2510 to transmit the one or more reference signals through the one or more beams corresponding to the one or more beam indexes, which were send to the UE 2550 by the indication component 2506.

The apparatus may include additional components that perform each of the blocks of the algorithm in the aforementioned flowcharts of FIG. 16. As such, each block in the aforementioned flowcharts of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 26:
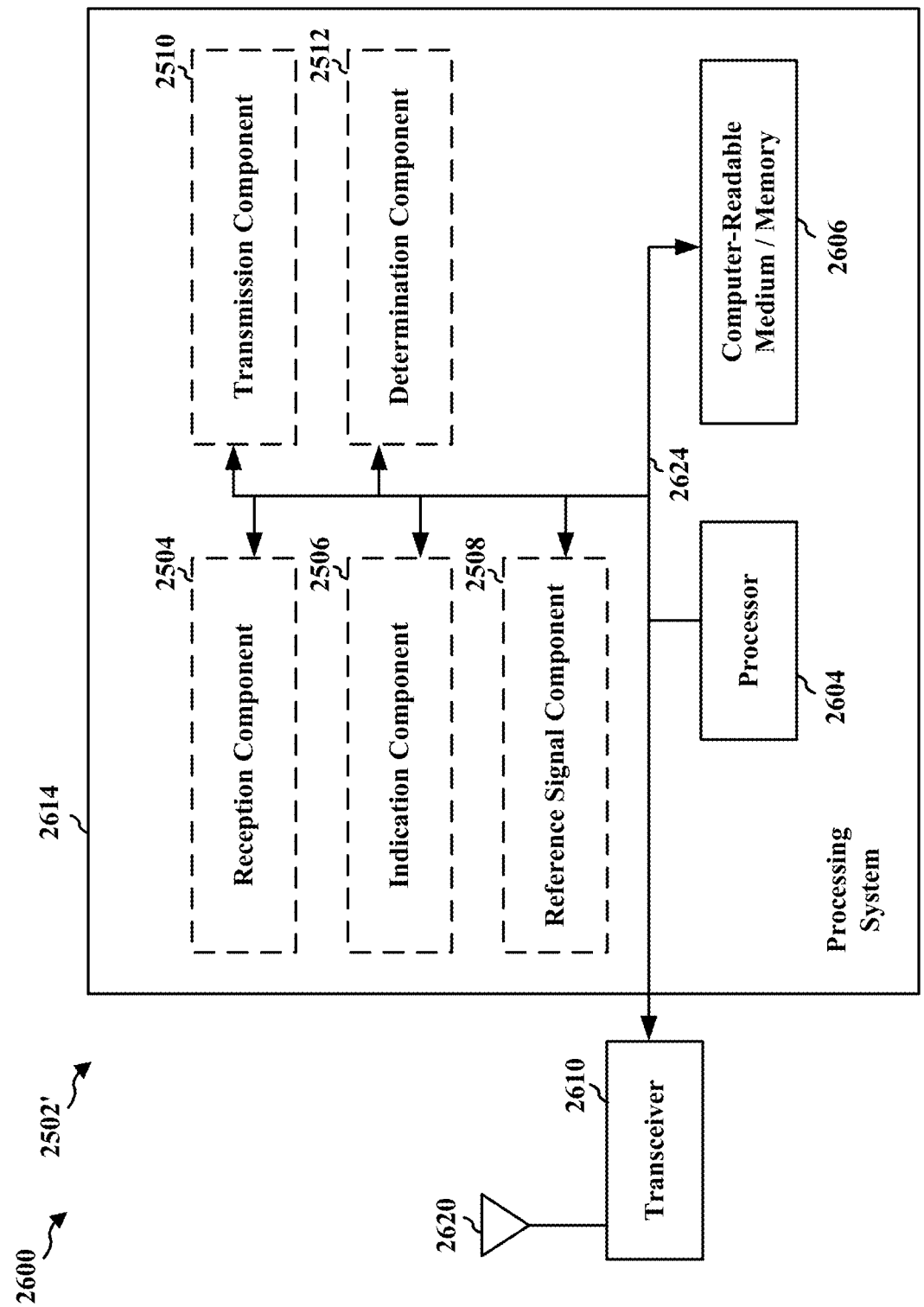
FIG. 26 is a diagram illustrating an example of a hardware implementation for an apparatus employing a processing system.

FIG. 26 is a diagram 2600 illustrating an example of a hardware implementation for an apparatus 2502' employing a processing system 2614. The processing system 2614 may be implemented with a bus architecture, represented generally by the bus 2624. The bus 2624 may include any number of interconnecting buses and bridges depending on the specific application of the processing system 2614 and the overall design constraints. The bus 2624 links together various circuits including one or more processors and/or hardware components, represented by the processor 2604, the components 2504, 2506, 2508, 2510, 2512 and the computer-readable medium/memory 2606. The bus 2624 may also link various other circuits such as timing sources, peripherals, voltage regulators, and power management circuits, which are well known in the art, and therefore, will not be described any further.

The processing system 2614 may be coupled to a transceiver 2610. The transceiver 2610 is coupled to one or more antennas 2620. The transceiver 2610 provides a means for communicating with various other apparatus over a transmission medium. The transceiver 2610 receives a signal from the one or more antennas 2620, extracts information from the received signal, and provides the extracted information to the processing system 2614, specifically the reception component 2504. In addition, the transceiver 2610 receives information from the processing system 2614, specifically the transmission component 2510, and based on the received information, generates a signal to be applied to the one or more antennas 2620. The processing system 2614 includes a processor 2604 coupled to a computer-readable medium/memory 2606. The processor 2604 is responsible for general processing, including the execution of software stored on the computer-readable medium/memory 2606.

The software, when executed by the processor 2604, causes the processing system 2614 to perform the various functions described supra for any particular apparatus. The computer-readable medium/memory 2606 may also be used for storing data that is manipulated by the processor 2604 when executing software. The processing system 2614 further includes at least one of the components 2504, 2506, 2508, 2510, 2512. The components may be software components running in the processor 2604, resident/stored in the computer readable medium/memory 2606, one or more hardware components coupled to the processor 2604, or some combination thereof. The processing system 2614 may be a component of the base station 310 and may include the memory 376 and/or at least one of the TX processor 316, the RX processor 370, and the controller/processor 375.

In one configuration, the apparatus 2502/2502' for wireless communication includes means for transmitting, to a UE on a control channel, one or more indications of one or more beam indexes corresponding to one or more beams. The apparatus 2502/2502' may further include means for transmitting, to the UE, one or more reference signals through the one or more beams corresponding to the one or more beam indexes. In an aspect, the control channel comprises a PDCCH, and the one or more indications are included in one or more bits of a DCI message.

In an aspect, the means for transmitting the one or more indications of the one or more beam indexes corresponding to the one or more beams is configured to transmit one or more beam indexes associated with one or more BRSs, the one or more BRSs transmitted during a synchronization subframe.

In an aspect, the means for transmitting the one or more indications of the one or more beam indexes corresponding to the one or beams is configured to: receive, from the UE, one or more beam indexes corresponding to the one or more beams; and transmit the one or more beam indexes corresponding to the one or more beams based on the one or more beam indexes that are received most recently.

In an aspect, the one or more beam indexes corresponding to the one or more beams are received on a PUSCH or a PUCCH. In an aspect, the one or more beam indexes corresponding to the one or more beams are transmitted based on the one or more beam indexes received through the PUSCH when more than two symbols are used for the reference signal transmission. In an aspect, the one or more beam indexes associated with one or more beams are transmitted based on the one or more beam indexes received through the PUCCH when two or fewer symbols are used for the reference signal transmission.

In an aspect, the one or more reference signals include at least one of a CSI-RS or a BRRS. In an aspect, the means for transmitting the one or more indications of the one or more beam indexes associated with the one or more beams is configured to transmit the one or more beam indexes associated with the one or more beams through which at least one of the CSI-RSs was previously transmitted.

The aforementioned means may be one or more of the aforementioned components of the apparatus 2502 and/or the processing system 2614 of the apparatus 2502' configured to perform the functions recited by the aforementioned means. As described supra, the processing system 2614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), the method comprising:
  receiving, from a base station, a plurality of first signals, each first signal being associated with synchronization with the base station and each first signal being received on a respective one of a first plurality of beams, wherein the first signals are swept through transmit directions of the first plurality of beams according to a sequence;
  determining, before synchronization with the base station, a selected first signal of the plurality of first signals based on the sequence;
  synchronizing with the base station based on the selected first signal of the plurality of first signals, wherein other first signals of the plurality of first signals are unused for the synchronization with the base station;
  receiving, after the synchronizing with the base station, a plurality of second signals, each second signal comprising a reference signal and each second signal being received on a respective one of a second plurality of beams;

measuring a first value based on at least one second signal of the plurality of second signals;

sending, to the base station, a report indicating the first value; and communicating with the base station based on the report indicating the first value.

2. The method of claim 1, wherein the first value comprises a reference signal receive power (RSRP).

3. The method of claim 1, wherein each second signal comprises a channel state information reference signal (CSI-RS).

4. The method of claim 1, wherein the first plurality of beams comprises at least one of the second plurality of beams.

5. The method of claim 4, wherein the at least one first signal and the at least one second signal are received on the at least one of the second plurality of beams.

6. The method of claim 1, further comprising:
measuring a second value based on the at least one first signal,
wherein the synchronizing with the base station is based on the second value.

7. The method of claim 1, further comprising:
receiving, from the base station, another plurality of first signals, each first signal of the other plurality being associated with synchronization with the base station and each first signal of the other plurality being received on a respective one of the first plurality of beams; and
measuring a third value based on at least one first signal of the other plurality of first signals.

8. The method of claim 7, further comprising:
maintaining a list of candidate beams based on the third value.

9. The method of claim 7, further comprising:
determining a quality of a radio link with the base station based on the third value.

10. The method of claim 1, further comprising:
identifying a first index of a plurality of first indexes associated with the at least one first signal of the plurality of first signals, wherein each of the plurality of first signals is associated with a respective one of the plurality of first indexes.

11. The method of claim 1, further comprising:
identifying a second index of a plurality of second indexes associated with the at least one second signal of the plurality of second signals, wherein each of the plurality of second signals is associated with a respective one of the plurality of second indexes.

12. A method of wireless communication by a base station, the method comprising:
sending a plurality of first signals, each first signal being associated with synchronization with the base station and each first signal being sent on a respective one of a first plurality of beams, wherein sending comprises sweeping the first signals swept through transmit directions of the first plurality of beams according to a sequence;
synchronizing with a user equipment (UE) based on a first signal of the plurality of first signals selected by the UE before synchronization, wherein other first signals of the plurality of first signals are unused by the UE for the synchronization;

sending, after the synchronizing with the UE, a plurality of second signals, each second signal comprising a reference signal and each second signal being sent on a respective one of a second plurality of beams;

receiving, from the UE, a report indicating a first value associated with at least one second signal of the plurality of second signals; and communicating with the UE based on the report indicating the first value.

13. The method of claim 12, wherein the first value comprises a reference signal receive power (RSRP).

14. The method of claim 12, wherein each second signal comprises a channel state information reference signal (CSI-RS).

15. The method of claim 12, wherein the first plurality of beams comprises at least one of the second plurality of beams.

16. The method of claim 15, wherein the at least one first signal and the at least one second signal are sent on the at least one of the second plurality of beams.

17. The method of claim 12, further comprising:
sending another plurality of first signals, each first signal of the other plurality being associated with synchronization with the base station and each first signal of the other plurality being sent on a respective one of the first plurality of beams; and
receiving another report indicating a third value that is based on at least one first signal of the other plurality of first signals.

18. The method of claim 17, further comprising:
maintaining a list of candidate beams based on the third value.

19. The method of claim 17, further comprising:
determining a quality of a radio link with the UE based on the third value.

20. The method of claim 12, further comprising:
identifying a first index of a plurality of first indexes associated with the at least one first signal of the plurality of first signals, wherein each of the plurality of first signals is associated with a respective one of the plurality of first indexes.

21. The method of claim 12, further comprising:
identifying a second index of a plurality of second indexes associated with the at least one second signal of the plurality of second signals, wherein each of the plurality of second signals is associated with a respective one of the plurality of second indexes.

22. An apparatus for wireless communication by a user equipment (UE), the apparatus comprising:
a memory; and
at least one processor coupled to the memory and configured to:
receive, from a base station, a plurality of first signals, each first signal being associated with synchronization with the base station and each first signal being received on a respective one of a first plurality of beams, wherein the first signals are swept through transmit directions of the first plurality of beams according to a sequence;
determine, before synchronization with the base station, a selected first signal of the plurality of first signals based on the sequence;
synchronize with the base station based on at least one first signal of the plurality of first signals, wherein other first signals are unused for the synchronization with the base station;

receive, after the synchronization with the base station, a plurality of second signals, each second signal comprising a reference signal and each second signal being received on a respective one of a second plurality of beams;

measure a first value based on at least one second signal of the plurality of second signals;

send, to the base station, a report indicating the first value; and communicate with the base station based on the report indicating the first value.

23. The apparatus of claim 22, wherein the first value comprises a reference signal receive power (RSRP).

24. The apparatus of claim 22, wherein each second signal comprises a channel state information reference signal (CSI-RS).

25. The apparatus of claim 22, wherein the first plurality of beams comprises at least one of the second plurality of beams.

26. The apparatus of claim 25, wherein the at least one first signal and the at least one second signal are received on the at least one of the second plurality of beams.

27. The apparatus of claim 22, wherein the at least one processor is further configured to:

measure a second value based on the at least one first signal, wherein the synchronization with the base station is based on the second value.

28. The apparatus of claim 22, wherein the at least one processor is further configured to:

receive, from the base station, another plurality of first signals, each first signal of the other plurality being associated with synchronization with the base station and each first signal of the other plurality being received on a respective one of the first plurality of beams; and measure a third value based on at least one first signal of the other plurality of first signals.

29. The apparatus of claim 28, wherein the at least one processor is further configured to:

maintain a list of candidate beams based on the third value.

30. The apparatus of claim 28, wherein the at least one processor is further configured to:

determine a quality of a radio link with the base station based on the third value.

31. The apparatus of claim 22, wherein the at least one processor is further configured to:

identify a first index of a plurality of first indexes associated with the at least one first signal of the plurality of first signals, wherein each of the plurality of first signals is associated with a respective one of the plurality of first indexes.

32. The apparatus of claim 22, wherein the at least one processor is further configured to:

identify a second index of a plurality of second indexes associated with the at least one second signal of the plurality of second signals, wherein each of the plurality of second signals is associated with a respective one of the plurality of second indexes.

33. An apparatus for wireless communication by a base station, the apparatus comprising:

a memory; and at least one processor coupled to the memory and configured to:

send a plurality of first signals, each first signal being associated with synchronization with the base station and each first signal being sent on a respective one of a first plurality of beams, wherein sending comprises sweeping the first signals swept through transmit directions of the first plurality of beams according to a sequence;

synchronize with a user equipment (UE) based on a first signal of the plurality of first signals selected by the UE before synchronization, wherein other first signals of the plurality of first signals are unused by the UE for the synchronization;

send, after the synchronization with the UE, a plurality of second signals, each second signal comprising a reference signal and each second signal being sent on a respective one of a second plurality of beams;

receive, from the UE, a report indicating a first value associated with at least one second signal of the plurality of second signals; and communicate with the UE based on the report indicating the first value.

34. The apparatus of claim 33, wherein the first value comprises a reference signal receive power (RSRP).

35. The apparatus of claim 33, wherein each second signal comprises a channel state information reference signal (CSI-RS).

36. The apparatus of claim 33, wherein the first plurality of beams comprises at least one of the second plurality of beams.

37. The apparatus of claim 36, wherein the at least one first signal and the at least one second signal are sent on the at least one of the second plurality of beams.

38. The apparatus of claim 33, wherein the at least one processor is further configured to:

send another plurality of first signals, each first signal of the other plurality being associated with synchronization with the base station and each first signal of the other plurality being sent on a respective one of the first plurality of beams; and receive another report indicating a third value that is based on at least one first signal of the other plurality of first signals.

39. The apparatus of claim 38, wherein the at least one processor is further configured to:

maintain a list of candidate beams based on the third value.

40. The apparatus of claim 38, wherein the at least one processor is further configured to:

determine a quality of a radio link with the UE based on the third value.

41. The apparatus of claim 33, wherein the at least one processor is further configured to:

identify a first index of a plurality of first indexes associated with the at least one first signal of the plurality of first signals, wherein each of the plurality of first signals is associated with a respective one of the plurality of first indexes.

42. The apparatus of claim 33, wherein the at least one processor is further configured to:

identify a second index of a plurality of second indexes associated with the at least one second signal of the plurality of second signals, wherein each of the plurality of second signals is associated with a respective one of the plurality of second indexes.

43. An apparatus for wireless communication by a user equipment (UE), the apparatus comprising:

means for receiving, from a base station, a plurality of first signals, each first signal being associated with synchronization with the base station and each first signal being received on a respective one of a first plurality of beams, wherein the first signals are swept through transmit directions of the first plurality of beams according to a sequence;

means for determining, before synchronization with the base station, a selected first signal of the plurality of first signals based on the sequence;

means for synchronizing with the base station based on the selected first signal of the plurality of first signals, wherein other first signals of the plurality of first signals are unused for the synchronization with the base station;

means for receiving, after the synchronizing with the base station, a plurality of second signals, each second signal comprising a reference signal and each second signal being received on a respective one of a second plurality of beams;

means for measuring a first value based on at least one second signal of the plurality of second signals;

means for sending, to the base station, a report indicating the first value; and means for communicating with the base station based on the report indicating the first value.

44. The apparatus of claim 43, wherein the first value comprises a reference signal receive power (RSRP).

45. The apparatus of claim 43, wherein each second signal comprises a channel state information reference signal (CSI-RS).

46. The apparatus of claim 43, wherein the first plurality of beams comprises at least one of the second plurality of beams.

47. The apparatus of claim 46, wherein the at least one first signal and the at least one second signal are received on the at least one of the second plurality of beams.

48. The apparatus of claim 43, further comprising:
means for measuring a second value based on the at least one first signal,
wherein the synchronizing with the base station is based on the second value.

49. The apparatus of claim 43, further comprising:
means for receiving, from the base station, another plurality of first signals, each first signal of the other plurality being associated with synchronization with the base station and each first signal of the other plurality being received on a respective one of the first plurality of beams; and
means for measuring a third value based on at least one first signal of the other plurality of first signals.

50. The apparatus of claim 49, further comprising:
means for maintaining a list of candidate beams based on the third value.

51. The apparatus of claim 49, further comprising:
means for determining a quality of a radio link with the base station based on the third value.

52. The apparatus of claim 43, further comprising:
means for identifying a first index of a plurality of first indexes associated with the at least one first signal of the plurality of first signals, wherein each of the plurality of first signals is associated with a respective one of the plurality of first indexes.

53. The apparatus of claim 43, further comprising:
means for identifying a second index of a plurality of second indexes associated with the at least one second signal of the plurality of second signals, wherein each of the plurality of second signals is associated with a respective one of the plurality of second indexes.

54. An apparatus of wireless communication by a base station, the apparatus comprising:
means for sending a plurality of first signals, each first signal being associated with synchronization with the base station and each first signal being sent on a respective one of a first plurality of beams, wherein sending comprises sweeping the first signals swept through transmit directions of the first plurality of beams according to a sequence;

means for synchronizing with a user equipment (UE) based on a first signal of the plurality of first signals selected by the UE before synchronization, wherein other first signals of the plurality of first signals are unused by the UE for the synchronization;

means for sending, after the synchronizing with the UE, a plurality of second signals, each second signal comprising a reference signal and each second signal being sent on a respective one of a second plurality of beams;

means for receiving, from the UE, a report indicating a first value associated with at least one second signal of the plurality of second signals; and means for communicating with the UE based on the report indicating the first value.

55. The apparatus of claim 54, wherein the first value comprises a reference signal receive power (RSRP).

56. The apparatus of claim 54, wherein each second signal comprises a channel state information reference signal (CSI-RS).

57. The apparatus of claim 54, wherein the first plurality of beams comprises at least one of the second plurality of beams.

58. The apparatus of claim 57, wherein the at least one first signal and the at least one second signal are sent on the at least one of the second plurality of beams.

59. The apparatus of claim 54, further comprising:
means for sending another plurality of first signals, each first signal of the other plurality being associated with synchronization with the base station and each first signal of the other plurality being sent on a respective one of the first plurality of beams; and
means for receiving another report indicating a third value that is based on at least one first signal of the other plurality of first signals.

60. The apparatus of claim 59, further comprising:
means for maintaining a list of candidate beams based on the third value.

61. The apparatus of claim 59, further comprising:
means for determining a quality of a radio link with the UE based on the third value.

62. The apparatus of claim 54, further comprising:
means for identifying a first index of a plurality of first indexes associated with the at least one first signal of the plurality of first signals, wherein each of the plurality of first signals is associated with a respective one of the plurality of first indexes.

63. The apparatus of claim 54, further comprising:
means for identifying a second index of a plurality of second indexes associated with the at least one second signal of the plurality of second signals, wherein each of the plurality of second signals is associated with a respective one of the plurality of second indexes.

64. A non-transitory computer-readable medium storing computer-executable code for wireless communication by a user equipment (UE), comprising code to:
receive, from a base station, a plurality of first signals, each first signal being associated with synchronization with the base station and each first signal being received on a respective one of a first plurality of beams, wherein the first signals are swept through transmit directions of the first plurality of beams according to a sequence;

determine, before synchronization with the base station, a selected first signal of the plurality of first signals based on the sequence;

synchronize with the base station based on the selected first signal of the plurality of first signals, wherein other first signals of the plurality of first signals are unused for the synchronization with the base station;

receive, after the synchronization with the base station, a plurality of second signals, each second signal comprising a reference signal and each second signal being received on a respective one of a second plurality of beams;

measure a first value based on at least one second signal of the plurality of second signals;

send, to the base station, a report indicating the first value; and communicate with the base station based on the report indicating the first value.

65. A non-transitory computer-readable medium storing computer-executable code for wireless communication by a base station, comprising code to:

send a plurality of first signals, each first signal being associated with synchronization with the base station and each first signal being sent on a respective one of a first plurality of beams, wherein sending comprises sweeping the first signals swept through transmit directions of the first plurality of beams according to a sequence;

synchronize with a user equipment (UE) based on a first signal of the plurality of first signals selected by the UE before synchronization, wherein other first signals of the plurality of first signals are unused by the UE for the synchronization;

send, after the synchronization with the UE, a plurality of second signals, each second signal comprising a reference signal and each second signal being sent on a respective one of a second plurality of beams;

receive, from the UE, a report indicating a first value associated with at least one second signal of the plurality of second signals; and communicate with the UE based on the report indicating the first value.

* * * * *